(12) United States Patent
Arai et al.

(10) Patent No.: US 11,130,286 B2
(45) Date of Patent: Sep. 28, 2021

(54) THREE-DIMENSIONAL MANUFACTURING APPARATUS, THREE-DIMENSIONAL MANUFACTURED OBJECT PRODUCING METHOD, AND CONTAINER FOR THREE-DIMENSIONAL MANUFACTURING APPARATUS

(71) Applicant: CANON KABUSHIKI KAISHA, Tokyo (JP)

(72) Inventors: Takashi Arai, Newport News, VA (US); Yasuhiro Sekine, Yokohama (JP); Hideo Genda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 638 days.

(21) Appl. No.: 15/681,760

(22) Filed: Aug. 21, 2017

(65) Prior Publication Data

US 2018/0065302 A1    Mar. 8, 2018

(30) Foreign Application Priority Data

Sep. 7, 2016    (JP) .............................. JP2016-174895
Sep. 16, 2016    (JP) .............................. JP2016-181368
(Continued)

(51) Int. Cl.
   *B29C 64/245*    (2017.01)
   *B29C 64/264*    (2017.01)
   (Continued)

(52) U.S. Cl.
   CPC .......... *B29C 64/264* (2017.08); *B29C 64/129* (2017.08); *B29C 64/135* (2017.08);
   (Continued)

(58) Field of Classification Search
None
See application file for complete search history.

(56) References Cited

U.S. PATENT DOCUMENTS 7,442,021 B2    10/2008    Kim et al.
7,704,550 B2    4/2010    Schuster et al.
(Continued)

FOREIGN PATENT DOCUMENTS

CN    1330049 A    1/2002
CN    1858863 A    11/2006
(Continued)

OTHER PUBLICATIONS

First Office Action in Chinese Application No. 201710792463.X (dated Oct. 11, 2019).
(Continued)

*Primary Examiner* — Jeffrey M Wollschlager
*Assistant Examiner* — Armand Melendez
(74) *Attorney, Agent, or Firm* — Venable LLP

(57) ABSTRACT

There is provided a three-dimensional manufacturing apparatus which is characterized by comprising: a container configured to hold a liquid photocurable resin; a base configured to support a solid manufactured object obtained by curing the liquid photocurable resin; a moving unit configured to move the base; and a light source unit configured to irradiate light for curing the liquid photocurable resin. The container comprises a light transmission portion which is provided between the light source unit and the base, and is in contact with the liquid photocurable resin. The three-dimensional manufacturing apparatus further comprises a flow facilitating unit configured to facilitate a flow of the photocurable resin which is in contact with the light transmission portion, the flow being attended by the movement of the base.

10 Claims, 36 Drawing Sheets

(30) Foreign Application Priority Data

Sep. 29, 2016 (JP) .............................. JP2016-192347
Dec. 22, 2016 (JP) .............................. JP2016-250074

(51) Int. Cl.

| | |
|---|---|
| *B29C 64/129* | (2017.01) |
| *B29C 64/371* | (2017.01) |
| *B29C 64/255* | (2017.01) |
| *B33Y 10/00* | (2015.01) |
| *B33Y 30/00* | (2015.01) |
| *B29C 64/205* | (2017.01) |
| *B29C 64/135* | (2017.01) |
| *B29K 105/00* | (2006.01) |

(52) U.S. Cl.

CPC .......... *B29C 64/205* (2017.08); *B29C 64/245* (2017.08); *B29C 64/255* (2017.08); *B29C 64/371* (2017.08); *B33Y 10/00* (2014.12); *B33Y 30/00* (2014.12); *B29K 2105/0058* (2013.01)

(56) References Cited

U.S. PATENT DOCUMENTS

| | | | |
|---|---|---|---|
| 9,193,112 B2 | 11/2015 | Ohkusa et al. | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,360,757 B2 | 6/2016 | Desimone et al. | |
| 9,498,920 B2 | 11/2016 | Desimone et al. | |
| 9,636,897 B2 | 5/2017 | Taniuchi et al. | |
| 10,086,535 B2* | 10/2018 | Joyce | B29C 33/68 |
| 10,259,076 B2 | 4/2019 | Suzuki et al. | |
| 10,618,215 B2 | 4/2020 | Desimone et al. | |
| 2002/0033546 A1 | 3/2002 | Kojima et al. | |
| 2013/0115420 A1* | 5/2013 | Park | B32B 3/30 |
| | | | 428/141 |
| 2013/0292862 A1* | 11/2013 | Joyce | B29C 64/20 |
| | | | 264/40.1 |
| 2014/0154476 A1* | 6/2014 | Perillon | A47J 36/025 |
| | | | 428/172 |
| 2015/0054198 A1 | 2/2015 | Zenere | |
| 2016/0059484 A1 | 3/2016 | Desimone et al. | |
| 2016/0059486 A1 | 3/2016 | Desimone et al. | |
| 2016/0059487 A1 | 3/2016 | Desimone et al. | |
| 2016/0279869 A1* | 9/2016 | Gruber | B29C 64/20 |
| 2016/0311158 A1 | 10/2016 | Desimone et al. | |
| 2016/0332386 A1* | 11/2016 | Kuijpers | B29C 64/40 |
| 2017/0095972 A1 | 4/2017 | Desimone et al. | |
| 2017/0129167 A1* | 5/2017 | Castanon | B29C 64/20 |
| 2017/0129175 A1* | 5/2017 | Zitelli | B29C 64/135 |
| 2017/0203510 A1 | 7/2017 | Taniuchi et al. | |
| 2017/0334129 A1 | 11/2017 | Ebert et al. | |
| 2018/0056587 A1* | 3/2018 | Arai | B29C 64/264 |
| 2019/0126547 A1 | 5/2019 | Desimone et al. | |
| 2019/0134888 A1 | 5/2019 | Desimone et al. | |
| 2019/0202112 A1* | 7/2019 | Gmeiner | B29C 64/295 |
| 2019/0389127 A1 | 12/2019 | Desimone et al. | |
| 2020/0139617 A1 | 5/2020 | Desimone et al. | |

FOREIGN PATENT DOCUMENTS

| | | |
|---|---|---|
| CN | 101384415 A | 3/2009 |
| CN | 201437085 U | 4/2010 |
| CN | 103240791 A | 8/2013 |
| CN | 103764377 A | 4/2014 |
| CN | 203752529 U | 8/2014 |
| CN | 104339655 A | 2/2015 |
| CN | 105452958 A | 3/2016 |
| CN | 105799168 A | 7/2016 |
| EP | 0 379 068 A2 | 7/1990 |
| JP | 2-97023 U | 8/1990 |
| JP | 5-96632 A | 4/1993 |
| JP | 5-503257 A | 6/1993 |
| JP | 5-278122 A | 10/1993 |
| JP | 6-226863 A | 8/1994 |
| JP | 2000-153556 A | 6/2000 |
| JP | 2006-001259 A | 1/2006 |
| JP | 2008-006745 A | 1/2008 |
| JP | 2015-196252 A | 11/2015 |
| JP | 2016-509962 A | 4/2016 |
| JP | 2016-509964 A | 4/2016 |
| KR | 10-2014-0041785 A | 4/2014 |
| KR | 10-2015-0117275 A | 10/2015 |
| KR | 10-1593488 B1 | 2/2016 |
| KR | 10-2018-0046330 A | 5/2018 |
| WO | 92/07705 A1 | 5/1992 |
| WO | 2014/126830 A2 | 8/2014 |
| WO | 2014/126837 A2 | 8/2014 |
| WO | 2016/078838 A1 | 5/2016 |

OTHER PUBLICATIONS

First Office Action in Chinese Application No. 201710792463.X (dated Oct. 10, 2019).
Notice of Preliminary Rejection in Korean Application No. 10-2017-0109802 (dated May 28, 2020).
Notification of Reasons for Refusal in Japanese Patent Application No. 2016-181368 (dated Sep. 29, 2020).
Second Office Action in Chinese Application No. 201710792463.X (dated Jul. 29, 2020).
Notification of Reasons for Refusal in Japanese Patent Application No. 2016-250074 (dated Dec. 15, 2020).

* cited by examiner

| 100 μl | 21.8°C | EXCITATION A $\binom{20 \text{ kHz}}{200 \text{ W}}$ | EXCITATION B $\binom{40 \text{ kHz}}{600 \text{ W}}$ |
|---|---|---|---|
| LIQUID THICKNESS μm | 720 | 420 | 340 |
| LIQUID PROJECTION DIAMETER mm | 13.3 | 16.6 | 18.7 |
| | 2301 | 2302 | 2303 |

THREE-DIMENSIONAL MANUFACTURING APPARATUS, THREE-DIMENSIONAL MANUFACTURED OBJECT PRODUCING METHOD, AND CONTAINER FOR THREE-DIMENSIONAL MANUFACTURING APPARATUS

BACKGROUND OF THE INVENTION

Field of the Invention

The present invention relates to a three-dimensional manufacturing apparatus which produces a three-dimensional manufactured object by projecting an exposure image on a photocurable liquid resin material, a three-dimensional manufactured object producing method which produces the three-dimensional manufactured object, and a container which is used for the three-dimensional manufacturing apparatus.

Description of the Related Art

In recent years, expectations for a so-called three-dimensional printer are increasing. In particular, development of an apparatus which uses a method of producing a three-dimensional manufactured object by projecting an exposure image on a photocurable liquid resin material is vigorous.

For example, in Japanese Patent Application Laid-Open No. H05-96632, there is disclosed an apparatus which contains a photocurable resin solution in a container of which the upper surface is opened, irradiates light from above the free liquid surface of the photocurable resin solution, performs photocuring in the vicinity of the free liquid surface, and thus forms a resin cured layer. In the apparatus like this, after the resin cured layer is formed, a movable table for supporting the resin cured layer is lowered. Then, when the depth from the liquid surface of the photocurable resin solution to the resin cured layer reaches a predetermined depth, light is again irradiated, and the resin cured layer is laminated. Such processes are repeated to form a three-dimensional manufactured object.

In U.S. Patent Application Publication No. 2015/54198, there is disclosed an apparatus in which the bottom of a container filled with a liquid photocurable resin material has been made to be light transmissive, and which forms a resin cured layer of a desired shape by projecting an exposure image on a resin through the bottom of the container. In the apparatus like this, one layer of the resin cured layer is formed, a manufactured object is lifted, a liquid photocurable resin is introduced between the manufactured object and the bottom of the container for replenishment, and, when the replenishment is completed, a next exposure image is projected to laminate the resin cured layer. Then, such processes are repeated to form a three-dimensional manufactured object.

In the case of the apparatus disclosed in U.S. Patent Application Publication No. 2015/54198, since light is irradiated through the bottom of the container, there is an advantage that an optical exposure condition is not affected even if the liquid level of the resin fluctuates.

Incidentally, for the three-dimensional printer, a request for increasing manufacturing speed is increasing from the industrial world. Also for a method using the photocurable liquid resin material as a raw material, the relevant request is raising.

Generally, the thickness of a cured layer which is formed by irradiating light to a photocurable liquid resin material is about 0.02 mm to 0.2 mm per layer. In order to increase the three-dimensional manufacturing speed, it is important how quickly a preparing process for forming a next cured layer is completed after forming a previous cured layer. In other words, it is important how to replenish the liquid resin material for the next layer to a manufacturing region at high speed. This is because the photocurable liquid resin material generally has a high viscosity, so that it takes time for the relevant material to flow.

In particular, when a large-sized three-dimensional manufactured object is formed, since the area of the manufacturing region is increased, time required for replenishing the photocurable liquid resin material to form the next layer is prolonged. Besides, as the number of the layers to be laminated is increased, the number of times of the replenishment is increased accordingly, so that time required for completing the three-dimensional manufactured object is prolonged.

In the case of the apparatus disclosed in Japanese Patent Application Laid-Open No. H05-96632, in order to increase speed for replenishing the liquid resin material to the manufacturing region, ultrasonic vibration is applied to the liquid resin material to improve fluidity of the material. However, since the apparatus disclosed in Japanese Patent Application Laid-Open No. H05-96632 is an apparatus system which irradiates light from above the free liquid surface of the resin, a fluctuation in the liquid level tends to affect an optical exposure condition. Thus, if the fluidity of the liquid resin material is increased to shorten the replenishment time, a problem may occur in shape accuracy of the cured layer.

In the case of the apparatus disclosed in U.S. Patent Application Publication No. 2015/54198, as described above, since the light is irradiated through the bottom of the container, there is the advantage that the optical exposure condition is not affected even if the liquid level of the resin fluctuates.

On the other hand, when the cured layer is lifted for preparing to form the next layer, conductance is small because the space (distance) between the bottom of the container and the cured layer is narrow, so that there is a problem that it takes time to replenish the liquid resin material from the surroundings.

SUMMARY OF THE INVENTION

A three-dimensional manufacturing apparatus according to the present invention is characterized by comprising a container configured to hold a liquid photocurable resin, a base configured to support a solid manufactured object obtained by curing the liquid photocurable resin, a moving unit configured to move the base, and a light source unit configured to irradiate light for curing the liquid photocurable resin: and is characterized in that the container comprises a light transmission portion which is provided between the light source unit and the base, and is in contact with the liquid photocurable resin; and the three-dimensional manufacturing apparatus comprises a flow facilitating unit configured to facilitate a flow of the photocurable resin which is in contact with the light transmission portion, the flow being attended by the movement of the base.

Besides, a three-dimensional manufactured object producing method according to the present invention is characterized by comprising: curing a liquid photocurable resin by irradiating light of a light source unit to a part of the liquid photocurable resin through a light transmission portion; moving the cured photocurable resin in a direction away from the light source unit; and replenishing the liquid photocurable resin of which a flow has been facilitated, between the cured photocurable resin and the light transmission portion.

Further features of the present invention will become apparent from the following description of exemplary embodiments with reference to the attached drawings.

DESCRIPTION OF THE EMBODIMENTS

Hereinafter, preferred embodiments of the present invention will be described with reference to the attached drawings.

In the following description, a liquid photocurable resin which is not yet cured or solidified is referred to as a liquid photocurable resin. Besides, a solid manufactured object which is obtained by photo-curing a liquid photocurable resin is referred to as a three-dimensional manufactured object. Here, it is assumed that the three-dimensional manufactured object includes not only a finished or completed product, but also a semi-finished product in which layers up to the middle of all the layers have been laminated.

First Embodiment

Figure 1:
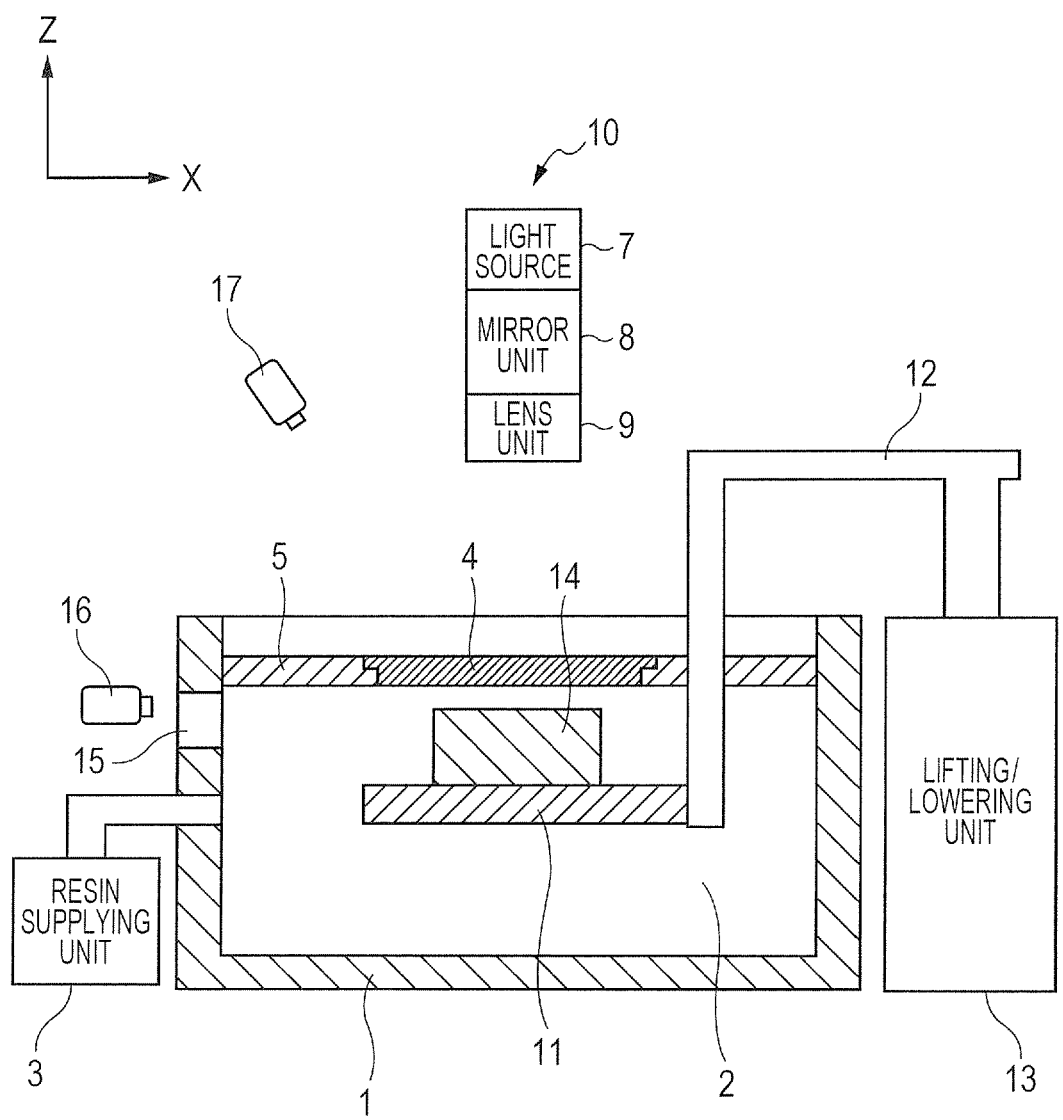
FIG. 1 is a cross-section diagram of a three-dimensional manufacturing apparatus according to a first embodiment.

FIG. 1 is a schematic cross-section diagram for describing a constitution of a three-dimensional manufacturing apparatus according to the first embodiment of the present invention.

(Constitution of Apparatus)

In FIG. 1, there are illustrated a container 1, a liquid photocurable resin 2, a resin supplying unit 3, a light transmission portion 4, a light shielding portion 5, a light source 7, a mirror unit 8, a lens unit 9, a light source unit 10, a base 11, a lifting/lowering arm 12, a lifting/lowering unit 13, a three-dimensional manufactured object 14, an observation portion 15, an infrared thermo-viewer 16, and an infrared thermometer 17.

The container 1, which is a container for holding the liquid photocurable resin 2, is formed of a material which blocks light of a wavelength region in which the liquid photocurable resin is cured or solidified.

The resin supplying unit 3 comprises a tank for storing the liquid photocurable resin and a pump, and supplies the liquid photocurable resin so that an appropriate amount of the liquid photocurable resin 2 is held in the container 1.

The liquid photocurable resin 2 is a liquid resin which is cured (solidified) when light of a specific wavelength region is irradiated. The liquid photocurable resin 2 is filled in the container 1 up to the lower surface of the light transmission portion 4 and the light shielding portion 5, and is held so as to prevent bubbles from entering. The light transmission portion 4 and the light shielding portion 5 together function as a lid of the container 1, and can be opened and closed. That is, also the transmission portion 4 and the light shielding portion 5 are included in the container 1.

The light transmission portion 4 is a portion through which light of the wavelength region in which the liquid photocurable resin 2 is solidified is transmitted, and is, for example, a glass plate. The light shielding portion 5 is a portion which is made of a member for blocking light of the wavelength region in which the liquid photocurable resin 2 is solidified. In the present embodiment, in the portion which functions as the lid, the light transmission portion 4 is provided at a portion which serves as an optical path between the light source unit 10 and the base 11, and the light shielding portion 5 is formed in its peripheral region. The light shielding portion 5 is desirably formed of a material having high heat insulating properties. This is because an increase in temperature of the light shielding portion 5 can be suppressed when the light transmission portion 4 is heated.

At the light transmission portion 4, a later-described heating source is provided.

The light source 7, the mirror unit 8 and the lens unit 9 together constitute the light source unit 10 for irradiating the liquid photocurable resin with light corresponding to the shape of a three-dimensional model to be manufactured. The light source 7 is a light source which irradiates light of the wavelength region in which the liquid photocurable resin is solidified. For example, when a material which is sensitive to ultraviolet light is used as the photocurable resin, an ultraviolet light source such as a He—Cd laser, an Ar laser or the like is used. The mirror unit 8 is a unit which modulates the light irradiated from the light source 7 in correspondence with the shape of the three-dimensional model to be manufactured, and a device in which micro mirror devices are arranged in an array is used for the mirror unit. The lens unit 9 is a lens for converging the modulated light onto the liquid photocurable resin 2 at a predetermined position under the light transmission portion 4. The liquid photocurable resin 2 at the predetermined position is cured when it is irradiated with the converged light of a sufficient intensity.

In order to secure accuracy of the shape of a cured object, it is desirable to set the focal position of a condensing lens to the vicinity of the light transmission portion. However, if the focal position is too close to the light transmission portion, there is a possibility that the cured resin adheres to the light transmission portion 4. Therefore, it is desirable to set the focal position of the lens unit 9 to a position 60 μm to 110 μm below the lower surface of the light transmission portion 4.

Incidentally, as long as the light source unit 10 has a function for modulating the light of the wavelength region in which the liquid photocurable resin is solidified, in correspondence with the shape of the three-dimensional manufactured object to be manufactured, and converging the modulated light in a predetermined position, the light source unit is not limited to that exemplified as above. For example, it may be possible to use a combination of an ultraviolet light source and a liquid crystal shutter, a semiconductor laser diode array, a scanning mirror, an imaging mirror, or the like.

The base 11, which is a base (table) for supporting the three-dimensional manufactured object 14 placed on its upper surface, is connected to the lifting/lowering unit 13 via the lifting/lowering arm 12. The lifting/lowering unit 13 is a mechanism which is used to adjust the height of the base 11 by moving the lifting/lowering arm 12 up and down, and is a moving unit for moving the base.

The observation portion 15 is a portion (window) which is used to observe the interior of the container 1 from the outside thereof, and the infrared thermo-viewer 16 observes a temperature of the liquid photocurable resin in the container through the observation portion 15. In particular, a vertical-direction temperature distribution in the liquid photocurable resin existing between the light transmission portion 4 and the base 11 is measured.

The infrared thermometer 17 is a thermometer which measures a temperature of the light transmission portion 4 in a non-contact manner.

(Light Transmission Portion)

Next, the light transmission portion 4 which is provided with the heating source will be described in detail.

Figure 2A:
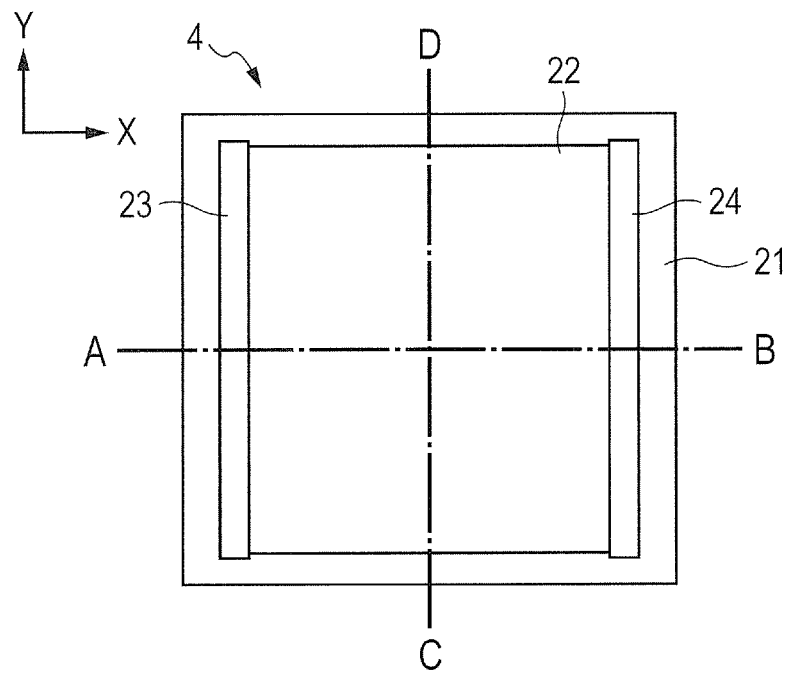
FIG. 2A is a plan view of a light transmission portion provided with a heating source.
Figure 2B:
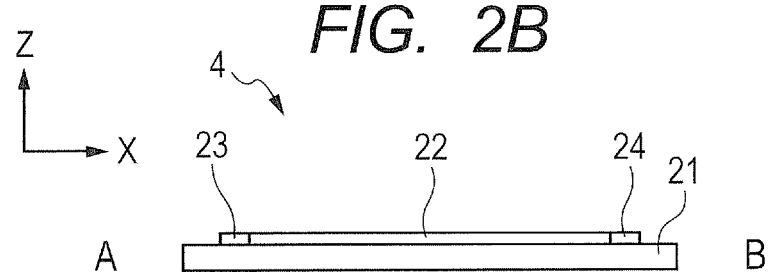
FIG. 2B is a cross-section diagram thereof.
Figure 2C:
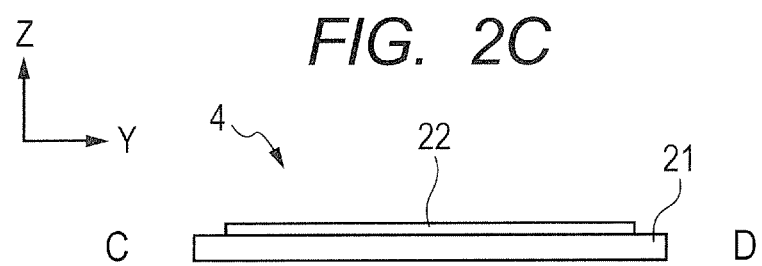
FIG. 2C is another cross-section diagram thereof.

FIG. 2A is a plan view of the light transmission portion 4, FIG. 2B is a cross-section diagram of the light transmission portion 4 taken along a line connecting points A and B in plan view, and FIG. 2C is a cross-section diagram of the light transmission portion 4 taken along a line connecting points C and D in plan view.

In the drawing, there are illustrated a substrate 21, a transparent heater 22, and electrodes 23 and 24. When these elements are incorporated in the three-dimensional manufacturing apparatus, the lower surface of the substrate 21 is oriented to contact with the liquid photocurable resin.

The substrate 21 has high light transmittance in the wavelength region in which the liquid photocurable resin is solidified, and a material capable of securing intensity necessary for supporting the transparent heater and the electrode is suitable for the substrate. More specifically, a quartz glass plate having the thickness equal to or less than 2.0 mm is used.

The transparent heater 22, which is light transmissive, is a resistor which generates heat when energization is performed between the electrodes 23 and 24. As illustrated in FIG. 2A, the transparent heater 22 has a rectangular shape as a heat generating unit capable of generating heat. Light which is irradiated from the light source unit 10 and has the wavelength region in which the liquid photocurable resin is solidified passes through the transparent heater 22 and the substrate 21, and is irradiated to the liquid photocurable resin. The transparent heater 22 may be anything as long as it is excellent in the transmittance of light in the wavelength region in which the liquid photocurable resin is solidified and has an appropriate electric resistance. For example, the transparent heater is made of a thin film of a material selected from tin-doped indium oxide (ITO), fluorine-doped tin oxide (FTO), antimony-doped indium oxide (ATO) or the like which is an oxide material. Of course, another material may be used.

The electrode 23 and the electrode 24 are electrodes which are used to energize the transparent heater 22. For example, a silver paste or a silver wire is used for the electrode, but another electrode may be used.

As described later, by energizing the transparent heater 22 via the electrode 23 and the electrode 24, the transparent heater 22 is caused to generate heat, and the liquid photocurable resin located immediately under the substrate 21 is locally heated to decrease the viscosity, so that it is possible to promptly flow the liquid photocurable resin. That is, the transparent heater (heat generating unit) 22 functions as a flow facilitating unit which facilitates the flow of the photocurable resin 2 which is in contact with the light transmission portion 4, the flow being attended by the movement of the base 11.

(Controlling System)

Next, a controlling system of the three-dimensional manufacturing apparatus illustrated in FIG. 1 will be described.

Figure 3:
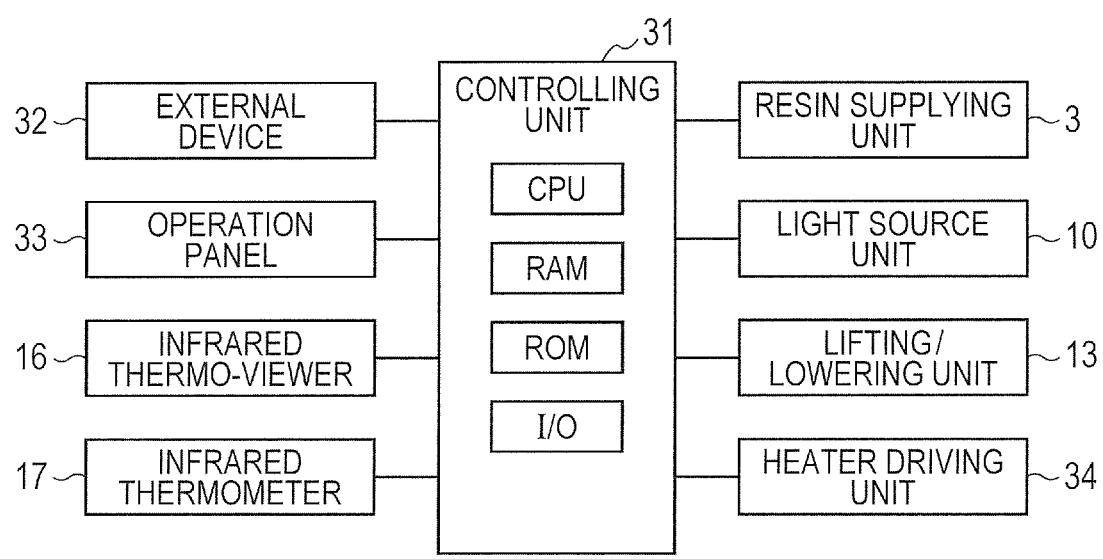
FIG. 3 is a block diagram of the three-dimensional manufacturing apparatus according to the first embodiment.

FIG. 3 is a block diagram of the three-dimensional manufacturing apparatus which comprises a controlling unit 31, an external device 32, an operation panel 33, the infrared thermo-viewer 16, the infrared thermometer 17, the resin supplying unit 3, the light source unit 10, the lifting/lowering unit 13, and a heater driving unit 34.

The controlling unit 31 comprises a CPU (central processing unit), a ROM (read only memory) which is a nonvolatile memory of storing a control program and a numerical table for control, a RAM (random access memory) which is a volatile memory to be used for calculations and the like, an I/O (input/output) port which is used to communicate with the inside and the outside of the apparatus, and the like. Incidentally, a program for controlling the basic operation of the three-dimensional manufacturing apparatus is stored in the ROM.

From the external device 32, shape data of the three-dimensional manufactured object is input to the controlling unit 31 of the three-dimensional manufacturing apparatus via the I/O port.

The operation panel 33 comprises an inputting unit for causing an operator of the three-dimensional manufacturing apparatus to give instructions to the apparatus, and a displaying unit for displaying information to the operator. The inputting unit includes a keyboard and operation buttons. The displaying unit includes a display panel for displaying operation status and the like of the three-dimensional manufacturing apparatus.

The heater driving unit 34 is a driving circuit which drives a heating source provided at the light transmission portion 4, and is operated in response to an instruction from the controlling unit 31.

The infrared thermo-viewer 16 measures the temperature distribution of the liquid photocurable resin existing between the light transmission portion 4 and the base 11 in the container 1, and outputs a measurement result to the controlling unit 31.

The infrared thermometer 17 measures the temperature of the light transmission portion 4, and outputs a measurement result to the controlling unit 31.

The controlling unit 31 mainly controls the resin supplying unit 3, the light source unit 10, the lifting/lowering unit 13 and the heater driving unit 34 to perform a three-dimensional manufacturing process.

(Three-Dimensional Manufacturing Process)

Next, the three-dimensional manufacturing process using the above three-dimensional manufacturing apparatus will be described.

Figure 4:
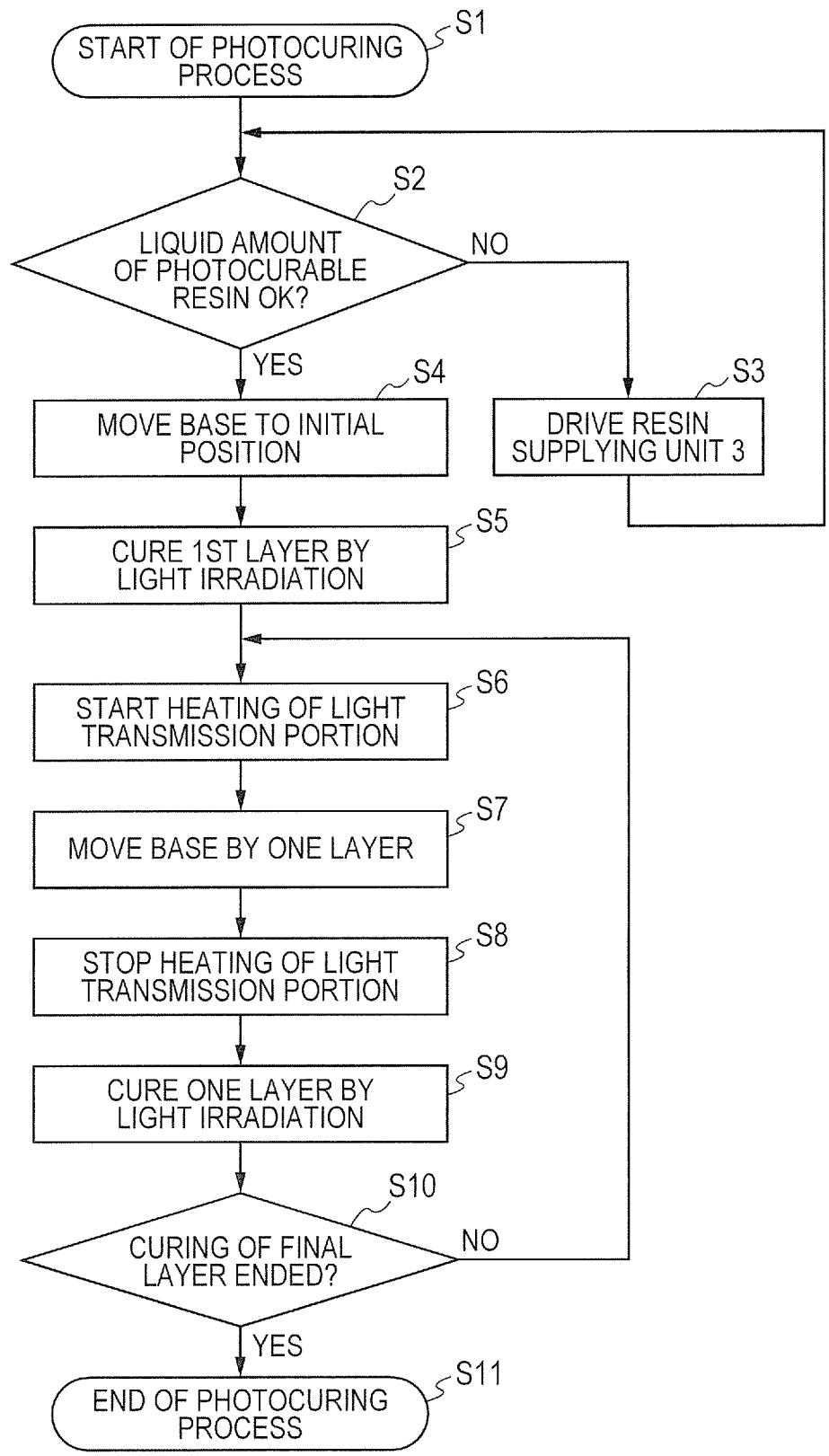
FIG. 4 is a flow chart for describing a three-dimensional manufacturing process.

FIG. 4 is a flow chart for describing the three-dimensional manufacturing process.

First, the controlling unit 31 starts a photocuring process (S1).

The controlling unit 31 confirms whether or not a predetermined amount of the liquid photocurable resin is contained in the container 1, by using a not-illustrated sensor (S2).

When the liquid photocurable resin is insufficient, the resin supplying unit 3 is driven and operated to fill the inside of the container 1 with the predetermined amount of the liquid photocurable resin 2 (S3).

Next, the controlling unit 31 operates the lifting/lowering unit 13 to set the position (initial position) of the base 11 so that the height of the upper surface of the base 11 is slightly lower than the focal position of the light source unit 10. For example, if it is assumed that the thickness of a one layer at a time when the three-dimensional manufactured object is formed is 40 µm, the upper surface of the base 11 is adjusted to be positioned 10 µm to 30 µm below the focal position (S4).

Based on three-dimensional manufacturing model shape data input from the external device 32, the controlling unit 31 generates shape data (slice data) of each layer used in a lamination manufacturing process, or receives the slice data generated by the external device 32.

Then, the controlling unit 31 drives the light source unit 10 to irradiate light, and irradiates the liquid photocurable resin 2 with light modulated based on the first layer shape data (slice data) of the three-dimensional manufactured object. Then, the liquid photocurable resin 2 at the irradiated site is cured, and the first layer portion of the three-dimensional manufactured object is formed on the base 11 (S5).

Next, as preparation for forming the second layer, the controlling unit 31 operates the heater driving unit 34 to increase the temperature of the light transmission portion 4 (S6).

The controlling unit 31 controls the heater driving unit 34 while referring to temperature information of the light transmission portion 4 input from the infrared thermometer 17. When the infrared thermometer 17 is not used, the controlling unit 31 may operate the heater driving unit 34 by timer control in accordance with a preset program.

Further, instead of the temperature information of the light transmission portion 4 input from the infrared thermometer 17, the controlling unit 31 may control the heater driving unit 34 based on temperature information of the liquid photocurable resin input from the infrared thermoviewer 16. Besides, the controlling unit 31 may control the heater driving unit 34, based on both the temperature information of the light transmission portion 4 input from the infrared thermometer 17 and the temperature information of the liquid photocurable resin input from the infrared thermoviewer 16.

It is preferable that the controlling unit 31 controls the heater driving unit 34 by appropriately changing a target temperature in accordance with a kind of liquid photocurable resin to be used, a heatproof temperature, a temperature characteristic of viscosity, and the like.

Figure 5:
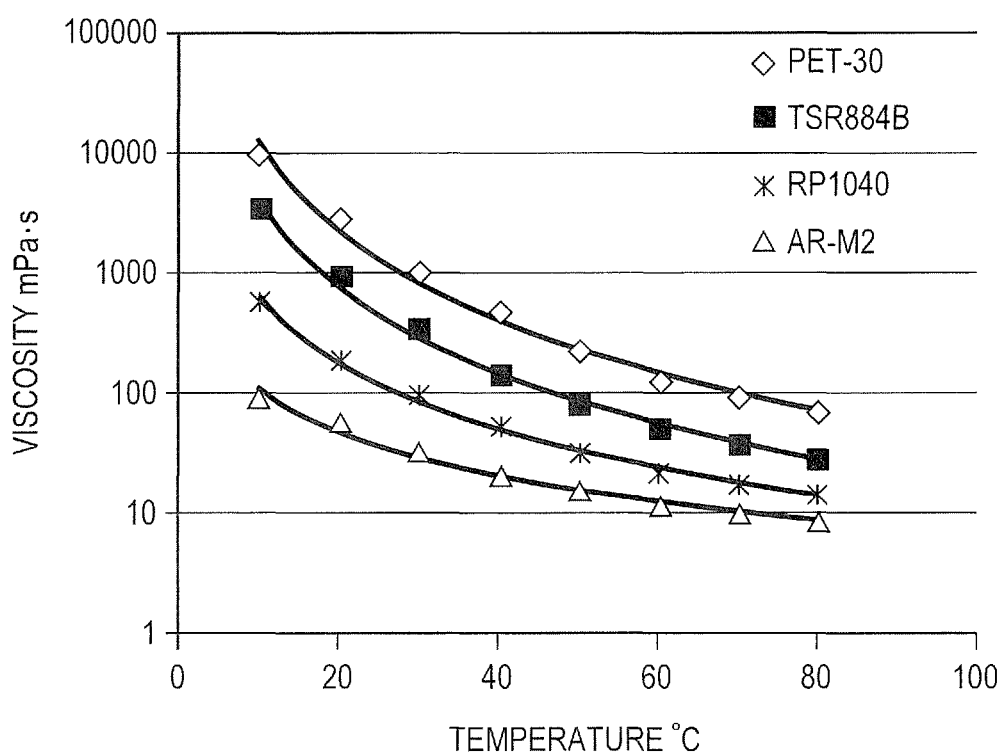
FIG. 5 is a graph for describing viscosity characteristics of a liquid photocurable resin with respect to temperatures.

A graph exemplarily illustrated in FIG. 5 is a graph which indicates viscosity characteristics with respect to the temperatures of four kinds of liquid photocurable resins. As indicated by the graph, the viscosity of the liquid photocurable resin generally tends to decrease as the temperature increases. Therefore, it may be considered that it is better to decrease the viscosity by increasing the temperature as high as possible. However, the optimum temperature should be selected considering the following conditions.

First, it is desirable to take into consideration a difference in the heatproof temperature characteristics depending on the kind of liquid photocurable resin.

Besides, the target for which the viscosity is to be decreased by increasing the temperature is only the liquid photocurable resin to be replenished between the light transmission portion 4 and the three-dimensional manufactured object to form the next layer. Namely, with respect to other liquid photocurable resins, it is desirable not to increase the temperature to prevent characteristic deterioration.

Besides, in a case where the temperature of the liquid photocurable resin is high at the time when the resin is cured by irradiating light, if the resin is taken out to the room temperature environment after the manufacture, the resin deforms and the shape accuracy decreases. Therefore, it is desirable that the temperature of the liquid photocurable resin in such a region is not too high at the time point when the replenishment is completed between the light transmission portion 4 and the three-dimensional manufactured object.

Further, in order to shorten the time required for replenishing the liquid photocurable resin, the viscosity of the liquid photocurable resin is preferably set to be equal to or less than 700 mPa·s, more preferably equal to or less than 100 mPa·s.

Taking these various conditions into consideration, it is preferable that the temperature of the light transmission portion 4 or the temperature of the liquid photocurable resin heated by the light transmission portion 4 is controlled so as to be in the range from 40° C. to 80° C.

The controlling unit 31 operates the lifting/lowering unit 13 to lower the base 11 on which the first layer portion has been formed, by 40 μm (corresponding to one layer) (S7). Into the space between the lowered base 11 and the light transmission portion 4, the liquid photocurable resin 2 flows from the periphery.

According to the present embodiment, since the liquid photocurable resin 2 which is in contact with the light transmission portion 4 is heated by the light transmission portion 4, the viscosity of the liquid photocurable resin 2 decreases, and the flow resistance decreases. Therefore, the inflow speed of the liquid photocurable resin 2 increases, so that it is possible to shorten the time required for a preparing step of forming the second layer. That is, when the three-dimensional manufactured object is produced, the light source unit is caused to irradiate light to partially cure the liquid photocurable resin, and then the liquid photocurable resin in the vicinity of the light transmission portion is heated by the light transmission portion to decrease the viscosity, thereby achieving high-speed replenishment.

The controlling unit 31 controls the heater driving unit 34 so as to stop heat generation of the light transmission portion 4, before the replenishment of the photocurable resin is completed (S8). In other words, the controlling unit controls the heater driving unit 34 so that the heater provided at the light transmission portion 4 stops generating heat a predetermined time before starting light irradiation for forming the next layer. This is because, as already described, it is desirable that the temperature of the liquid photocurable resin at the time when the resin is cured by the light irradiation is not too high. For example, the controlling unit 31 stops the heat generation of the heater provided at the light transmission portion 4 one minute before the light irradiation for forming the next layer is started.

At the timing when the inflow, i.e., the replenishment, of the liquid photocurable resin 2 is completed, the controlling unit 31 drives the light source unit 10 to irradiate ultraviolet light modulated based on the shape data of the second layer of the three-dimensional manufactured object. Then, the liquid photocurable resin 2 at the irradiated site is cured, and the portion of the second layer (one layer) is laminated and formed on the first layer of the three-dimensional manufactured object (S9).

Thereafter, the steps from (S6) to (S9) are repeated until the formation of the three-dimensional manufactured object with the desired shape is completed, and then the third layer, the fourth layer, . . . are sequentially laminated.

When the formation of the final layer is completed or ended (S10), the photocuring process is completed (S11).

As described above, according to the present embodiment, the liquid photocurable resin in the vicinity of the light transmission portion is heated by increasing the temperature of the light transmission portion by using the transparent heater before the next layer is formed, and the liquid photocurable resin is replenished into the manufacturing region, so that it is possible to form the three-dimensional manufactured object in a short time.

According to the present embodiment, the flow resistance of the liquid photocurable resin 2 decreases as compared with the three-dimensional manufacturing apparatus of the light transmission portion having no heat generating mechanism, and it is confirmed that the inflow speed of the solution of the photocurable resin at the time when the base is lowered is about 12% to 40% faster. For example, when a 3-dimensional object having 750 layers, 5 cm×5 cm bottom and about 30 mm height is to be formed, the time required for the three-dimensional manufacture including the photocuring process can be greatly shortened.

According to the present embodiment, the liquid photocurable resin is heated only for a short period of time when the resin is replenished to the manufacturing region, and the increase in temperature is controlled, so that the liquid photocurable resin hardly deteriorates. Besides, since the temperature of the replenished liquid photocurable resin is not too high, it is possible to prevent the shape accuracy from being lowered due to deformation when the resin is taken out to the room temperature environment after the manufacture by the photocuring.

(Another Form of Light Transmission Portion)

The light transmission portion is not limited to the form described with reference to FIGS. 2A to 2C, and another form may be used.

Figure 6A:
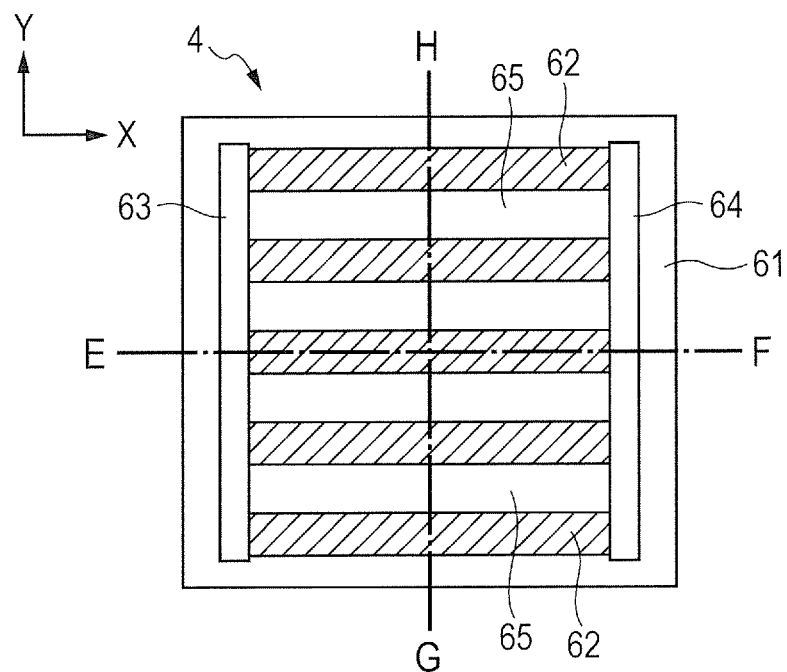
FIG. 6A is a plan view of the light transmission portion provided with the heating source.
Figure 6B:
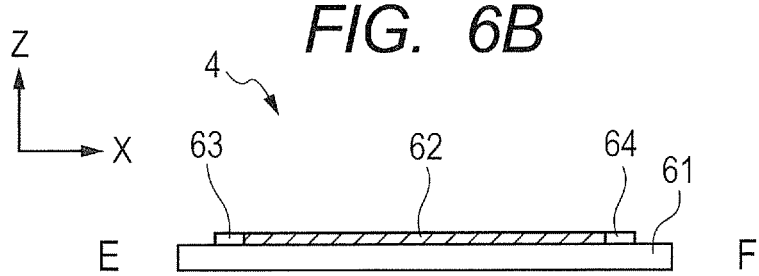
FIG. 6B is a cross-section diagram thereof.
Figure 6C:
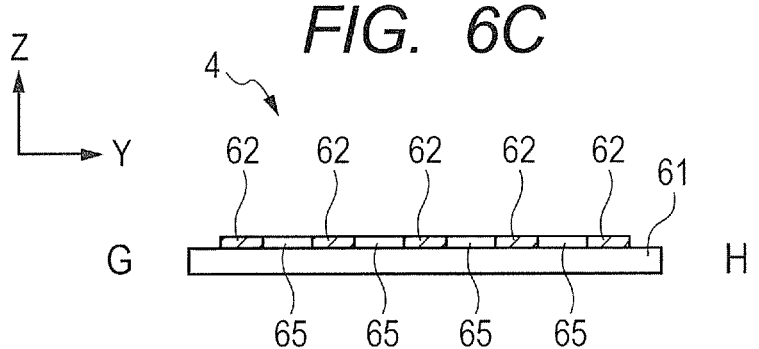
FIG. 6C is another cross-section diagram thereof.

FIG. 6A is a plan view of another form which can be used as the light transmission portion 4, FIG. 6B is a cross-section diagram of the light transmission portion 4 taken along a line connecting points E and F in plan view, and FIG. 6C is a cross-section diagram of the light transmission portion 4 taken along a line connecting points G and H in plan view.

In the drawing, there are illustrated a substrate 61, striped transparent heaters 62, electrodes 63 and 64, and transparent insulators 65. When the light transmission portion is incorporated in the three-dimensional manufacturing apparatus, the lower surface of the substrate is in a direction being in contact with the liquid photocurable resin.

The substrate 61 has high light transmittance in the wavelength region in which the liquid photocurable resin is solidified, and a material capable of securing intensity necessary for supporting the transparent heaters and the electrodes is suitable for the substrate. More specifically, a quartz glass plate is used.

The difference from the embodiment described with reference to FIGS. 2A to 2C is that one rectangular heater is not provided on the substrate, but the striped transparent heaters and the transparent insulators are alternately arranged. In an example of FIG. 6A, for convenience of illustration, the five striped transparent heaters 62 are arranged with the four transparent insulators 65 sandwiched therebetween. However, the number of the striped transparent heaters is not limited to five, and can be appropriately changed. For example, the striped transparent heater 62 may be set to have a width of 0.5 mm to 2.0 mm and a pitch of 1.5 mm to 4.0 mm, and a large number of heaters may be arranged in parallel. In this case, the thickness of the striped transparent heater 62 is, for example, 50 μm to 200 μm.

In the embodiment described with reference to FIGS. 2A to 2C, if the film thickness of the transparent heater is not uniform, there is a possibility that the resistance value varies within the plane and the heat generation may not be uniform. However, in the example described with reference to FIGS. 6A to 6C, the shape and the number of the stripes are appropriately designed, so that it is possible to stabilize the uniformity of heat generation.

The striped transparent heater 62 is a heater which is light transmissive and generates heat when energized. Any material may be used as long as it is excellent in light transmittance in the wavelength region in which the liquid photocurable resin is solidified and has a suitable energization resistance. For example, the heater is constituted by patterning a thin film of a material selected from tin-doped indium oxide (ITO), fluorine-doped tin oxide (FTO), antimony-doped indium oxide (ATO) and the like which are oxide materials. However, another material may be used.

If the optical path of the irradiation light is disturbed due to the existence of the striped transparent heater 62, distortion occurs in the optical image, so that there is a fear that it interferes with the manufacture of three-dimensional shape. Therefore, in the present embodiment, the transparent insulators 65 of which the refractive index is similar to that of the striped transparent heater 62 are arranged around the striped transparent heater 62 to decrease the distortion of the optical image caused by refraction. The transparent insulator 65 can be formed of, for example, a photocurable resin.

The light having the wavelength region in which the liquid photocurable resin is solidified is generated from the light source unit 10, transmitted through the striped transparent heater 62 and the substrate 61 or transmitted through the transparent insulator 65 and the substrate 61, and then irradiated to the liquid photocurable resin.

The electrode 63 and the electrode 64 are electrodes which electrically connect and energize the striped transparent heaters 62 in parallel. For example, a silver paste or a silver wire is used for the electrode, but another material may be used.

As well as the embodiment described with reference to FIGS. 2A to 2C, heat is generated by energizing the striped transparent heater 62 via the electrode 63 and the electrode 64, the liquid photocurable resin located immediately under the substrate 61 is heated to decrease the viscosity thereof, so that it is possible to promptly replenish the resin to the manufacturing region.

(Still Another Form of Light Transmission Portion)

Further, the light transmission portion may have still another form.

Figure 7A:
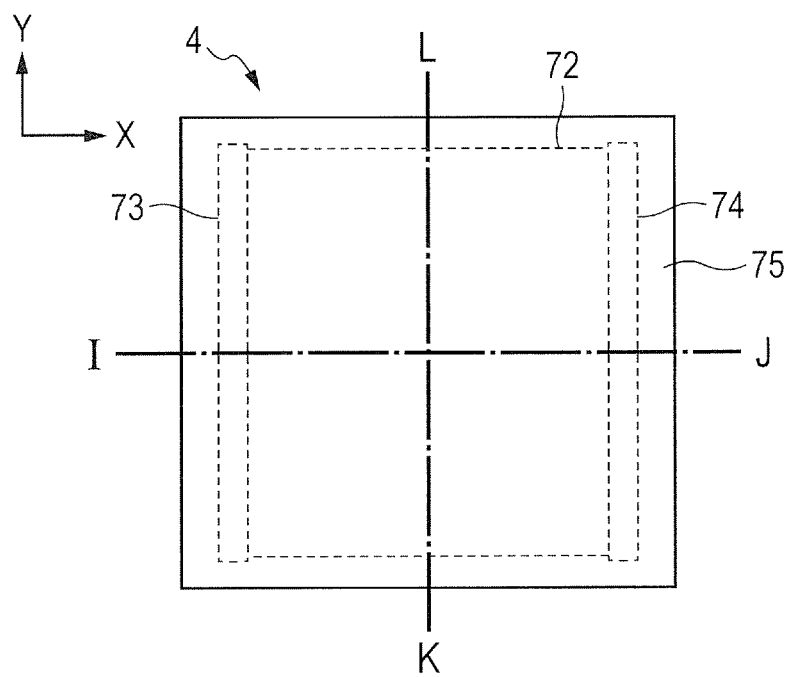
FIG. 7A is a plan view of the light transmission portion provided with the heating source.
Figure 7B:
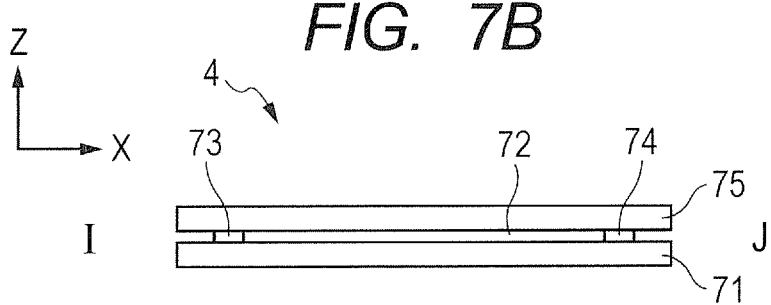
FIG. 7B is a cross-section diagram thereof.
Figure 7C:
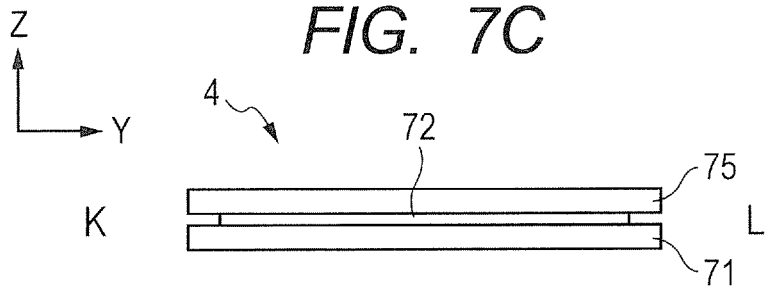
FIG. 7C is another cross-section diagram thereof.

FIG. 7A is a plan view of another form which can be used as the light transmission portion 4. FIG. 7B is a cross-section diagram of the light transmission portion 4 taken along the line connecting points I and J in plan view, and FIG. 7C is a cross-section diagram of the light transmission portion 4 taken along the line connecting points K and L in plan view.

In the drawing, there are illustrated a lower substrate 71, a transparent heater 72, electrodes 73 and 74, and an upper substrate 75. When the light transmission portion is incorporated in the three-dimensional manufacturing apparatus, the lower surface of the lower substrate 71 is in a direction being in contact with the liquid photocurable resin.

The lower substrate 71 and the upper substrate 75 are preferably materials which have high light transmittance in the wavelength region in which the liquid photocurable resin is solidified and which can secure intensity necessary for supporting the transparent heater and the electrodes. More specifically, a quartz glass plate is used.

The difference from the embodiment described with reference to FIGS. 2A to 2C is that the transparent heater 72 is disposed so as to be sandwiched by the lower substrate 71 and the upper substrate 75.

In the embodiment described with reference to FIGS. 2A to 2C, when a difference between thermal expansion coefficients of the transparent heater and the substrate is large, warpage or deformation occurs in the light transmission portion, so that there is a possibility that the optical path of the irradiation light is disturbed. In the example illustrated in FIGS. 7A to 7C, it is possible to decrease warpage by sandwiching the transparent heater 72 between the lower substrate 71 and the upper substrate 75.

The light having wavelength region in which the liquid photocurable resin is solidified is generated from the light source unit 10, transmitted through the upper substrate 75, the transparent heater 72 and the lower substrate 71, and is irradiated to the liquid photocurable resin.

The electrode 73 and the electrode 74 are electrodes which energize the transparent heater 72, for example, a silver paste or a silver wire is used, but another electrode may be used.

As well as the embodiment described with reference to FIGS. 2A to 2C, it is possible to promptly replenish the liquid photocurable resin to the manufacturing region by energizing the transparent heater 72 via the electrode 73 and the electrode 74 to generate heat and thus heating the liquid photocurable resin located immediately under the lower substrate 71 to decrease the viscosity thereof.

(Still Another Form of Light Transmission Portion)

Further, the light transmission portion may have still another form.

Figure 8A:
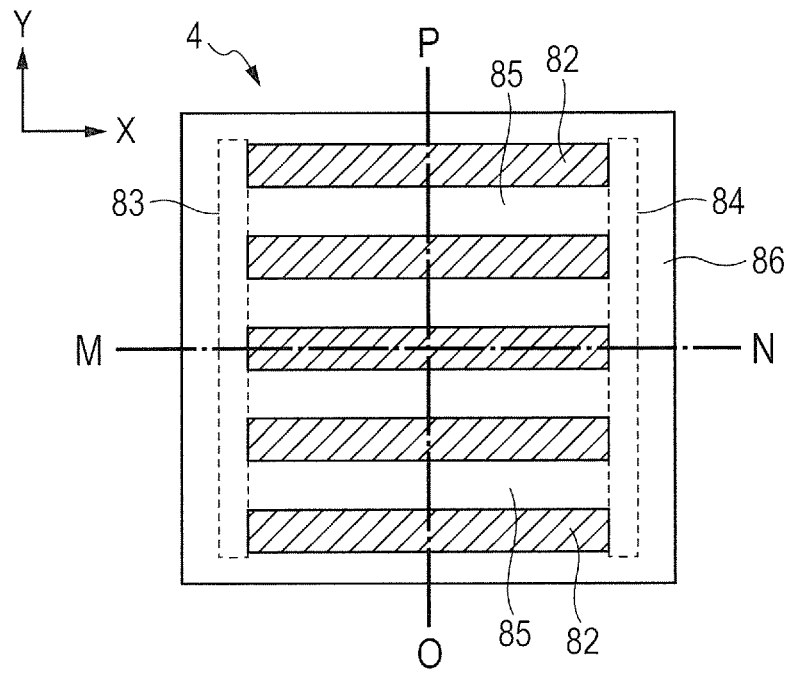
FIG. 8A is a plan view of the light transmission portion provided with the heating source.
Figure 8B:
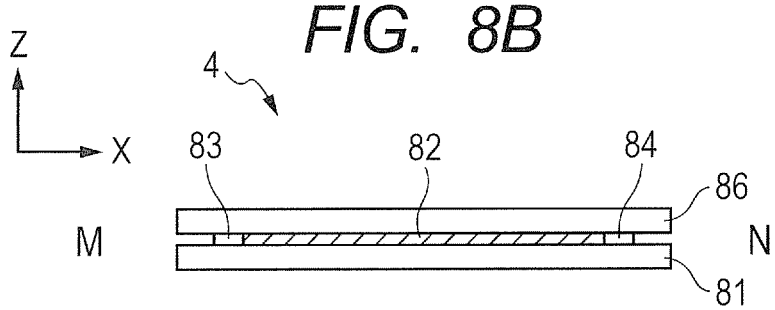
FIG. 8B is a cross-section diagram thereof.
Figure 8C:
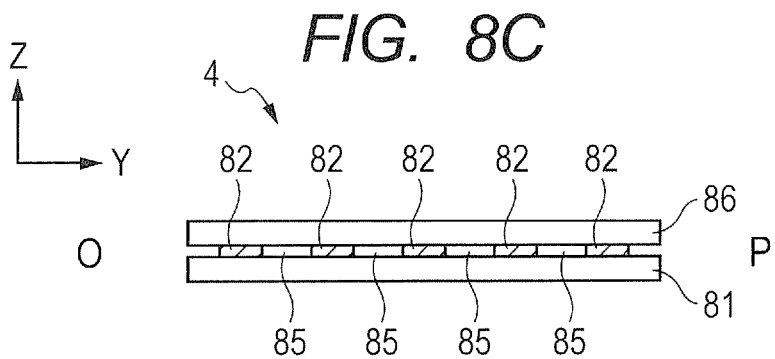
FIG. 8C is another cross-section diagram thereof.

FIG. 8A is a plan view of another form which can be used as the light transmission portion 4. FIG. 8B is a cross-section diagram of the light transmission portion 4 taken along the line connecting points M and N in plan view, and FIG. 8C is a cross-section diagram of the light transmission portion 4 taken along the line connecting points O and P in plan view.

In the drawing, there are illustrated a lower substrate 81, striped transparent heaters 82, electrodes 83 and 84, transparent insulators 85, and an upper substrate 86. When the light transmission portion is incorporated in the three-dimensional manufacturing apparatus, the lower surface of the lower substrate 81 is in a direction being in contact with the liquid photocurable resin.

The lower substrate 81 and the upper substrate 86 are preferably materials which have high light transmittance in the wavelength region in which the liquid photocurable resin is solidified and which can secure intensity necessary for supporting the transparent heater and the electrode. More specifically, a quartz glass plate is used.

The difference from the embodiment described with reference to FIGS. 6A to 6C is that the striped transparent heater 82 and the transparent insulator 85 are disposed so as to be sandwiched by the lower substrate 81 and the upper substrate 86.

In the embodiment described with reference to FIGS. 6A to 6C, when the difference between the thermal expansion coefficients of the striped transparent heater and the substrate is large, the warpage or the deformation occurs in the light transmission portion, so that there is the possibility that the optical path of the irradiation light is disturbed. However, in the example illustrated in FIGS. 8A to 8C, it is possible to decrease the warpage by sandwiching the transparent heater 82 between the lower substrate 81 and the upper substrate 86.

The light having the wavelength region in which the liquid photocurable resin is solidified is generated from the light source unit 10, transmitted through the upper substrate 86, the striped transparent heater 82 and the lower substrate 81 or through the upper substrate 86, the transparent insulator 85 and the lower substrate 81, and irradiated to the liquid photocurable resin.

The electrode 83 and the electrode 84 are electrodes which electrically connect the striped transparent heaters 82 in parallel, and, for example, a silver paste or a silver wire is used, but another electrode may be used.

As well as the embodiment described with reference to FIGS. 6A to 6C, it is possible to promptly replenish the liquid photocurable resin to the manufacturing region by energizing the striped transparent heater 82 via the electrode 83 and the electrode 84 to generate heat and thus heating the liquid photocurable resin located immediately under the lower substrate 81 to decrease the viscosity thereof.

Second Embodiment

Figure 9A:
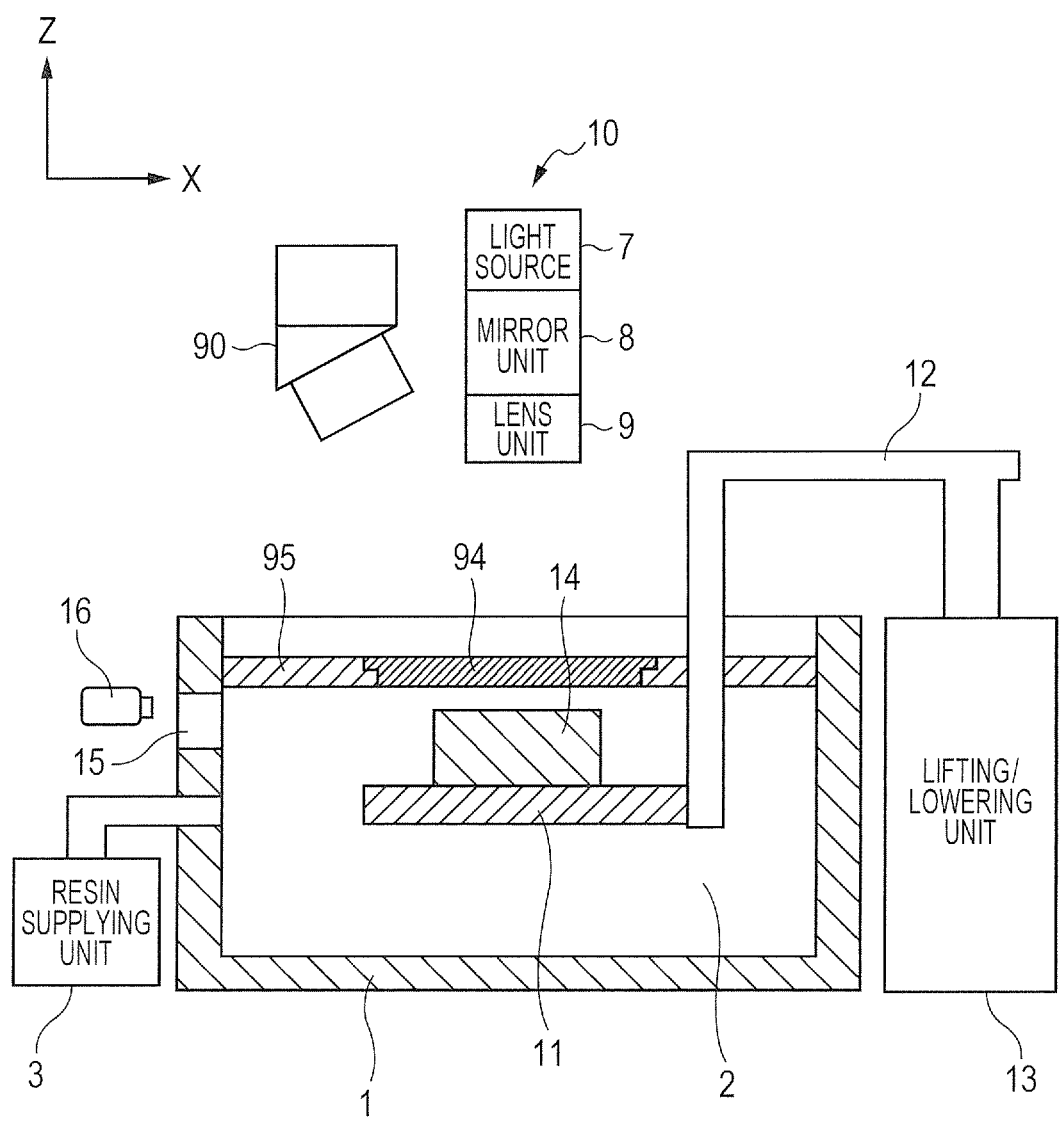
FIG. 9A is a cross-section diagram of the three-dimensional manufacturing apparatus according to a second embodiment.
Figure 9B:
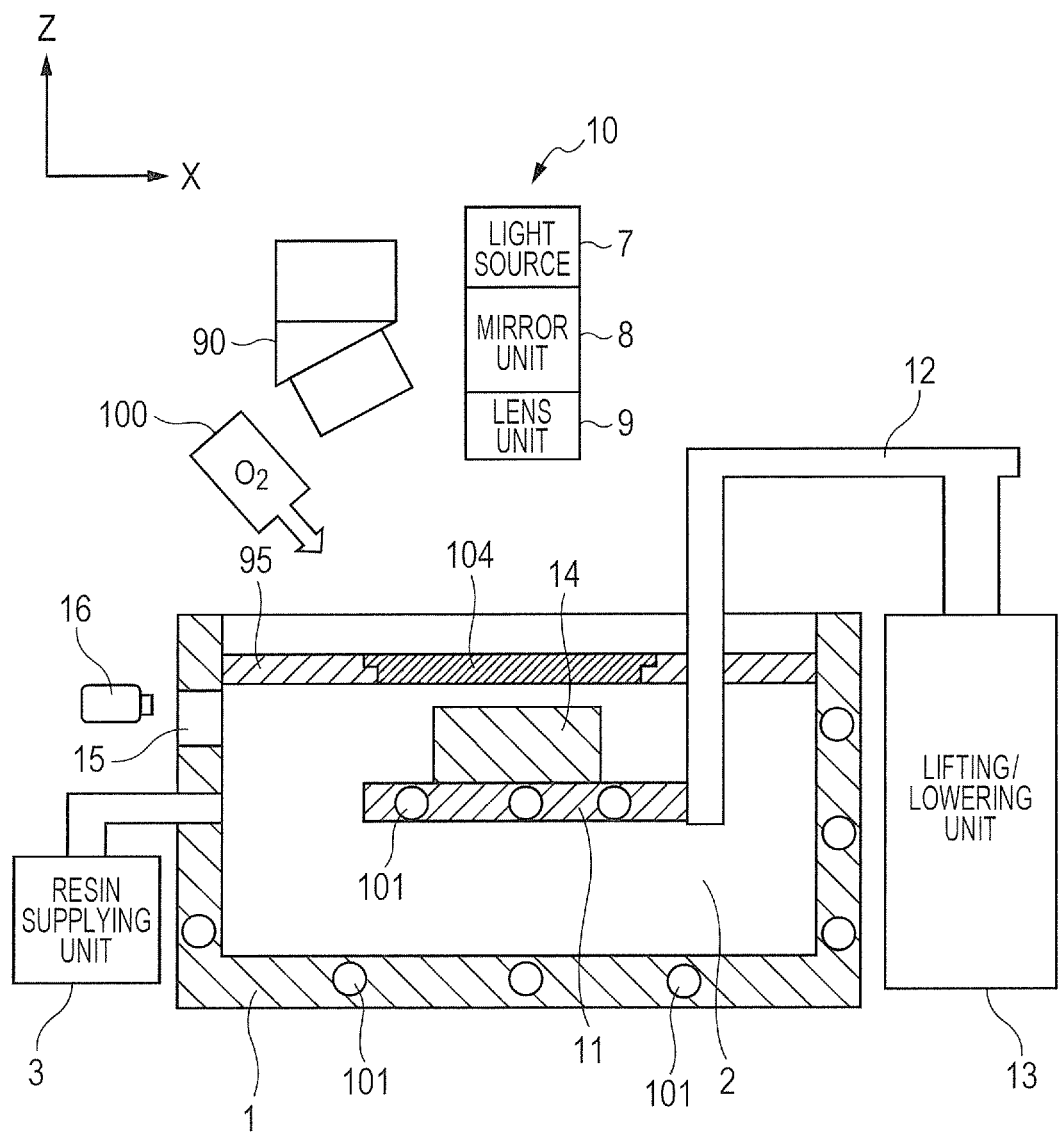
FIG. 9B is a cross-section diagram of the three-dimensional manufacturing apparatus according to a third embodiment.
Figure 9C:
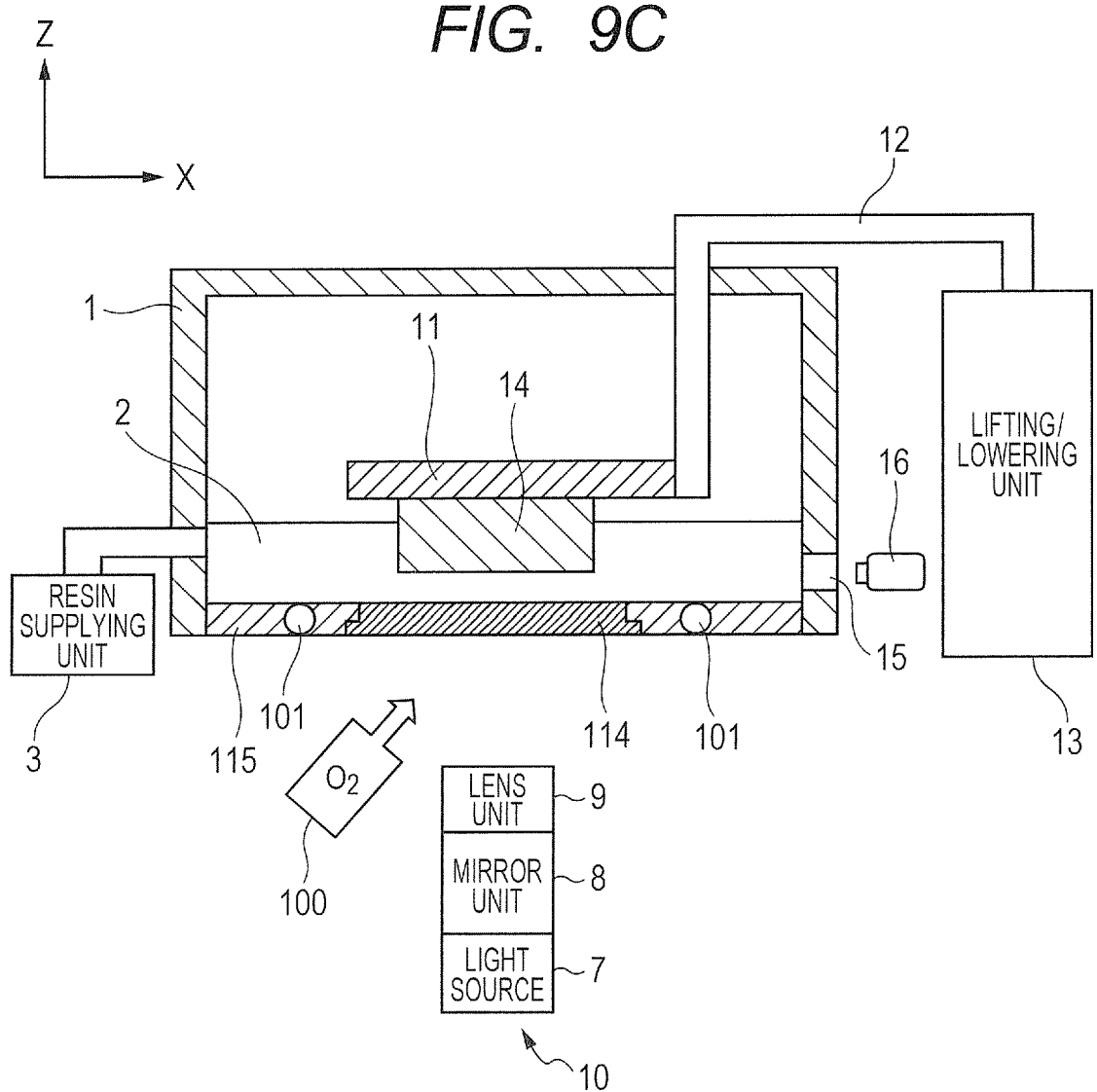
FIG. 9C is a cross-section diagram of the three-dimensional manufacturing apparatus according to a fourth embodiment.

FIGS. 9A to 9C are schematic cross-section diagrams for describing constitutions of the three-dimensional manufacturing apparatus according to the second embodiment of the present invention.

The apparatus of the first embodiment heats the light transmission portion by the transparent heater of generating heat by energization. However, the apparatus of the second embodiment is different from the apparatus of the first embodiment in which the light transmission portion is heated by an infrared heating device.

(Constitution of Apparatus)

In FIGS. 9A to 9C, there are illustrated the container 1, the liquid photocurable resin 2, the resin supplying unit 3, the light source 7, the mirror unit 8, the lens unit 9, the light source unit 10, the base 11, the lifting/lowering arm 12, the lifting/lowering unit 13, three-dimensional manufactured object 14, the observation portion 15, and the infrared thermo-viewer 16.

Since the above constituent elements are the same as those of the first embodiment described with reference to FIG. 1, the detailed descriptions thereof are omitted.

In FIGS. 9A and 9B, there are illustrated an infrared light source 90, a light transmission portion 94 and a reflecting portion 95.

The infrared light source 90 is a light source which can irradiate infrared light to the light transmission portion 94. The operation of the infrared light source 90 is controlled by a not-illustrated controlling unit, and the infrared light including light having a wavelength of, for example, 860 nm is irradiated at appropriate timing.

The light transmission portion 94 is a portion (window) which transmits light of the wavelength region for solidifying the liquid photocurable resin 2 irradiated by the light source 7 and absorbs the infrared light irradiated by the infrared light source 90. As a material of the light transmission portion 94, a plate which is made of a resin material such as polycarbonate, acrylic or the like, which has high transmittance of short wavelength light and a high absorptivity of the infrared light suitable for solidifying the liquid photocurable resin 2 is suitable.

The reflecting portion 95 is a portion which blocks the light having the wavelength region in which the liquid photocurable resin 2 is solidified, and reflects the infrared light. In the present embodiment, the light transmission portion 94 is provided at the portion which serves as the optical path between the light source unit 10 and the base 11 in the portion functioning as the lid, and the reflecting portion 95 is formed in its peripheral region. An electroless nickel plating film, or a vapor deposited film of silver, aluminum, titanium oxide or the like is formed on the outer surface of the reflecting portion 95 so as to reflect the infrared light irradiated by the infrared light source 90. This is to prevent the portion other than the light transmission portion 94 from being heated when infrared the light is irradiated from the infrared light source 90 to heat the light transmission portion 94.

(Light Transmission Portion)

For the light transmission portion 94, for example, PCX-6397 (polycarbonate) manufactured by Sumika Styron Polycarbonate Limited is used. In this case, the wavelength of the light irradiated by the light source 7 is set to 460 nm to 500 nm, and the wavelength of the light irradiated by the infrared light source 90 is set to 860 nm.

(Controlling System)

Next, the controlling system of the three-dimensional manufacturing apparatuses illustrated in FIGS. 9A to 9C will be described. Since there are many points in common with the block diagrams of the first embodiment, common points and difference points will be described here with reference to FIG. 3.

The apparatus according to the second embodiment also comprises the controlling unit 31, the external device 32, the operation panel 33, the infrared thermo-viewer 16, the resin supplying unit 3, the light source unit 10 and the lifting/lowering unit 13, as well as the apparatus according to the first embodiment. The descriptions of these functions are omitted.

However, the apparatus of the first embodiment comprises the heater driving unit 34, whereas the apparatus of the second embodiment is provided with an infrared light source driving unit for driving the infrared light source 90. This is the different point.

The controlling unit 31 mainly controls the resin supplying unit 3, the light source unit 10, the lifting/lowering unit 13 and the infrared light source driving unit to perform the three-dimensional manufacturing process.

(Three-Dimensional Manufacturing Process)

Next, the three-dimensional manufacturing process using the three-dimensional manufacturing apparatus of the second embodiment will be described. Since there are many points in common with those in the flow chart of the first embodiment, the process will be described here with reference to the flow chart of FIG. 4.

Also, the apparatus according to the second embodiment operates according to the respective steps (S1) to (S11) of the flow chart of the three-dimensional manufacturing process illustrated in FIG. 4.

The steps from (S1) to (S5) are the same as those for the apparatus of the first embodiment.

In the apparatus of the first embodiment, the heater driving unit 34 is operated as the preparation for forming the next layer in the step (S6), whereas in the apparatus of the second embodiment, the controlling unit 31 operates the infrared light source driving unit. That is, the infrared light source 90 is turned on to increase the temperature of the light transmission portion 94.

The controlling unit 31 controls the infrared light source 90 based on the temperature information of the liquid photocurable resin input from the infrared thermo-viewer 16. When the infrared thermo-viewer 16 is not used, the controlling unit 31 may operate the infrared light source driving unit by timer control according to a preset program.

It is preferable that the controlling unit 31 controls the infrared light source 90 by appropriately changing a target temperature depending on the kind of liquid photocurable resin to be used, the heatproof temperature, the temperature characteristic of the viscosity, and the like.

First, it is desirable to take into consideration a difference in the heatproof temperature characteristics depending on the kind of liquid photocurable resin.

Besides, the target for which the viscosity is to be decreased by increasing the temperature is only the liquid photocurable resin to be replenished between the light transmission portion 94 and the three-dimensional manufactured object to form the next layer. Namely, with respect to other liquid photocurable resins, it is desirable not to increase the temperature to prevent characteristic deterioration.

Besides, in a case where the temperature of the liquid photocurable resin is high at the time when the resin is cured by irradiating light, if the resin is taken out to the room temperature environment after the manufacture, the resin deforms and the shape accuracy decreases. Therefore, it is desirable that the temperature of the liquid photocurable resin in such a region is not too high at the time point when the replenishment is completed between the light transmission portion 94 and the three-dimensional manufactured object.

Further, in order to shorten the time required for replenishing the liquid photocurable resin, the viscosity of the liquid photocurable resin is preferably set to be equal to or less than 700 mPa·s, more preferably equal to or less than 100 mPa·s.

Taking these various conditions into consideration, it is preferable that the temperature of the light transmission portion 94 or the temperature of the liquid photocurable resin heated by the light transmission portion 94 is controlled so as to be in the range of 40° C. to 80° C.

The controlling unit 31 operates the lifting/lowering unit 13 to lower the base 11 on which the first layer portion has been formed, by 40 μm (S7). Into the space between the three-dimensional manufactured object 14 supported by the lowered base 11 and the light transmission portion 94, the liquid photocurable resin 2 flows from the periphery.

According to the present embodiment, since the liquid photocurable resin 2 located immediately under the light transmission portion 94 is heated by the light transmission portion 94 which is heated by the irradiation of the infrared light, the viscosity of the liquid photocurable resin 2 decreases, and the flow resistance decreases. Therefore, the inflow speed of the liquid photocurable resin 2 increases, so that it is possible to shorten the time required for a preparing step of forming the second layer. That is, when the three-dimensional manufactured object is produced, the light source unit is caused to irradiate light to partially photocure the liquid photocurable resin, and then the liquid photocurable resin in the vicinity of the light transmission portion is heated by the light transmission portion to decrease the viscosity, thereby achieving high-speed replenishment. In other words, the infrared light source 90 functions as the flow facilitating unit which facilitates the flow of the photocurable resin 2 which is in contact with the light transmission portion 94, the flow being attended by the movement of the base 11.

The controlling unit 31 controls the infrared light source driving unit so as to stop the heat generation of the light transmission portion 94, before the replenishment of the photocurable resin is completed (S8). In other words, the infrared light source driving unit is controlled so that the light transmission portion 94 stops generating heat a predetermined time before starting light irradiation for forming the next layer. This is because, as described above, it is desirable that the temperature of the liquid photocurable resin at the time when the resin is cured by the light irradiation is not too high. Therefore, the controlling unit 31 stops the infrared light source driving unit one minute before the light irradiation for forming the next layer is started.

The steps from (S9) to (S11) are the same as those described in the first embodiment.

As described above, according to the present embodiment, it is possible to form the three-dimensional manufactured object in a short time by timely heating the light transmission portion by the irradiation of the infrared light to heat and replenish the liquid photocurable resin.

According to the present embodiment, it is possible to increase the inflow speed of the solution of the photocurable resin when the base is lowered, as compared with the three-dimensional manufacturing apparatus having the light transmission portion without a heat generating mechanism. Thus, the time required for the three-dimensional manufacture including the photocuring process can greatly be shortened.

According to the present embodiment, the liquid photocurable resin is heated only for a short period of time when the resin is replenished to the manufacturing region, and the increase in temperature is controlled, so that the liquid photocurable resin hardly deteriorates. Besides, since the temperature of the replenished liquid photocurable resin is not too high, it is possible to prevent the shape accuracy from being lowered due to deformation when the resin is taken out to the room temperature environment after the manufacture by the photocuring.

Third Embodiment

FIG. 9B is the schematic cross-section diagram of the apparatus for describing the constitution of the three-dimensional manufacturing apparatus according to the third embodiment of the present invention.

As well as the apparatus of the second embodiment, in the apparatus of the third embodiment, the light transmission portion is heated by the infrared heating device. However, the light transmission portion of the apparatus in the third embodiment is different from that in the second embodiment in the point that the light transmission portion transmits a gas such as oxygen or the like which inhibits curing of the photocurable resin.

(Constitution of Apparatus)

In FIG. 9B, there are illustrated the container 1, the liquid photocurable resin 2, the resin supplying unit 3, the light source 7, the mirror unit 8, the lens unit 9, the light source unit 10, the base 11, the lifting/lowering arm 12, the lifting/lowering unit 13, the three-dimensional manufactured object 14, the observation portion 15, the infrared thermo-viewer 16, the infrared light source 90, and the reflecting portion 95.

Since the above constituent elements are the same as those described with reference to FIG. 1 and FIG. 9A, the detailed descriptions thereof are omitted.

In FIG. 9B, there are further illustrated an oxygen supplying unit 100, cooling units 101, and a light transmission portion 104.

The oxygen supplying unit 100 supplies oxygen to the vicinity of the outer surface of the light transmission portion 104. In the apparatus of the third embodiment, the light transmission portion 104 which transmits a gas such as oxygen or the like is provided. In a case where, as the liquid photocurable resin, a radical polymerization resin material which decreases a photocuring sensitivity when containing the gas such as oxygen is used, since a region in which the curing is inhibited is formed in the vicinity of the light transmission portion by the transmitted gas, there is an advantage that the cured object does not adhere to the light transmission portion. The oxygen is also contained in the atmosphere. However, in order to sufficiently increase the amount of the oxygen which transmits through the light transmission portion, it is preferable to make an atmosphere having a higher oxygen containing ratio than the atmosphere in the vicinity of the outer surface of the light transmission portion 104. For this reason, it is preferable to provide the oxygen supplying unit 100. In some cases, the oxygen supplying unit 100 may have a mechanism for pressurizing the light transmission portion 104 at a pressure equal to or higher than 1 atmospheric pressure.

The cooling unit 101 is a mechanism which cools down the liquid photocurable resin 2 in the container 1. In order to prevent a problem that deterioration or curing progresses because the temperature of the entire liquid resin material in the container 1 becomes too high or a problem that the manufactured object is deformed because of the cooling after solidification, the apparatus of the present embodiment comprises the mechanism for cooling down the liquid photocurable resin 2. That is, a pipe through which a liquid or gas refrigerant flows is arranged at an appropriate position in the apparatus. In the apparatus of FIG. 9B, the pipes of the cooling unit 101 are arranged at seven places within the wall of the container 1 and at three places within the base 11, but the arrangement and the number can be appropriately changed. More specifically, cooling water kept at a temperature of 20° C. to 35° C. may be circulated in the pipes by a pump.

(Light Transmission Portion)

The light transmission portion 104 is a portion (window) which transmits light irradiated by the light source 7 and having the wavelength region in which the liquid photocurable resin 2 is solidified, and absorbs the infrared light irradiated by the infrared light source 90. Further, the light transmission portion is a portion which transmits or permeates a gas such as oxygen or the like for inhibiting curing of the liquid photocurable resin. As the material of the light transmission portion 104, resins such as PFA, FEP, ETFE, PE and the like can be used. Among them, the fluorine-based resin is excellent in releasability and can be suitably used. For example, a copolymer of tetrafluoroethylene and perfluoroalkyl vinyl ether is suitable, and NEOFLON™ PFA manufactured by DAIKIN INDUSTRIES, Ltd. is used.

(Controlling System)

Next, a controlling system of the three-dimensional manufacturing apparatus of the third embodiment illustrated in FIG. 9B will be described. Basically, the relevant controlling system is the same as the controlling system of the apparatus of the second embodiment. However, the third embodiment is different from the second embodiment in the point that the controlling unit controls the operations of the oxygen supplying unit 100 and the cooling unit 101.

(Three-Dimensional Manufacturing Process)

Next, the three-dimensional manufacturing process using the three-dimensional manufacturing apparatus of the third embodiment will be described. Basically, the relevant manufacturing process is the same as the manufacturing process of the apparatus of the second embodiment. However, the third embodiment is different from the second embodiment in the point that the controlling unit controls the operations of the oxygen supplying unit 100 and the cooling unit 101 so that the manufacturing process is continuously and stably performed.

According to the present embodiment, since the liquid photocurable resin 2 immediately under the light transmission portion 104 is heated by the light transmission portion 104, the viscosity of the liquid photocurable resin 2 decreases, and thus the flow resistance decreases. Therefore, the inflow speed of the liquid photocurable resin 2 is high, so that the time required for the preparing process for forming the next layer can be shortened. That is, when the three-dimensional manufactured object is produced, the light source unit is caused to irradiate light to photo-cure a part of the liquid photocurable resin, and then the liquid photocurable resin in the vicinity of the light transmission portion is heated by the light transmission portion to decrease the viscosity thereof, so that the liquid photocurable resin can be replenished at high speed. In other words, the infrared light source 90 functions as the flow facilitating unit which facilitates the flow of the photocurable resin 2 which is in contact with the light transmission portion 104, the flow being attended by the movement of the base 11.

Furthermore, according to the present embodiment, the region where the curing is inhibited is formed in the vicinity of the light transmission portion by the gas transmitted through the light transmission portion, so that the cured object does not adhere to the light transmission portion.

According to the present embodiment, it is possible to increase the inflow speed of the solution of the photocurable resin when the base is lowered, as compared with the three-dimensional manufacturing apparatus having the light transmission portion without a heat generating mechanism. Thus, the time required for the three-dimensional manufacture including the photocuring process can greatly be shortened.

According to the present embodiment, the liquid photocurable resin is heated only for a short period of time when the resin is replenished to the manufacturing region, and the increase in temperature is controlled, so that the liquid photocurable resin hardly deteriorates. Besides, since the temperature of the replenished liquid photocurable resin is not too high, it is possible to prevent the shape accuracy from being lowered due to deformation when the resin is taken out to the room temperature environment after the manufacture by the photocuring.

Fourth Embodiment

FIG. 9C is the schematic cross-section diagram of the apparatus for describing the constitution of the three-dimensional manufacturing apparatus according to the fourth embodiment of the present invention.

In the three-dimensional manufacturing apparatus according to each of the first embodiment to the third embodiment, the light transmission portion is provided at the top of the container. However, in the fourth embodiment, the light transmission portion is provided at the bottom of the container. In the apparatus of the fourth embodiment, as well as the apparatus of the first embodiment, the light transmission portion is heated by the transparent heater. However, the light transmission portion of the apparatus of the fourth embodiment is a light transmission portion which transmits a gas such as oxygen or the like for inhibiting curing of the photocurable resin.

(Constitution of Apparatus)

In FIG. 9C, there are illustrated the container 1, the liquid photocurable resin 2, the resin supplying unit 3, the light source 7, the mirror unit 8, the lens unit 9, the light source unit 10, the base 11, the lifting/lowering arm 12, the lifting/lowering unit 13, the three-dimensional manufactured object 14, the observation portion 15, and the infrared thermoviewer 16. Since the above constituent elements are substantially the same as those of the first embodiment described with reference to FIG. 1, the detailed descriptions thereof are omitted. Incidentally, in the apparatus of FIG. 1, the three-dimensional manufactured object 14 is supported on the upper surface of the base 11, but, in the apparatus of FIG. 9C, the three-dimensional manufactured object 14 is suspended and supported on the lower surface of the base 11.

Besides, since the oxygen supplying unit 100 is the same as the oxygen supplying unit 100 of the third embodiment, the detailed description thereof is omitted.

As well as the cooling unit 101 of the third embodiment, the cooling unit 101 is a mechanism which cools down the liquid photocurable resin 2 in the container 1. In the fourth embodiment, the cooling units 101 are disposed in a light shielding portion 115 around a light transmission portion 114 having a transparent heater.

Although the light transmission portion and the light shielding portion constitute the lid of the container in the apparatus of the first embodiment, the light transmission portion 114 and the light shielding portion 115 constitute the bottom of the container in the apparatus of the fourth embodiment.

The light transmission portion 114 is a portion (window) which transmits light of the wavelength region in which the liquid photocurable resin 2 is solidified. The light shielding portion 115 is a portion which is made of a member for blocking (shielding) light of the wavelength region in which the liquid photocurable resin 2 is solidified. In the present embodiment, the light transmission portion 114 is provided at the portion which functions as the optical path between the light source unit 10 and the base 11, and the light shielding portion 115 is formed in its peripheral region.

(Light Transmission Portion)

Next, the light transmission portion 114 provided with the heating source will be described. The light transmission portion 114 is a portion which transmits light of the wavelength region in which the liquid photocurable resin 2 irradiated by the light source 7 is solidified and transmits a gas such as oxygen for inhibiting curing of the liquid photocurable resin.

Basically, the light transmission portion which has the constitution described with reference to FIGS. 2A to 2C, FIGS. 6A to 6C, FIGS. 7A to 7C, and FIGS. 8A to 8C is used. However, in the fourth embodiment, due to the requirement of transmitting the gas such as the oxygen or the like of inhibiting curing of the liquid photocurable resin, there is a case where the light transmission portion is made of a different material from the light transmission portion of the first embodiment.

The substrate 21 illustrated in FIGS. 2A to 2C, the substrate 61 illustrated in FIGS. 6A to 6C, the lower substrate 71 and the upper substrate 75 illustrated in FIGS. 7A to 7C, and the lower substrate 81 and the upper substrate 86 illustrated in FIGS. 8A to 8C are, for example, the quartz glass plates in the first embodiment. However, in the fourth embodiment, resins such as PFA, FEP, ETFE, PE and the like are used. For example, a copolymer of tetrafluoroethylene and perfluoroalkyl vinyl ether is suitable, and NEOFLON™ PFA manufactured by DAIKIN INDUSTRIES, Ltd. can be used.

The transparent heater is a heater which has light transmittance and gas transmittance (or permeability) and generates heat when energized. For example, the transparent heater is made of a thin film of a material selected from tin-doped indium oxide (ITO), fluorine-doped tin oxide (FTO), antimony-doped indium oxide (ATO) or the like which is an oxide material. Of course, another material may be used.

For example, a silver paste or a silver wire is used as the electrode for energizing the transparent heater, but another electrode may be used.

(Controlling System)

Next, the controlling system of the three-dimensional manufacturing apparatus illustrated in FIG. 9C will be described. Since there are many points in common with the block diagrams of the first embodiment, common points and different points will be described here with reference to FIG. 3.

As well as the apparatus of the first embodiment, the apparatus of the fourth embodiment also comprises, as the controlling blocks, the controlling unit 31, the external device 32, the operation panel 33, the infrared thermoviewer 16, the resin supplying unit 3, the light source unit 10, the lifting/lowering unit 13 and the heater driving unit 34. Therefore, the descriptions of these functions are omitted.

However, the fourth embodiment is different from the first embodiment in the point that the controlling unit also controls the operations of the oxygen supplying unit 100 and the cooling unit 101.

The controlling unit 31 mainly controls the resin supplying unit 3, the light source unit 10, the lifting/lowering unit 13, the heater driving unit 34, the oxygen supplying unit 100 and the cooling unit 101 to perform the three-dimensional manufacturing process.

(Three-Dimensional Manufacturing Process)

Next, the three-dimensional manufacturing process using the three-dimensional manufacturing apparatus of the fourth embodiment will be described. Since there are many points in common with the flow chart of the first embodiment, the entire process will roughly be described here with reference to the flow chart of FIG. 4.

The apparatus of the fourth embodiment also operates in accordance with the steps (S1) to (S11) of the flow chart of the three-dimensional manufacturing process illustrated in FIG. 4.

Figures 11, 12:
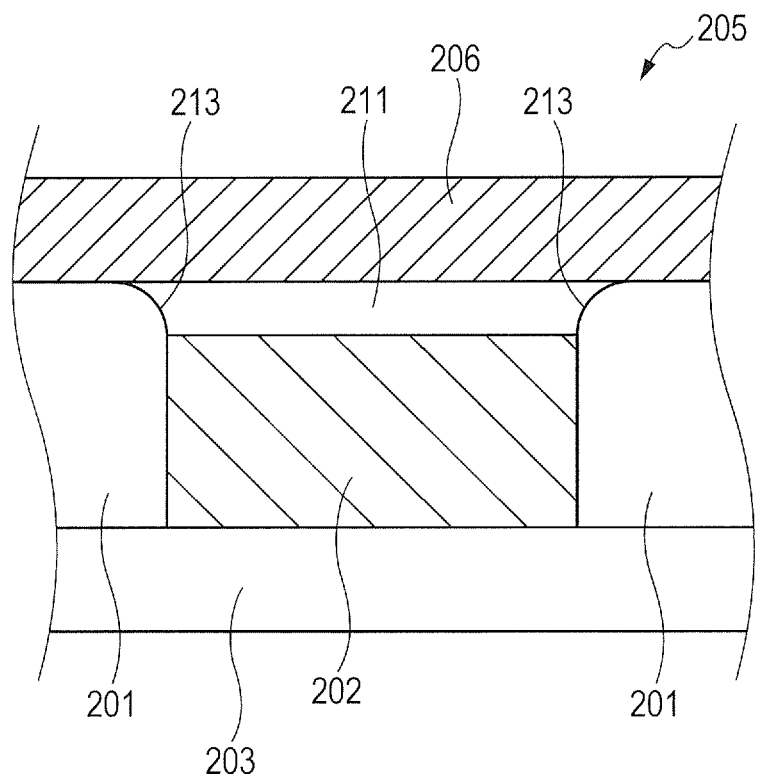
FIG. 11 is an explanatory diagram of the enlarged main part of the apparatus illustrated in FIG. 10.
FIG. 12 is an explanatory diagram for describing changes in a wetting angle (contact angle) of a droplet of an uncured photocurable resin due to application of vibration.

However, in the apparatus of FIG. 11, since the three-dimensional manufactured object 14 is suspended and supported on the lower surface of the base 11, in the step (S4), the initial position of the base 11 is set to a position which is spaced upward by a predetermined distance from the light transmission portion 114 being the bottom of the container 1.

Further, in the step (S7), the base 11 is raised by one layer. For example, the base is raised by 40 μm.

The liquid photocurable resin 2 flows from the periphery into the space between the three-dimensional manufactured object 14 suspended and supported by the raised base 11 and the light transmission portion 114.

Incidentally, the controlling unit controls the operations of the oxygen supplying unit 100 and the cooling unit 101 so that the manufacturing process can be performed stably and continuously.

According to the present embodiment, since the liquid photocurable resin 2 located immediately above the light transmission portion 114 is heated by the light transmission portion 114, the viscosity of the liquid photocurable resin 2 decreases, so that the flow resistance decreases. Therefore, the inflow speed of the liquid photocurable resin 2 is high, so that the time required for the preparing step of forming the second and subsequent layers can be shortened. That is, when the three-dimensional manufactured object is produced, the light source unit is caused to irradiate light to photo-cure a part of the liquid photocurable resin, and then the liquid photocurable resin in the vicinity of the light transmission portion is heated by the light transmission portion to decrease the viscosity thereof, so that the liquid photocurable resin can be replenished at high speed. Namely, the transparent heater functions as the flow facilitating unit which facilitates the flow of the photocurable resin 2 which is in contact with the light transmission portion 114, the flow being attended by the movement of the base 11.

Further, according to the present embodiment, the region where the curing is inhibited is formed in the vicinity of the light transmission portion by the gas transmitted through the light transmission portion, so that the cured object does not adhere to the light transmission portion.

According to the present embodiment, it is possible to increase the inflow speed of the solution of the photocurable resin when the base is raised, as compared with the three-dimensional manufacturing apparatus having the light transmission portion without a heat generating mechanism. Thus, the time required for the three-dimensional manufacture including the photocuring process can greatly be shortened.

According to the present embodiment, the liquid photocurable resin is heated only for a short period of time when the resin is replenished to the manufacturing region, and the increase in temperature is controlled, so that the liquid photocurable resin hardly deteriorates. Besides, since the temperature of the replenished liquid photocurable resin is not too high, it is possible to prevent the shape accuracy from being lowered due to deformation when the resin is taken out to the room temperature environment after the manufacture by the photocuring.

Although the first to fourth embodiments have been described as above, the embodiments of the present invention are not limited to them. Namely, the materials, the arrangements, the sizes and the like of the constituent elements exemplified in each of the above embodiments can be changed and properly combined.

For example, the position at which the light transmission portion is provided is not limited to the upper surface or the bottom surface of the container of the liquid photocurable resin container. Namely, the liquid transmission portion may be provided on the side surface of the container.

Besides, the unit (means) for heating the light transmission portion is not limited to the transparent heater or the infrared light source which is used alone. Namely, it is possible to combine the transparent heater and the infrared light source, or to replace them with another heating unit such as a warm tube, a high frequency heater or the like.

Besides, it is possible to change the kind and the arrangement of the cooling unit (mean). For example, it is also possible to use a Peltier cooling element.

Besides, it is desirable to appropriately change the control of the heat generation rate and the temperature of the light transmission portion, depending on the kind of liquid photocurable resin to be used and the size and the shape of the three-dimensional manufactured object to be formed.

Fifth Embodiment

Figure 10:
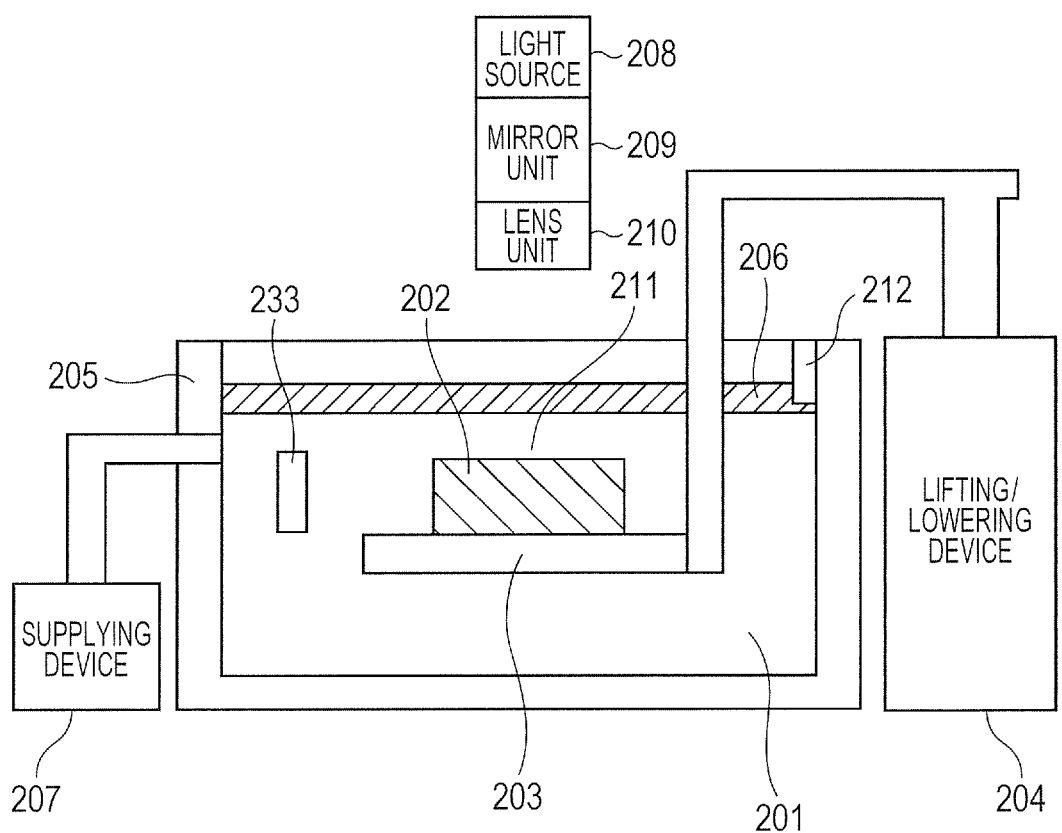
FIG. 10 is an explanatory diagram for describing a constitution of the three-dimensional manufacturing apparatus according to a fifth embodiment of the present invention.

FIG. 10 is a block diagram for describing the constitution of the three-dimensional manufacturing apparatus for producing the three-dimensional manufactured object as a cross-section constitution in the present embodiment. In FIG. 10, a photocurable resin 201 in a molten (uncured) state is held in a container 205.

In the present embodiment, curing light for curing the photocurable resin 201 is irradiated from above the container 205 via a light transmission portion 206. A manufacturing stage 203 which serves as a supplying member of a gas having a cure inhibitory property functions as the base for supporting the manufactured site of a manufactured object 202. The manufacturing stage 203 is moved downward by a lifting/lowering device 204 with the progresses of the solidification and the manufacture of the manufactured object 202. In case of an intermittent manufacturing method as described below, curing light is irradiated to perform the manufacture of one layer, and then the manufacturing stage 203 is moved downward (in the drawing) by the lifting/lowering device 204. At that time, the movement distance of the manufacturing stage 203 substantially corresponds to the thickness of one layer to be solidified by irradiation of, for example, the curing light. For example, the movement distance is set to about 0.02 mm to 0.2 mm. By the movement of the manufacturing stage 203, the photocurable resin 201 for a next layer is supplied above the manufactured site of the manufactured object 202. In case of a continuous manufacturing method as described below, irradiation of the curing light and the movement of the manufacturing stage 203 are performed simultaneously and continuously.

The curing light is irradiated from a light irradiating unit (device) which is constituted by, for example, a light source 208, a mirror unit 209 and a lens unit 210. The light source 208 is, for example, a laser light source or the like. For example, in a case where the photocurable resin 201 is an ultraviolet curing type, the wavelength of the irradiation light of the light source 208 is selected in the range of about 200 nm to 400 nm suitable for the condition such as the material of the photocurable resin 201 or the like. A typical light wavelength of the curing light is 254 nm or 365 nm. However, the wavelength of the irradiation light of the light source 208 is not necessarily limited to the ultraviolet light region, and irradiation light of another wavelength region may be used depending on the material of the photocurable resin 201.

The mirror unit 209 is constituted by a galvano mirror unit or the like, and scans the irradiation spot of the light source 208 in the X and Y directions via the lens unit 210. Thus, it is possible to cure the site corresponding to a specific height of the manufactured object 202 of the photocurable resin 201.

As a manufacturing method, for example, in addition to the so-called intermittent manufacturing method in which planar scanning of the curing light and the movement of the manufacturing stage 203 are performed alternately, it is conceivable to use the continuous manufacturing method in which the curing light is projected in the form of a moving image while continuously moving the manufacturing stage 203 by the lifting/lowering device 204. In the case of the continuous manufacturing method, the light irradiating unit comprising the light source 208, the mirror unit 209 and the lens unit 210 can be constituted as a moving picture projector which irradiates a moving image on a surface.

In the constitution of FIG. 10, since light irradiation for curing the photocurable resin 201 is performed from the upper direction of the container 205, a light transmission member made of a light transmissive material, that is, a light transmissive lid is disposed on the top of the container 205. In FIG. 10, the light transmission portion 206 corresponds to the relevant light transmission member. Also, the side wall of the container 205 can be made of a light transmissive material for the purpose of visually recognizing the progress of the manufacture or photographing the progress of the manufacture by a not-illustrated camera or the like.

The light transmission portion 206 is made of a light transmissive material such as PTFE, PFA, PE, PP, PC, PMMA, quartz, glass or the like. The thickness of the light transmission portion 206 may be determined in consideration of the size of a manufacturing region 211, the weight of the resin, and the like, and can be selected in the range of, for example, about 0.5 mm to 10 mm.

Incidentally, a resin being gas transmissive or a glass material may be used for the light transmission portion 206. Thus, it is possible to supply, from the outside of the container 205 through the light transmission portion 206, a gas having a cure inhibitory property, such as oxygen existing as a simple substance, or a gas containing an allotrope such as oxygen or ozone, to the photocurable resin 201. Therefore, it is possible to suppress that an unnecessary fixation and a viscosity increase of the photocurable resin 201 occur in the manufacturing region 211 or in the vicinity of the light transmission portion 206.

In the present embodiment, the uncured and liquid photocurable resin 201 can be supplied by a supplying device 207 so as to be at the liquid level of the lower surface of the light transmission portion 206 or the level just in the vicinity thereof. In that case, for example, in the supplying device 207, a constitution for automatically supplying the photocurable resin 201 into the container 205 in accordance with an output of a not-illustrated liquid level detecting unit (means) of detecting the liquid level of the photocurable resin 201 may be provided.

In the present embodiment, as the flow facilitating unit which has the function of facilitating the flow of the photocurable resin 201 which is in contact with the light transmission portion 206 (the flow being attended by the movement of the base 203), an exciting device 212 which vibrates the light transmission portion 206 is installed with respect to the light transmission portion 206. The exciting device 212 is installed to the light transmission member as a transducer, and comprises a vibrator electrically driven. For example, an electromagnetic vibrator such as a voice coil or a vibrator such as a piezo element is used as the transducer of the exciting device 212. The vibrator of the exciting device 212 is driven under the optimum driving condition depending on the material physical property of the photocurable resin 201 and the physical property of the light transmission portion 206.

Details of control of drive timing of the exciting device 212 accompanied with the progress of the manufacture will be described later. For example, in the intermittent manufacturing method, it is conceivable, especially after the irradiation of the curing light, to drive the exciting device at the same time as the manufacturing stage 203 is moved by the lifting/lowering device 204 or immediately after the movement thereof.

By vibrating the light transmission portion 206 with the exciting device 212, the temperature of the photocurable resin 201 in the vicinity of the manufacturing region 211, particularly the light transmission portion 206, is increased. Thus, the viscosity locally decreases, and wettability is improved at the contact interface between the light transmission portion 206 and the photocurable resin 201, so that the resin easily penetrates. That is, the exciting device 212 functions as the flow facilitating unit which has the function of facilitating the flow of the photocurable resin 201 which is in contact with the light transmission portion 206, the flow being attended by the movement of the base 203.

Then, for example, after the photocurable resin 201 is supplied to the space occurred by the movement of the manufacturing stage 203 in the manufacturing region 211, the driving of the exciting device 212 is stopped, and curing light for the next layer is irradiated. In the intermittent manufacturing method, at the time of irradiating the curing light, it is possible by stopping the driving of the exciting device 212 to suppress that unnecessary refraction and scattering occur in the curing light propagating in the photocurable resin 201 due to the vibration of the photocurable resin 201. In summary, it is possible by performing the manufacturing control as described above to complete the manufactured object 202 by the intermittent manufacturing method.

Here, with reference to FIGS. 11 and 12, the physical property of the uncured photocurable resin 201 which is vibrated by the exciting device 212 via the light transmission portion 206 will be considered.

When the light transmission portion 206 is excited by the exciting device 212, vibration is propagated to the uncured photocurable resin 201 of the manufacturing region 211 corresponding to the vicinity of the light transmission portion, for example, the vicinity of the manufacturing stage 203 and the already-manufactured manufactured object 202. By this vibration, it is possible to heat the photocurable resin 201 to an appropriate temperature, thereby having an effect of improving its fluidity.

Incidentally, depending on the kind, the viscosity, the heatproof temperature and the like of the photocurable resin 201, temperature control may be performed for the photocurable resin 201 according to circumstances. For example, the temperature of the photocurable resin 201 is measured by a temperature sensor, and excitation driving of the exciting device 212 is controlled such that the measured temperature of the photocurable resin 201 is maintained within an appropriate temperature range. A temperature sensor 233 to be used for such a purpose can be arranged as illustrated in FIG. 10, for example. More specifically, the temperature sensor 233 is constituted by disposing a temperature detecting element such as a thermistor on the inner wall surface of the container 5. In this case, the temperature of the photocurable resin 201 with which the temperature sensor 233 is in contact is measured. However, the temperature sensor 233 can also be constituted to measure the temperature of the photocurable resin 201 in the vicinity of the manufacturing region 211 in a non-contact manner. In this case, for example, the temperature sensor 233 can be constituted by a thermographic device capable of measuring infrared radiation and the like. By the temperature sensor 233, the temperature of the photocurable resin 201 in the vicinity of the manufacturing region 211 is measured in a non-contact manner from the upper side through the light transmission portion 206 or from the side through the transparent-material side wall portion of the container 205. In the temperature management by the temperature sensor 233, for example, a controlling device, for example, a later-described CPU 601 controls an excitation driving time and an excitation output of the exciting device 212 such that the measured temperature of the photocurable resin 201 does not exceed the upper limit value. A preferable temperature range of the photocurable resin 201 varies depending on the kind, the viscosity, the heatproof temperature and the like of the photocurable resin 201. In the case of the photocurable resin 201 which is made of the above material, for example, the temperature range from 40° C. to 80° C. is typically considered.

Further, by vibrating the photocurable resin 201 through the light transmission portion 206 with use of the exciting device 212, the fluidity of the photocurable resin 201 is enhanced. It is conceivable that the reason for such enhancement of the fluidity is that the surface tension of the photocurable resin 201 decreases by the vibration and thus the viscosity decreases. Thus, it is possible to supply the photocurable resin 201 to the manufacturing region 211 at high speed and smoothly. Incidentally, the driving condition at the time of exciting the light transmission portion 206 by the exciting device 212 is appropriately determined depending on the kind, the viscosity and the heatproof temperature and the like of the photocurable resin 201.

For example, in the case of the photocurable resin 201 made of the above material, it is conceivable that the excitation frequency is in the range of 10 Hz to 100 kHz and the excitation output is in the range of about 10 W to 1 kW. Besides, as long as the excitation driving is performed intermittently as described later, one excitation driving time may be limited to the range of 0.5 seconds to 5.0 seconds. It is also conceivable that the excitation frequency of the exciting device 212 is taken as the resonance frequency (f0) of the light transmission portion 206 to be vibrated. Thus, it is possible to efficiently vibrate the light transmission portion 206 by the exciting device 212.

FIG. 11, which is the diagram for describing the influence of the surface tension of the photocurable resin 201, illustrates the state that the photocured manufactured object 202 is moved downward by the manufacturing stage 203 in the constitution of FIG. 10. In FIG. 11, each of boundaries 213 indicates a pressure boundary between the low-pressure portion of the photocurable resin 201 generated immediately above the manufactured object 202 by the movement of the manufactured object 202 and the portion of the photocurable resin 201 not affected by the pressure around the low-pressure portion. Here, although the boundary 213 is not necessarily visually observable, it is conceivable that the surface tension of the photocurable resin 201 works at the site of the pressure boundary 213 like this.

In a case where the viscosity of the photocurable resin 201 is high, the strong surface tension acts at the boundary 213, so that it becomes difficult to flow the resin from the surroundings into the manufacturing region 211. To cope with such inconvenience, for example, it is conceivable to guide the photocurable resin 201 into the manufacturing region 211 by once moving the manufacturing stage 203 to be larger than an original (essential) movement amount to enlarge the space above the already-manufactured manufactured object 202. Here, for example, it is assumed that, in the intermittent manufacture, the layer thickness to be photocured by one planar scanning is 0.02 mm to 0.2 mm. In this case, the manufacturing stage 203 is once lowered such that a space having the height equal to or higher than 0.2 mm is formed above the already-manufactured manufactured object 202. Then, after the photocurable resin 1 is sufficiently supplied, the manufacturing stage 203 is again raised such that the space above the already-manufactured manufactured object 202 has the height corresponding to the thickness of one layer in the desired range of 0.02 mm to 0.2 mm. However, if such control is performed for each single-layer manufacture in the intermittent manufacture, there is a possibility that the manufacturing processing time is remarkably prolonged.

On the other hand, in the present embodiment, by vibrating the photocurable resin 201 which faces the light transmission portion 206 through the light transmission portion 206 with use of the exciting device 212, it is possible to supply the photocurable resin 201 at high speed and smoothly without performing the above movement control of the manufacturing stage 203. For example, by vibrating the photocurable resin 201 through the light transmission portion 206 with use of the exciting device 212, it is possible to decrease the surface tension generated at the site such as the boundary 213 by temporarily decreasing intermolecular bonding force of the photocurable resin 201. Thus, in the present embodiment, even in a case where the viscosity and the surface tension of the resin are decreased, the fluidity is increased and the movement amount of the manufacturing stage 203 is small, it is possible to advance the photocurable resin 201 at high speed and smoothly to the space occurred by such conditions.

For example, the diagram of FIG. 12 indicates the result which is obtained by measuring a liquid thickness (μm) and a liquid projection diameter (mm) when the photocurable resin 201 of the same material as above is dropped onto the base made of the same material as that of the light transmission portion 206 as, for example, a droplet of 100 μl at an environmental temperature of 21.8° C. The base of the material same as that of the light transmission portion 206 can be excited and driven by the exciting device equivalent to the exciting device 212, under two conditions of excitation A (2302: 20 kHz/200 W) and excitation B (2303: 40 kHz/600 W). It should be noted that these excitation frequencies are frequencies in a so-called ultrasonic band exceeding an audible range.

FIG. 12 further indicates a result 2301 which is obtained when excitation to the base is not performed as a comparison condition. In this result, the liquid thickness is 720 μm and the liquid projection diameter is 13.3 mm. On the other hand, under the condition of the above excitation A (2302), the liquid thickness is 420 μm and the liquid projection diameter is 16.6 mm, and, under the condition of the above excitation B (2303), the liquid thickness is 340 μm and the liquid projection diameter is 18.7 mm. That is, as compared with the case where the excitation is not performed, the fluidity of the photocurable resin 201 is enhanced when the excitation is performed, so that the droplet-like photocurable resin 201 dropped on a wide and thin area on the base surface having the same wettability easily spreads. As can be seen from the experimental result indicated by FIG. 12, it is understood that the fluidity of the photocurable resin 201 is improved by vibrating the light transmission portion 206, and its supply efficiency is increased. Incidentally, the liquid thickness and the liquid projection diameter in FIG. 12 may be considered as indexes of the wetting angle on the base where the photocurable resin 201 is dropped.

Figure 15:
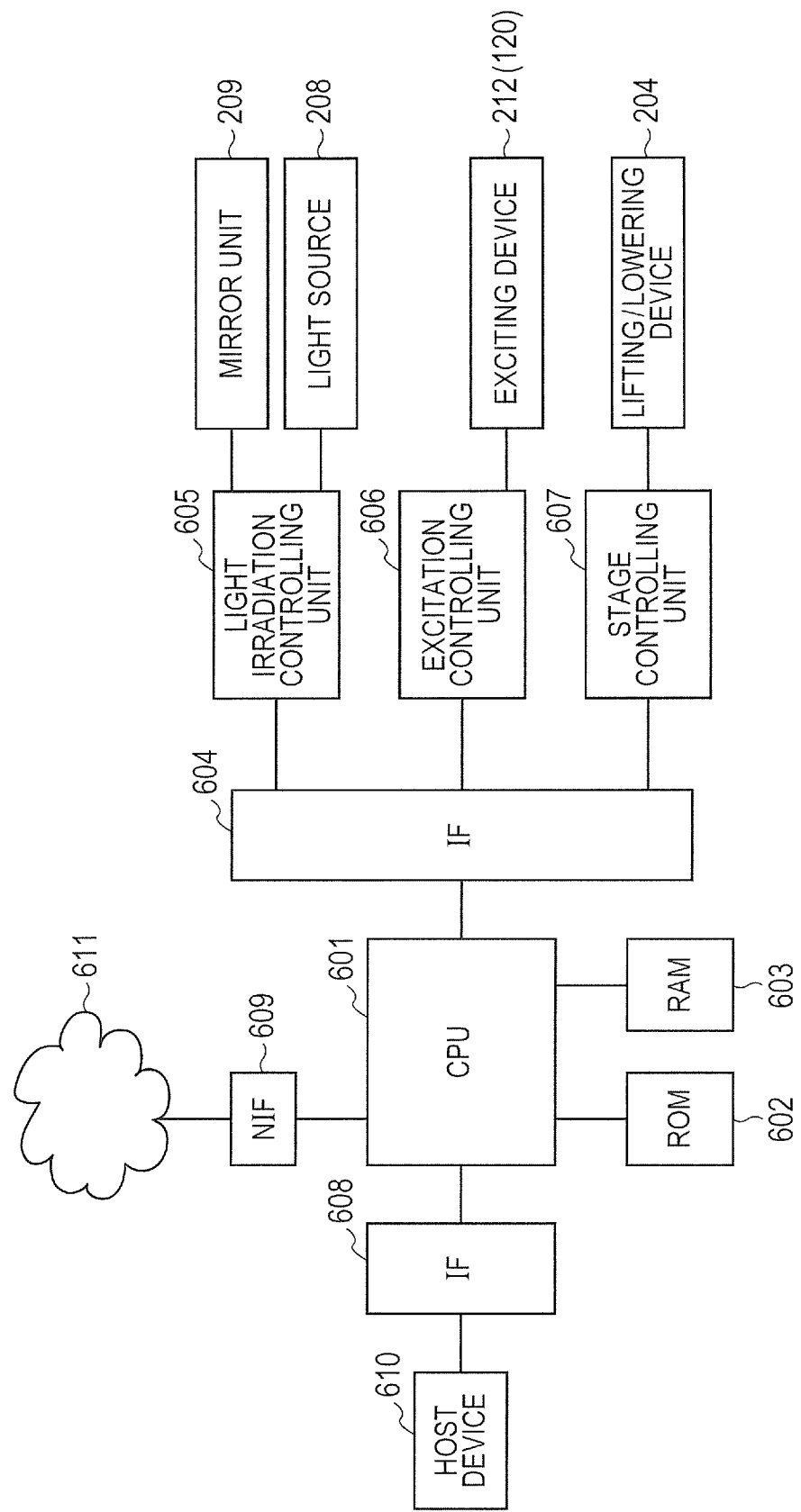
FIG. 15 is a block diagram for describing a constitution example of the controlling system of the three-dimensional manufacturing apparatus according to the present invention.

Subsequently, examples of a concrete controlling system of the manufacturing apparatus and a manufacturing control procedure thereof will be described. FIG. 15 is a block diagram for describing the constitution of the controlling system of the manufacturing apparatus of FIG. 10. Incidentally, the constitution of the controlling system illustrated in FIG. 15 can be similarly implemented in other embodiments described later.

In the controlling system illustrated in FIG. 15, a ROM 602, a RAM 603, an interface (IF) 604, an interface (IF) 608, a network interface (NIF) 609, and the like are arranged around a CPU 601 serving as a main function of the controlling device.

The ROM 602, the RAM 603, and the various interfaces 604, 608 and 609 are connected to the CPU 601. A basic program such as a BIOS (Basic Input/Output System) is stored in the ROM 602. A storage area of the ROM 602 may include a rewritable device such as an EPROM (erasable programmable read-only memory) or an EEPROM (electrically erasable programmable read-only memory). The RAM 603 is used as a working area for temporarily storing calculation processing results of the CPU 601. By executing the program recorded (stored) in the ROM 602, the CPU 601 performs a later-described manufacturing control procedure.

In the case of recording (storing) the program for performing the later-described manufacturing control procedure in the ROM 602, such a recording medium constitutes a computer-readable recording medium which stores therein a control procedure for performing the present invention. Incidentally, the program for performing the later-described manufacturing control procedure may be stored in a detachable computer-readable recording medium such as various flash memories, optical (magnetic) disks or the like, in addition to a fixed recording medium such as the ROM 602. Such a storage form can be used when installing or updating a program for performing the control procedure for achieving the present invention. In addition, when installing or updating the control program like this, it is possible to use a method of downloading the program from a network 611 via the network interface 609 in addition to using the detachable recording medium as described above.

The CPU 601 can communicate with other resources on a network (not illustrated) which performs communication using a protocol such as TCP/IP (Transmission Control Protocol/Internet Protocol) connected via the network interface 609. It is possible to constitute the network interface 609 by various network communication methods such as a wired connection (IEEE (Institute of Electrical and Electronics Engineers) 802.3, etc.), a wireless connection (IEEE 802.xx, etc.), or the like. It is also possible to download a later-described manufacturing control program from a server arranged in the network 611 and install it in a not-illustrated external storage device such as the ROM 602 or an HDD (hard disk drive), or update an already-installed program to a new version.

Three-dimensional (3D) data for laminated three-dimensional (3D) manufacture of the manufactured object 202 is transmitted in a data format such as 3D CAD (computer-aided design) from a higher-level host device 610 via the interface 608. The interface 608 can be constituted based on, for example, various kinds of serial or parallel interface standards. Further, the host device 610 can also be connected to the network 611 as a network terminal. Also, in this case, the host device 610 can supply manufacturing data to the manufacturing apparatus in the same manner as described above.

The CPU 601 controls the light source 208 and the mirror unit 209 via the interface 604 and a light irradiation controlling unit 605. Besides, the CPU 601 controls the lifting and lowering operation of the lifting/lowering device 204 via the interface 604 and a stage controlling unit 607. Besides, the CPU 601 controls the exciting device 212 via the interface 604 and an excitation controlling unit 606. The CPU 601 controls these units in accordance with a predetermined manufacturing sequence, thereby progressing the entire manufacturing process.

The interfaces 604 and 608 can be constituted based on, for example, various serial or parallel interface standards. In FIG. 15, the interface 604 is illustrated by one block for the sake of simplicity. However, the interface 604 may be constituted by interface circuits respectively having different communication methods depending on the communication specifications and the like of the respective portions illustrated on its right side.

Figure 16:
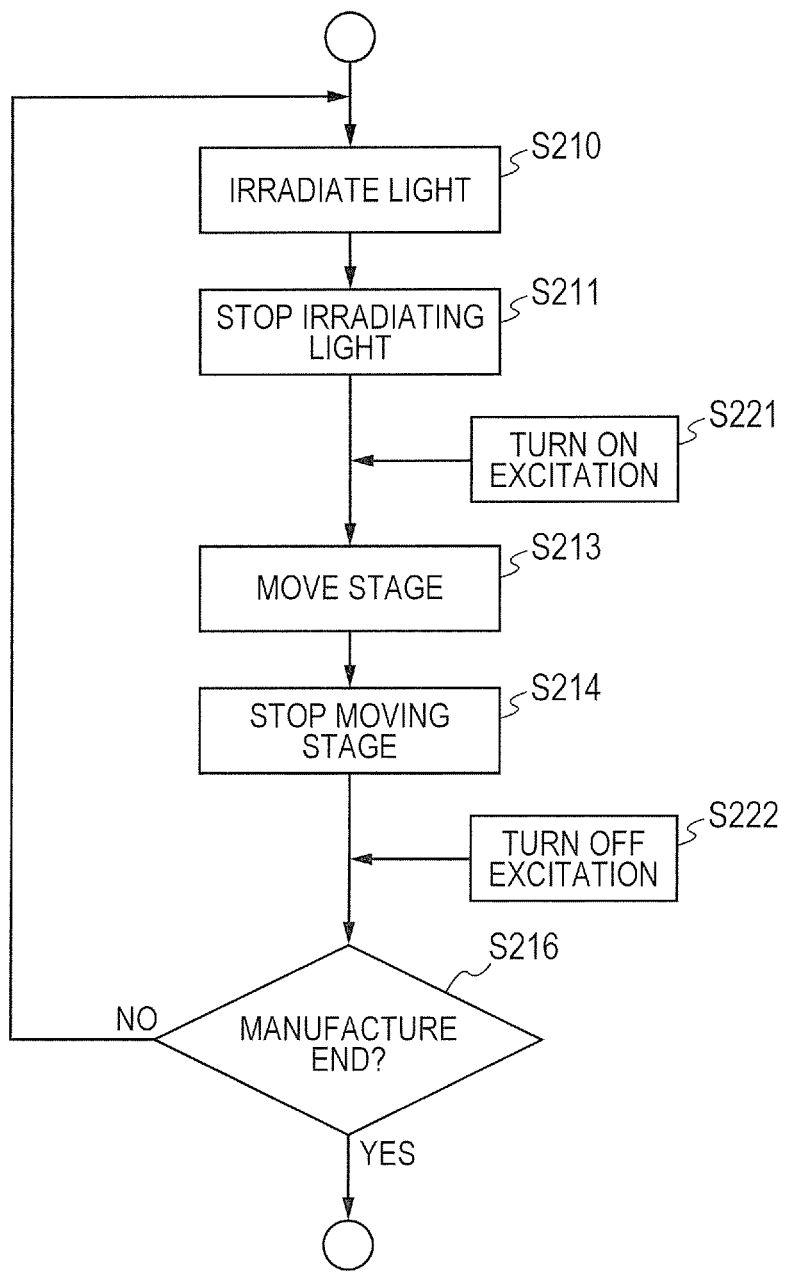
FIG. 16 is a flow chart for describing a three-dimensional manufacturing control procedure according to the present invention.
Figure 17:
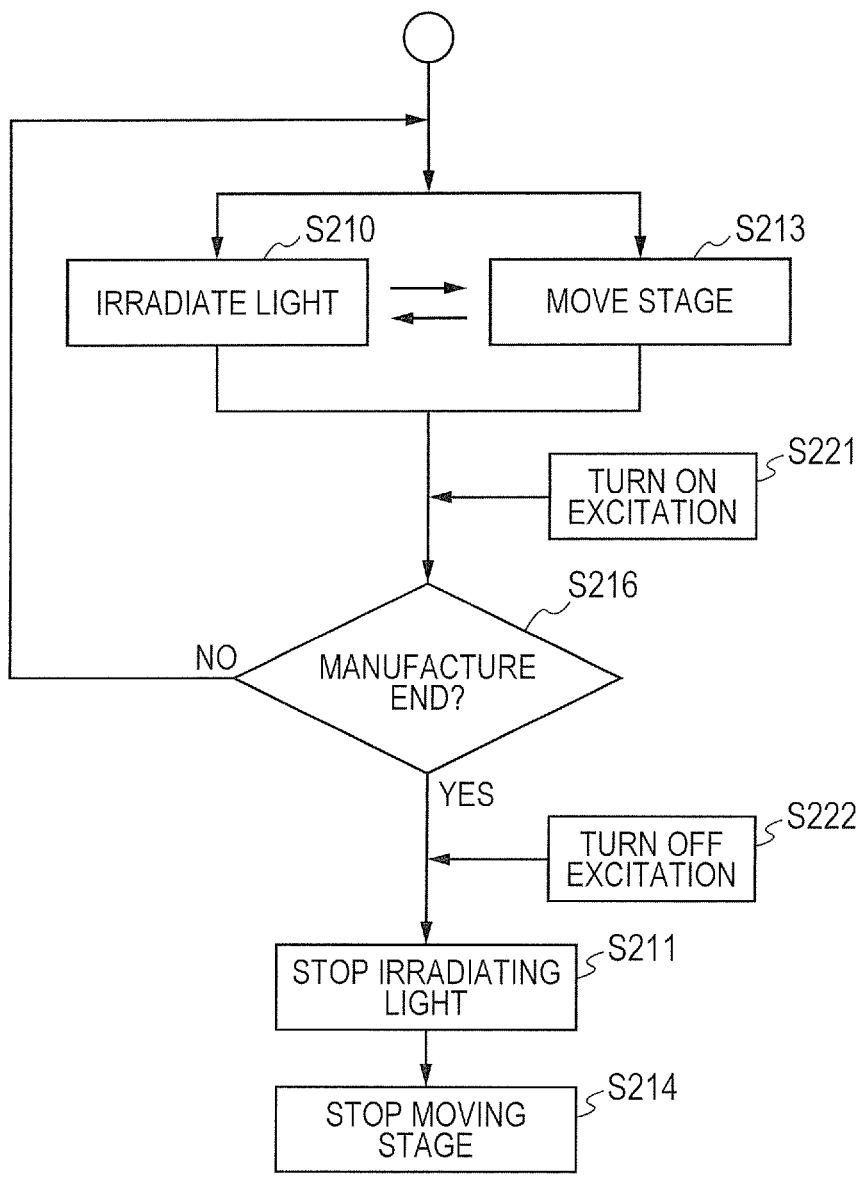
FIG. 17 is a flow chart for describing another three-dimensional manufacturing control procedure according to the present invention.

Subsequently, the manufacturing control using the above controlling system will be described. FIGS. 16 and 17 illustrate the flows of the manufacturing control procedure in the apparatus of FIG. 10. More specifically, FIG. 16 illustrates the control procedure to be performed in the case of the so-called intermittent manufacturing method in which the irradiation of the curing light (S210) and the movement of the manufacturing stage 203 (S213) are performed alternately. FIG. 17 illustrates the control procedure to be performed in the case of the so-called continuous manufacturing method in which the irradiation of the curing light (S210) and the movement of the manufacturing stage 203 (S213) are performed simultaneously and in parallel. The control procedures illustrated in FIGS. 16 and 17 are described as control programs which can be read and executed by, for example, the CPU 601 (controlling device: computer), and can be stored in, for example, the ROM 602 (or a not-illustrated external storage device).

Prior to the manufacture, the photocurable resin 201 in a molten (uncured) state is supplied into the container 205 by the supplying device 207. Alternatively, this procedure may be performed manually by a worker (operator). In the constitution of supplying the photocurable resin 201 by the supplying device 207, it may be possible to perform automatic control so that the amount of the photocurable resin 201 in the container 205 is automatically controlled to an appropriate amount depending on an appropriate output of a liquid level detecting unit (means) for detecting the liquid level of the photocurable resin 201. Besides, in the case of disposing the supplying device 207, it may be possible to add a resin collecting device for sucking and discharging the photocurable resin 201 from the container 205, so that the photocurable resin 201 is circulated from the resin collecting device to the resin supplying device, and again to the container 205.

The 3D manufacturing data of the manufactured object 202 is previously transmitted from the host device 610 or the like. By converting the 3D manufacturing data into, for example, (cross-section) shape data of a plurality of manufactured layers, the manufacturing data for a plurality of layers constituting the manufactured object 202 is generated. One layer of the manufacturing data for the plurality of layers is taken out, and it is driven to irradiate a portion corresponding to the shape of the manufacturing data for the one layer. In the intermittent manufacturing method, the CPU 601 drives and controls the mirror unit 209 so as to perform planar scanning of a region corresponding to the shape of the manufacturing data for one layer. In the continuous manufacturing method, for example, the CPU 601 generates moving image data obtained by decomposing the manufacturing data for the plurality of layers into frames, and, based on the generated moving image data, drives and controls the mirror unit 209 or a moving image projector arranged instead of the lens unit 210.

When the photocurable resin 201 is supplied into the container 205 and the manufacturing data of the manufactured object 202 to be manufactured is obtained, the CPU 601 decides whether or not to start the manufacture. The decision of the manufacture start is performed by deciding whether or not an instruction of the manufacture start has been received from the host device 610 or the like or by deciding whether or not a predetermined manufacture starting operation has been performed on a not-illustrated operation panel.

In the present embodiment, at least when the manufacturing stage 203 serving as the base of the manufactured object 202 is moved, the light transmission portion 206 is vibrated by the exciting device 212. For example, in the intermittent manufacturing procedure illustrated in FIG. 16, when the curing light corresponding to one layer of the manufactured object 202 is irradiated (S210) and the irradiation is stopped (S211), the CPU 601 starts driving the exciting device 212 via the excitation controlling unit 606. The CPU 601 vibrates the light transmission portion 206 by the exciting device 212 while the manufacturing stage 203 is moving, until the movement of the manufacturing stage 203 is stopped in S214.

By the vibration of the light transmission portion 206, the photocurable resin 201 facing the light transmission portion 206 is excited and appropriately warmed, and its fluidity is enhanced. Thus, it is possible to smoothly and at high speed supply the molten photocurable resin 201 to the space for a next layer generated by the movement of the manufacturing region 211, particularly the manufacturing stage 203. By the constitution of vibrating the light transmission portion 206 and further the photocurable resin 201 with use of the exciting device 212, it is possible to achieve the resin supplying speed of 0.3 ml/sec to 30 ml/sec at this time although different depending on the viscosity and the manufactured shape of the photocurable resin 201.

Then, when the manufacturing stage 203 is moved by, for example, a distance determined depending on the height of one layer, the CPU 601 stops moving the manufacturing stage 203 (S214), and further stops exciting the light transmission portion 206 by the exciting device 212. The above process is repeated until the completion (end) of the manufacture of the manufactured object 202 is confirmed in S216. The process of S216 can be performed by deciding whether or not the light irradiation and the stage movement have been performed by using the data of all the layers for manufacturing the manufactured object 202.

In the case of the intermittent manufacture, the excitation of the light transmission portion 206 is performed by the exciting device 212 only when the manufacturing stage 203 is moved (S213) as described above. Namely, when the curing light irradiation (S210) is performed, it is possible to control not to drive the exciting device 212. Therefore, the optical path for the curing light is not unnecessarily influenced by the vibration of the light transmission portion 206 through which the curing light is transmitted and the vibration of the photocurable resin 201 which faces the light transmission portion 206, so that it is possible to manufacture the site corresponding to each layer of the manufactured object 202 with a high degree of accuracy.

On the other hand, in the case of the continuous manufacture in FIG. 17, the irradiation of the curing light (S210) and the movement of the manufacturing stage 203 (S213) are performed simultaneously and in parallel. That is, concurrently with the irradiation of the curing light by the light irradiating device, the manufacturing stage 203 is moved to continuously produce the manufactured objects. When the irradiation of the curing light (S210) and the movement of the manufacturing stage 203 (S213) are started, the CPU causes the light transmission portion 206 to vibrate by the exciting device 212 (S221). Incidentally, in FIG. 17, "TURN ON EXCITATION" of S221 is illustrated after S210 and S213 for convenience. However, the driving of the exciting device 212 may be started prior to S210 and S213. The speed of the movement of the manufacturing stage 203 (S213) is determined depending on, for example, a frame rate of the curing light in a moving image form. The excitation is turned off in S222.

Even in the case of the continuous manufacture illustrated in FIG. 17, when the light transmission portion 206 is vibrated, the photocurable resin 201 facing the light transmission portion 206 is excited and appropriately warmed, and its fluidity is enhanced. Thus, it is possible to smoothly and at high speed supply the molted photocurable resin 201 to the space occurred by the movement of the manufacturing region 211, particularly the manufacturing stage 203.

In the case of the continuous manufacture illustrated in FIG. 17, when at least the manufacturing stage 203 is moved, the light transmission portion 206 is similarly vibrated by the exciting device 212 (S221). Here, in the case of the continuous manufacturing method, the irradiation of the curing light is performed simultaneously. In this case, although there is a possibility that the vibrations of the light transmission portion 206 and the photocurable resin 201 may affect the optical path of the curing light, it is possible to suppress a fluid vibration of the photocurable resin 201 and a fixation of the agitated portion. Therefore, it is possible to prevent a fixation of the light transmission portion 206 and a viscosity increase of the photocurable resin 201, smoothly move the manufacturing stage 203 and the manufactured site of the manufactured object 202 without causing speed unevenness and the like, so that improvement of manufacturing accuracy can be expected. In particular, in a case where a gas (pure oxygen or air) having a cure inhibitory property is supplied to the side of the photocurable resin 201 through the light transmission portion 206 by using a material such as a gas permeable resin or glass for the light transmission portion 206, the effect of suppressing the fixation of the light transmission portion 206 and the viscosity increase of the photocurable resin 201 is improved.

As described above, according to the present embodiment, in the three-dimensional manufacture in which the photocuring of the photocurable resin and the movement of the manufacturing stage are repeated, it is possible to increase the speed for replenishing the uncured photocurable resin in the space for the next layer. Besides, by utilizing the gas having the cure inhibitory property, for example, it is possible to suppress the solidification, the fixation and the viscosity decrease of the photocurable resin in the vicinity of the transmission member of the curing light (manufacturing light).

Hereinafter, different embodiments will be described. In the following description, the redundant illustrations and descriptions will be omitted when the overall constitution, the constitution of the controlling system, and the like are the same as those described above. Besides, with respect to the constituent members of apparatuses, devices and circuits, the same reference numerals and symbols are given to the members which are the same as or corresponding to those described above, and the detailed descriptions thereof will be omitted.

Sixth Embodiment

In the fifth embodiment, the light transmission portion 206 is disposed at the upper portion of the container 205, and the manufacturing light is irradiated to the photocurable resin 201 in the manufacturing region 211 by the light irradiating device comprising the light source 208, the mirror unit 209 and the lens unit 210. In the present embodiment, a constitution for irradiating the manufacturing light, that is, the curing light from a direction different from that in FIG. 10 is described.

Figure 13A:
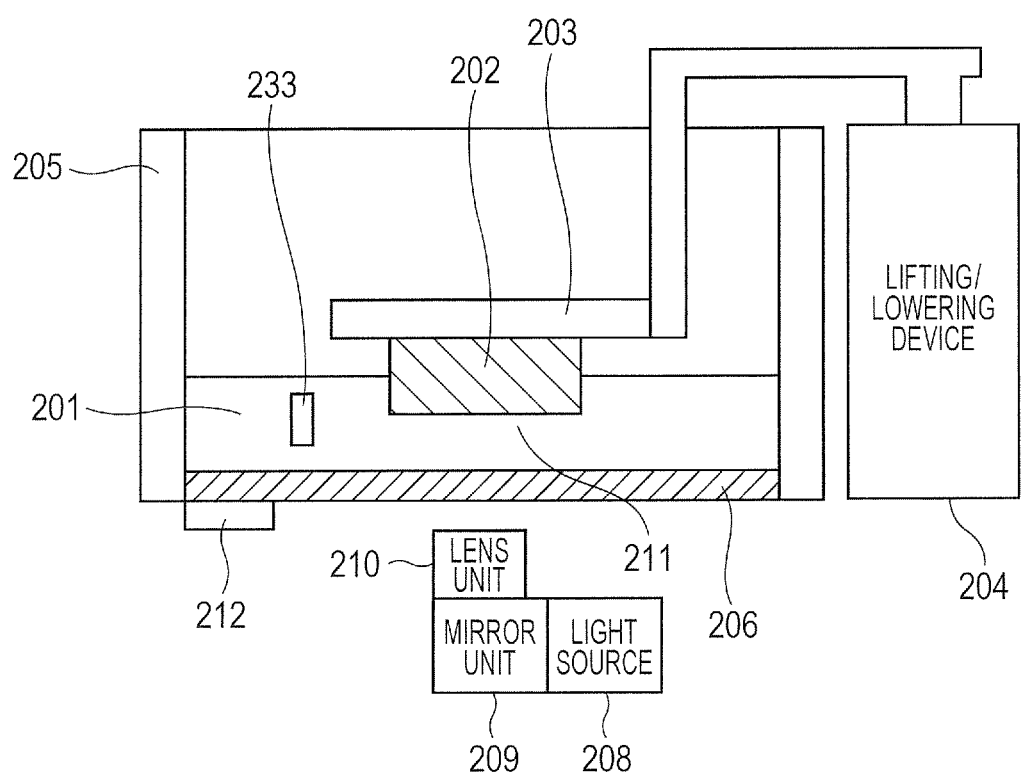
FIG. 13A is an explanatory diagram for describing a constitution of the three-dimensional manufacturing apparatus according to a sixth embodiment of the present invention.

In FIG. 13A, the light irradiating device which comprises the light source 208, the mirror unit 209 and the lens unit 210 is disposed at the lower portion of the container 5 which contains the photocurable resin 1. The light transmission portion 206 is disposed at the bottom site of the container 205, and a part thereof is provided with the exciting device 212 for vibrating the light transmission portion 206. In the constitution of FIG. 13A, the manufacturing light is irradiated from below the container 205 to the photocurable resin 201 in the manufacturing region 211 through the light transmission portion 206. The manufacturing stage 203 is moved upward by the lifting/lowering device 204 depending on the progress of manufacture, thereby forming the manufactured object 202 on the lower surface of the manufacturing stage 203.

As described above, the constitution illustrated in FIG. 13A is different from that of the fifth embodiment only in the irradiation direction of the manufacturing light and the movement directions of the manufactured object 202 and the manufacturing stage 203 due to the manufacture. Also, in the constitution of the present embodiment as described above, by vibrating the light transmission portion 206 and further the photocurable resin 201 in the vicinity of the manufacturing region 211 facing the light transmission portion 206 with use of the exciting device 212, the same operation and effect as that of the above embodiment can be expected. That is, also in the present embodiment, it is possible by the excitation of the exciting device 212 to increase the fluidity of the photocurable resin 201. Thus, for example, it is possible to prevent a fixation between the resin and the light transmission portion 206, and to supply at high speed and smoothly the photocurable resin 201 into the space occurred after the movements of the manufactured object 202 and the manufacturing stage 203. The controlling system (FIG. 15) for the manufacturing control and the manufacturing control procedure (FIGS. 16 and 17) can also be performed in the same way as in the fifth embodiment.

Seventh Embodiment

In the fifth embodiment and the sixth embodiment, the examples in which substantially the entire upper surface and the lower surface of the container 205 are respectively constituted by the light transmission portion 206, and they are respectively excited by the exciting device 212 are described. In the present embodiment, different constitutions around the light transmission portion 206 will be exemplified.

Figure 13B:
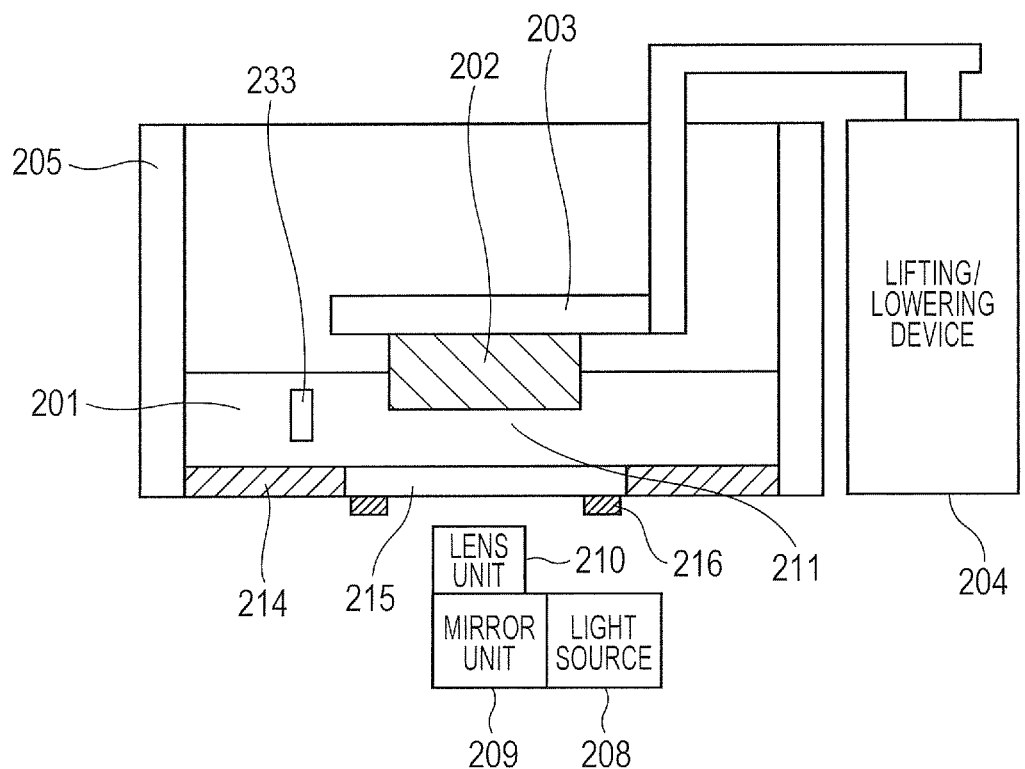
FIG. 13B is an explanatory diagram for describing a constitution of the three-dimensional manufacturing apparatus according to a seventh embodiment of the present invention.

FIG. 13B illustrates a constitution around the light transmission portion 206 in the present embodiment. For the sake of convenience, as well as FIG. 13A, the constitution in which the manufacturing light is irradiated from below is used. However, the constitution around the light transmission portion 206 similar to that in FIG. 13B can be applied to the constitution of the upper irradiating method as described in FIG. 10.

In FIG. 13B, a light transmission portion 215 is a light transmission portion which is similar to the above light transmission portion 206. In the present embodiment, the light transmission portion 215 is formed to have an area where it is necessary to actually transmit the manufacturing light in the central portion of the container 205, and the periphery thereof is supported by a vibration absorbing member 214. In the present embodiment, for example, the light transmission portion 215 and the vibration absorbing member 214 can be formed to have substantially the same surface, and the light transmission portion 215 and the vibration absorbing member 214 together define the bottom surface portion of the container 205. An exciting device 216 is an exciting device which is similar to the exciting device 212, and can be constituted by, for example, a vibrator such as a piezo element. Since the constitutions and operations of the members same as those described in the above embodiments and other members denoted by the same or similar reference numerals as those described in the above embodiments are respectively the same as those described above, the duplicate descriptions are omitted here.

The basic operations and effects by vibrating the light transmission portion 215 and the photocurable resin 201 with use of the exciting device 216 are respectively the same as those described in the above embodiments. That is, the fluidity of the photocurable resin 201 in the vicinity of the manufacturing region 211 is increased. Thus, it is possible to move the manufacturing stage 203 with a low resistance by the lifting/lowering device 204, and it is also possible to supply at high speed and smoothly the photocurable resin 201 into the space occurred after the movement of the manufacturing stage 203.

Furthermore, in the present embodiment, the peripheral edge of the light transmission portion 215 disposed at the center of the bottom surface of the container 205 is supported such that the edge is surrounded by the vibration absorbing member 214, and the exciting device 216 is disposed to the peripheral portion of the light transmission portion 215. The reason for making such a constitution is to propagate the vibration generated by the exciting device 216 as a traveling wave advancing from the peripheral portion to the central portion of the light transmission portion 215.

That is, according to the present embodiment, since the outer periphery of the light transmission portion 215 is connected by the vibration absorbing member 214, the vibration component reflected by the outer peripheral edge of the light transmission portion 215 is small, and the vibration generated by the exciting device 216 advances from the periphery to the center of the light transmission portion 215.

As illustrated in FIG. 11, after the curing light is irradiated, the photocurable resin 201 enters the space formed by moving the manufacturing stage 203, from the outer peripheral portion toward the center of the manufacturing region 211. Therefore, by propagating the vibration generated by the exciting device 216 as the traveling wave advancing from the periphery to the center of the light transmission portion 215 as described above, it is possible to supply the photocurable resin 201 to the vicinity of the manufacturing region 211 at higher speed and more smoothly as compared with the above embodiments.

Figure 14A:
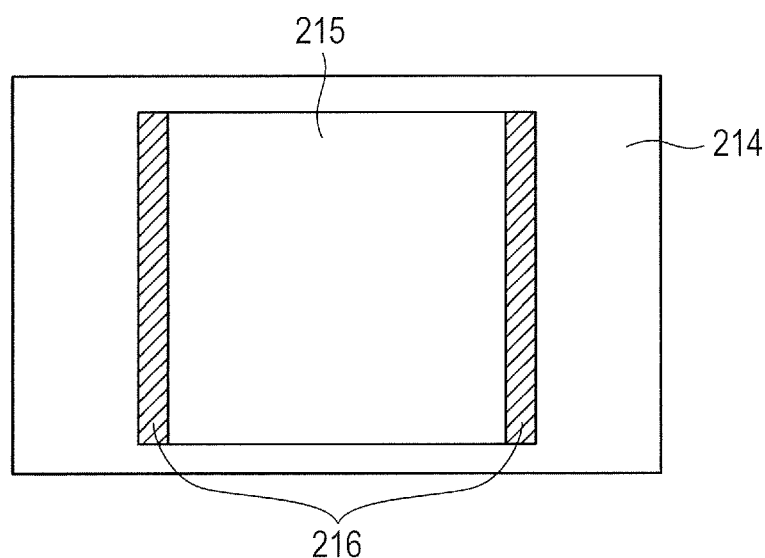
FIG. 14A is an explanatory diagram for describing a planar arrangement form of an exciting device.
Figure 14B:
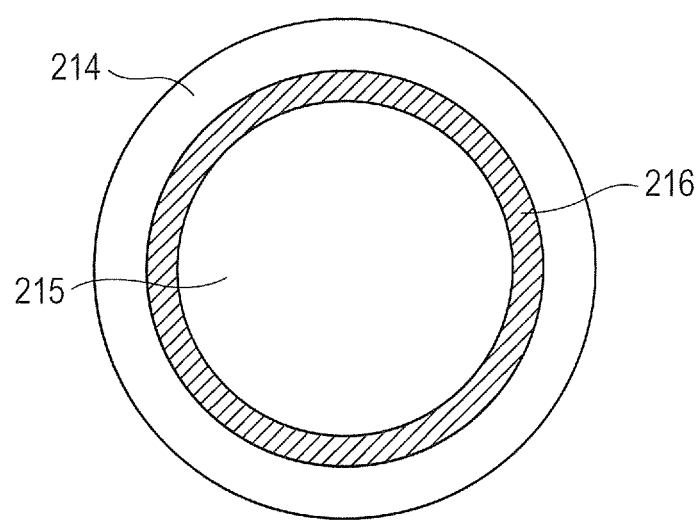
FIG. 14B is an explanatory diagram for describing another planar arrangement form of the exciting device.
Figure 14C:
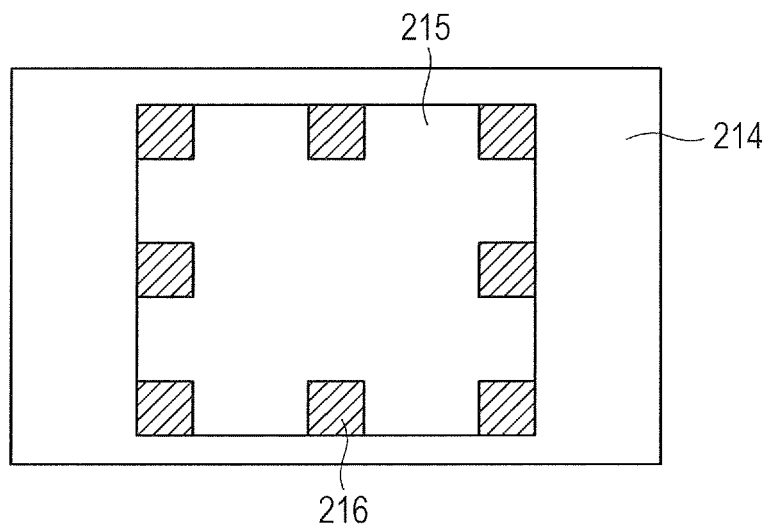
FIG. 14C is an explanatory diagram for describing a still another planar arrangement form of the exciting device.

The arrangement of the exciting device 216 on the installation surface of the light transmission portion 206 may be constituted as illustrated in FIGS. 14A to 14C.

FIG. 14A is the diagram for describing the constitution of the vibration absorbing member 214, the light transmission portion 215 and the exciting devices 216 which are disposed on the upper portion or the lower portion of the container 205 in a case where, for example, the container 205 has a box shape having a rectangular transverse cross-section surface. In the constitution of FIG. 14A, the light transmission portion 215 surrounded and supported by the vibration absorbing member 214 has a rectangular shape. The two exciting devices 216 and 216 having stripe shapes are attached to the edges of the two opposed sides of the light transmission portion 215. Therefore, the vibrations respectively generated by the exciting devices 216 and 216 advance toward the center from two opposed sides of the light transmission portion 215, thereby enhancing the fluidity of the photocurable resin 201 and facilitating the movement of the photocurable resin 201 toward such directions.

In the constitution of FIG. 14A, it is not always necessary to drive both of the two exciting devices 216 and 216 at the same time. For example, depending on the shape of the manufactured object 202, it may be convenient to facilitate the flow of the photocurable resin 201 only from the left to the right in the drawing or in the opposite direction thereof. Therefore, as illustrated in FIG. 14A, when the exciting device which includes the plurality of independently-drivable vibrators is used, for example, the CPU 601 (FIG. 15) of the controlling system may control to selectively drive the vibrators of the exciting device, that is, transducers thereof, depending on the shape of the manufactured object 202 or the like.

FIG. 14B is the diagram for describing the constitution of the vibration absorbing member 214, the light transmission portion 215 and the exciting device 216 which are disposed on the upper portion or the lower portion of the container 205 in a case where, for example, the container 205 has a hollow cylindrical shape or the like. In the constitution of FIG. 14B, the vibration absorbing member 214 and the light transmission portion 215 are respectively concentric. For example, the circumference of the circular light transmission portion 215 is surrounded and supported by the vibration absorbing member 214. The annular exciting device 216 is installed on the periphery of the circular light transmission portion 215. In the shown example, the annular exciting device 216 and the circular light transmission portion 215 have substantially the same outer diameter. Therefore, in this constitution, the vibration generated by the exciting device 216 advances from the outer peripheral edge of the light transmission portion 215 toward the center portion, thereby increasing the fluidity of the photocurable resin 201 and facilitating the movement of the photocurable resin 201 toward such a direction.

The constitution illustrated in FIG. 14A can be changed to, for example, the constitution illustrated in FIG. 14C. In FIG. 14C, the exciting devices 216 as indicated by the hatched lines are disposed at the four corner portions and the centers of the four sides of the rectangular light transmission portion 215 surrounded by the vibration absorbing member 214. By driving the exciting devices 216 all at once, a traveling wave advancing from the peripheral portion to the center of the light transmission portion 215 can be generated with a pattern similar to the case of the annular arrangement illustrated in FIG. 14B, and the generated traveling wave can be transmitted to the photocurable resin 201. Further, also in the case where the CPU 601 (FIG. 15) of the controlling system controls to selectively drive the vibrators of the exciting devices depending on, for example, the shape of the manufactured object 202 or the like, it is possible to finely select the combination of the vibrators to be vibrated. Therefore, it may be possible to widely cope with the manufactured object 202 having complicated cross-section shapes.

Eighth Embodiment

Figure 18:
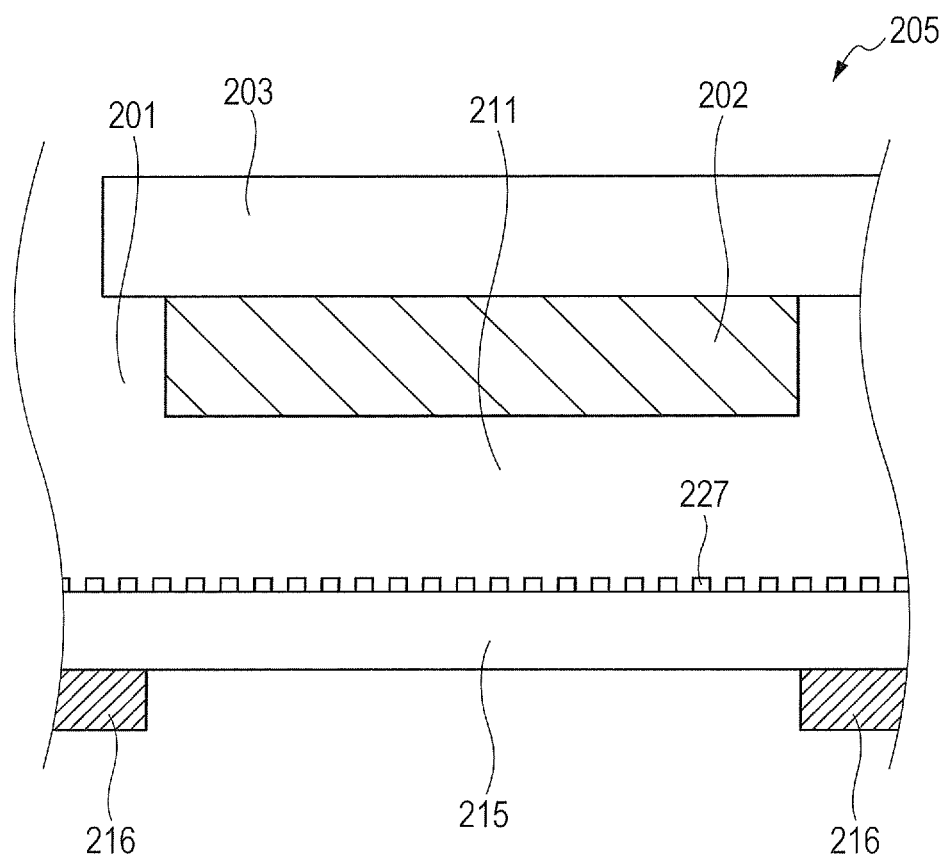
FIG. 18 is an explanatory diagram for describing a constitution of the three-dimensional manufacturing apparatus according to an eighth embodiment of the present invention.

In the eighth embodiment, an example of the detailed constitution of the light transmission portion will be described. FIG. 18 is a block diagram for describing the principal portion of the constitution in which the light transmission portion 215 is disposed on the bottom surface of the container 205, as well as FIGS. 13A and 13B. Although a light irradiating device is not illustrated in FIG. 18, the manufacturing light is irradiated from below to the manufacturing region 211 located below the manufactured object 202 and the manufacturing stage 203 via the light transmission portion 15.

In FIG. 18, the exciting device 216 is installed on the lower surface of the light transmission portion 215. The cross-section diagram of FIG. 18 corresponds to the arrangement of the exciting device 216 as illustrated in FIGS. 13A, 14A and 14B. However, a different arrangement pattern of the exciting devices 216 may be adopted. Besides, even if there is no exciting device 216, the effect of the present invention can be achieved.

The present embodiment is characterized in that concavo-convex shapes 227 are provided on the surface of the light transmission portion 215 facing the photocurable resin 201. For example, each of the concavo-convex shapes 227 is formed to have, for example, the rectangular cross-section surface with a height of 5 µm to 50 µm and a pitch of 10 µm to 0.2 mm. The concavo-convex shapes 227 are obtained by direct processing or integral formation of the surface of the light transmission portion 215. In addition, the concavo-convex shapes 227 are obtained by adhering a thin portion provided with the uneven (concavo-convex) shapes by integral formation with the same material as the light transmission portion 215.

By disposing the fine concavo-convex shapes 227 each having the above size on the surface of the light transmission portion 215 facing the photocurable resin 201, it is possible to efficiently transmit the vibration of the light transmission portion 215 excited by the exciting device 216 to the photocurable resin 201 via the concavo-convex shapes 227. Thus, it is possible to efficiently increase the fluidity of the photocurable resin 201 in the vicinity of the manufacturing region 211. When the manufactured object 202 and the manufacturing stage 203 are moved, it is possible to supply at high speed and smoothly the photocurable resin 201 to the vicinity of the manufacturing region 211. Besides, even if a fixation or a viscosity increase of the photocurable resin 201 occurs in the vicinity of the manufacturing region 211, it is possible to facilitate peeling of the photocurable resin 201 at the time of the movements of the manufactured object 202 and the manufacturing stage 203 by the vibration. Therefore, the lifting/lowering device (204) can move the manufactured object 202 and the manufacturing stage 203 with small driving force.

Further, when the concavo-convex shapes 227 are arranged on the surface of the light transmission portion 215 facing the photocurable resin 201 with, for example, the above dimension and shape, for example, it is conceivable to set the amplitude for exciting the light transmission portion 215 by the exciting device 216 to be equal to or higher than 5 μm, and the period to be equal to or higher than 10 μm. By making the excitation period and amplitude of the exciting device 216 coincident with the size and the shape of the concavo-convex shape 227, particularly the period, it becomes possible to diffuse and blur the manufacturing light irradiated through the light transmission portion 215. That is, it is possible to blur the outline deviation due to image distortion at a time when the manufacturing light enters the fine concavo-convex shapes 227. Thus, it is possible to smoothly connect the outline of the manufactured object 202.

Besides, in a case where the lens unit 210 and the mirror unit 209 as illustrated in FIG. 13A or FIG. 10 are used, when the manufacturing light is scanned over a specific plane range of the manufacturing region 211, the optical path of the manufacturing light is inclined in the peripheral portion as compared with the optical path of light incident to the center of the manufactured object 202.

Therefore, in order to compensate for aberration and distortion caused by such inclination, it is conceivable to constitute the surface of the light transmission portion 215 on the side of the photocurable resin 201 as a lens by utilizing the concavo-convex shapes 227. For example, the concavo-convex shapes 227 are used to constitute a Fresnel lens.

Besides, if a geometry of the concavo-convex shape 227 is in the range of the height of 5 μm to 50 μm and the pitch of 10 μm to 0.2 mm, a diffractive lens can be constituted using the concavo-convex shapes 227. In the diffractive lens, the groove constitution forming the concavo-convex shapes 227 is arranged to make concentric circles. Here, for example, the pitch thereof is an irregular-pitch pattern which is sparse in the central region of the light transmission portion 215 and dense in the peripheral region thereof. Thus, it is possible to correct the optical path of the manufacturing light directed toward the irradiated portion of the manufacturing region 211 so that they are aligned, for example, substantially in parallel at the center and the peripheral portion of the manufactured object 202. As a result, it is possible to remarkably improve the manufacture accuracy of the manufactured object 202.

Ninth Embodiment

A further different embodiment will be described with reference to FIGS. 19A to 20B. In the above fifth to eighth embodiments, the exciting devices 212 and 216 are installed on the light transmission portions 206 and 215 respectively, and the light transmission portions 206 and 215 are vibrated in the contact state. On the other hand, the present embodiment is different from the fifth to eighth embodiments in the point that an exciting device 120 for vibrating the light transmission portion 215 in a non-contact manner is arranged.

Figure 19A:
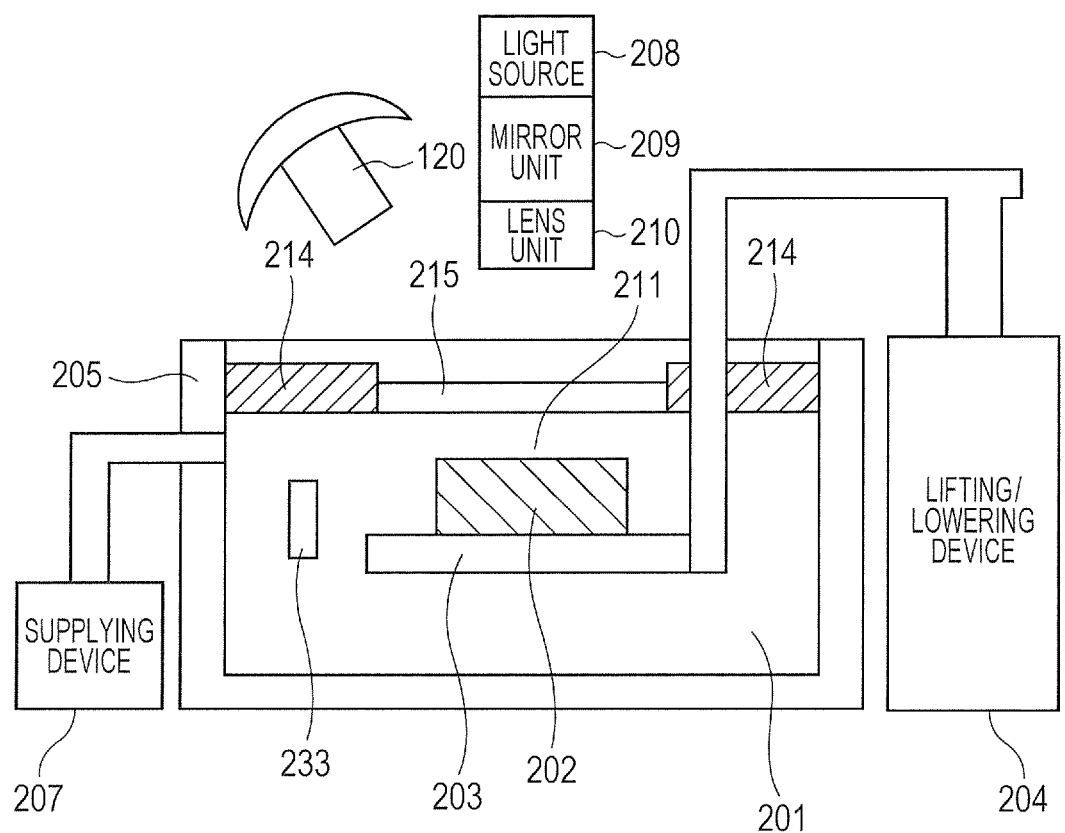
FIGS. 19A and 19B are explanatory diagrams for describing constitutions of the three-dimensional manufacturing apparatus according to a ninth embodiment of the present invention.
Figure 19B:
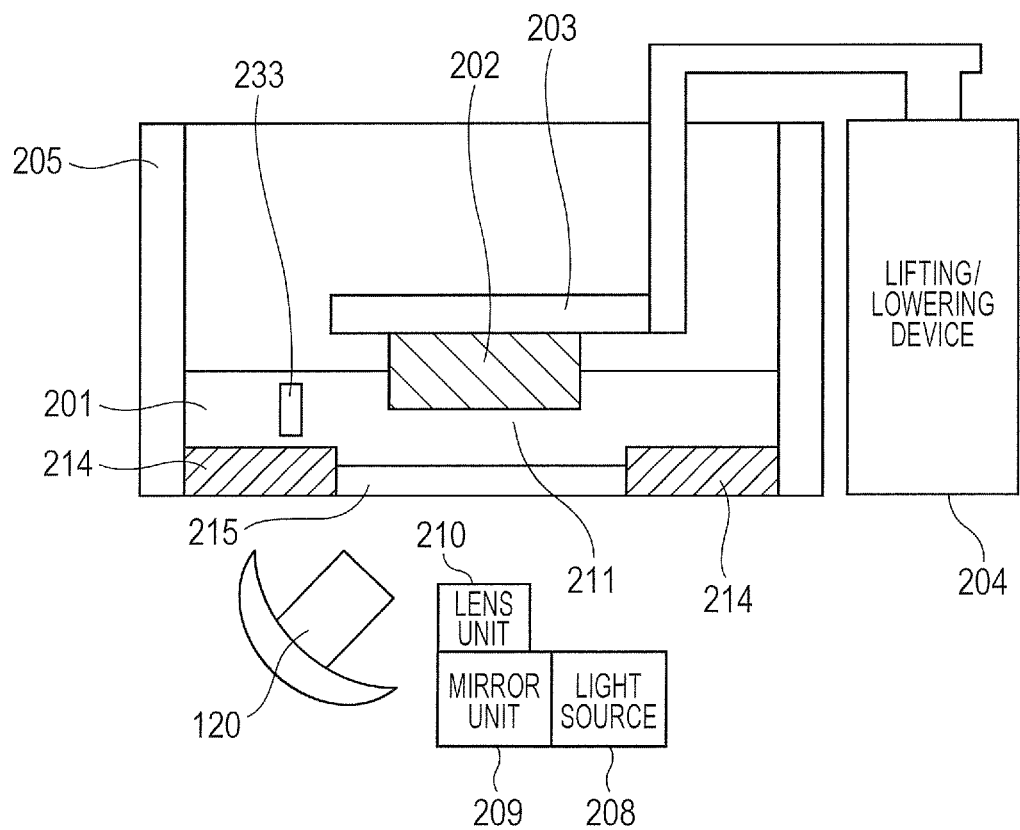

FIGS. 19A and 19B are the diagrams for describing a constitution example of the present embodiment. More specifically, FIG. 19A describes the arrangement in the basic constitution of irradiating the manufacturing light from the upper side as well as FIGS. 10 and 13A, and FIG. 19B describes the arrangement in the basic constitution of irradiating the manufacturing light from below as well as FIG. 13B.

FIGS. 19A and 19B are different from the above fifth to eighth embodiments in the point that the exciting device 120 for vibrating the light transmission portion 215 in the non-contact manner is disposed facing the light transmission portion 215. In the present embodiment, the exciting device 120 is constituted by a means for radiating vibration in the form of acoustic energy, for example, an electromagnetically driven or piezoelectrically driven speaker. In particular, it is preferable that the exciting device 120 is capable of intensively vibrating a site of the light transmission portion 215 in the non-contact manner with directivity. For this reason, it is preferable to use, for example, a parametric speaker as the transducer of the exciting device 120. In general, as the parametric speaker, a plurality of speakers driven with a so-called ultrasonic band having a strong directivity and being higher than an audible range are arranged, and it is possible by these speakers to transmit the acoustic energy in the air in a specific direction.

A description of the detailed constitution of the exciting device 120 as the parametric speaker is omitted. The plurality of speaker elements constituting the exciting device 120 are driven with the ultrasonic band having the strong directivity and being higher than the audible range. In that case, a transmission signal is applied to a driving signal in a transmission method of AM (amplitude modulation), DSB (double side band), SSB (single side band) or FM (frequency modulation). Here, the transmission signal is a signal which has an excitation frequency at which the light transmission portion 215 is to be vibrated. Thus, the vibration can be transmitted as the acoustic energy toward the light transmission portion 215 with directivity. Of course, it is apparent that, from the arrangement of the light transmission portion 215, the exciting device 120 is disposed so as to conform its directivity direction to the direction of the light transmission portion 215 from the upper side in the arrangement of FIG. 19A and from the lower side in the arrangement of FIG. 19B.

For example, the excitation frequency of the transmission signal of the exciting device 120, that is, the excitation frequency for vibrating the light transmission portion 15, is preferably set to the resonance frequency (f0) of the light transmission portion 215. Thus, it is possible to efficiently vibrate the light transmission portion 215 with small driving power.

In both FIGS. 19A and 19B, as well as the constitution illustrated in FIG. 13B, the light transmission portion 215 has the support constitution in which the periphery thereof is surrounded and supported by the vibration absorbing member 214. Incidentally, in FIGS. 19A and 19B, the arrangements and the constitutions of the other members respectively having the same reference numerals as those described in FIGS. 10, 13A, 13B and the like are the same as those in the above embodiment, and the duplicate descriptions are omitted.

The controlling system (FIG. 15) and the manufacturing control procedure (FIGS. 16 and 17) for the manufacturing control can also be implemented and performed in the same manner as those in the above fifth embodiment. However, the excitation controlling unit 606 is changed to a constitution which can drive the speaker and the parametric speaker constituting the exciting device 120. Particularly in the case of the parametric speaker, a modulation circuit for generating a desired transmission signal, that is, a signal which has a frequency at which the light transmission portion 215 is to be vibrated, or the like is provided in the exciting device 120.

With the above constitution, in the present embodiment, as illustrated in FIGS. 19A and 19B, the light transmission portion 215 is vibrated in the non-contact manner by the exciting device 120. In particular, by constituting the exciting device 120 with the parametric speaker, it is possible to efficiently enhance the fluidity of the photocurable resin 201 in the vicinity of the manufacturing region 211. Therefore, when the manufactured object 202 and the manufacturing stage 203 are moved, it is possible to supply at high speed and smoothly the photocurable resin 201 to the vicinity of the manufacturing region 211. Even if a fixation or a viscosity increase of the photocurable resin 201 occurs in the vicinity of the manufacturing region 211, it is possible to facilitate peeling of the photocurable resin 201 at the time of the movements of the manufactured object 202 and the manufacturing stage 203 by the vibration. Therefore, the lifting/lowering device 204 can move the manufactured object 202 and the manufacturing stage 203 with small driving force.

As described in the seventh embodiment (FIGS. 13B to 14C), it is desirable that the vibration generated by the exciting device 120 is propagated as the traveling wave advancing from the peripheral portion to the central portion of the light transmission portion 215. For this purpose, it is possible to use the constitution illustrated in FIGS. 20A and 20B.

Figure 20A:
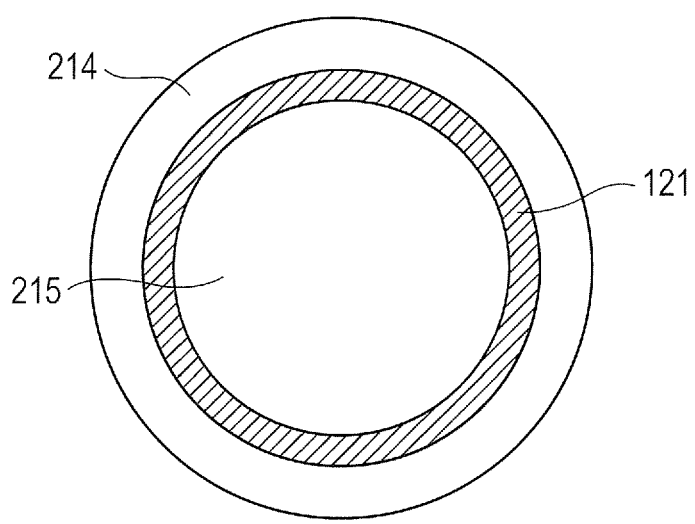
FIG. 20A is an explanatory diagram for describing a planar arrangement form of a resonating member.
Figure 20B:
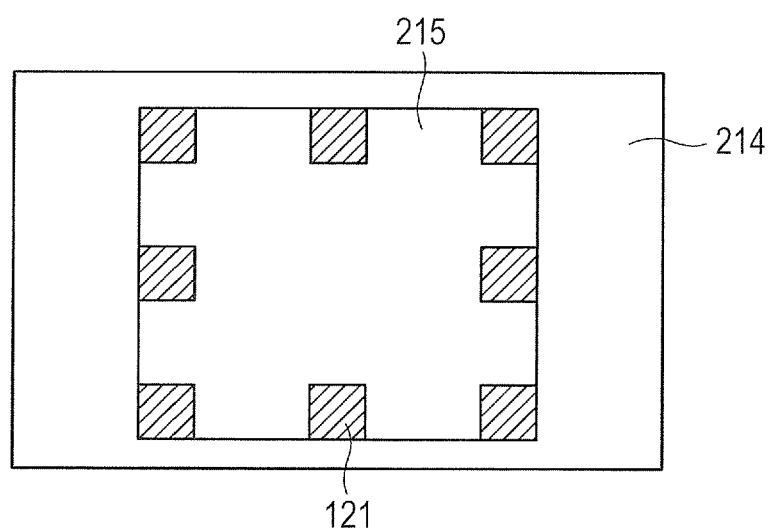
FIG. 20B is an explanatory diagram for describing another planar arrangement form of the resonating member.

In FIGS. 20A and 20B, as well as the constitution illustrated in FIGS. 14B and 14C of the seventh embodiment, the circular and rectangular light transmission portions 215 are surrounded and supported by the vibration absorbing members 214, respectively. In FIGS. 20A and 20B, the portions indicated by the hatched lines (corresponding to the exciting device 216 in FIGS. 14B and 14C) are resonance members 121.

For example, in FIG. 20A, the resonance member 121 having a resonance characteristic with respect to the excitation frequency of the parametric speaker of the exciting device 212 is arranged so as to form a circumferential shape around the light transmission portion 215. Besides, in FIG. 20B, the plurality of resonance members 121 each having the resonance characteristic with respect to the excitation frequency of the parametric speaker of the exciting device 212 are arranged in the peripheral portion of the light transmission portion 215, for example, at the corner portions and the center portions of the side portions. Although not illustrated in the present embodiment, as well as the arrangement of the exciting devices 216 and 216 in FIG. 14A, it may be possible to adopt a constitution in which the resonance members 121 are installed to the edges of the two opposing sides of the light transmission portion 215.

In FIGS. 19A and 19B, the resonance member 121 is not illustrated. Therefore, the signal which has the excitation frequency corresponding to the resonance frequency (f0) of the light transmission portion 215 is transmitted from the exciting device 120 to the light transmission portion 215 in the non-contact manner. On the other hand, in the case where the resonance member 121 is arranged as illustrated in FIGS. 20A and 20B, the signal corresponding to the resonance frequency (f0) of the resonance member 121 is transmitted to the resonance member 121 from the exciting device 120 in the non-contact manner. The directivity direction of the exciting device 120 is appropriately adjusted so as to cover the resonance member 121 in FIGS. 20A and 20B. Further, the resonance frequency (f0) of the light transmission portion 215 is preferably set to a value which deviates from the resonance frequency (f0) of the resonance member 121. Thus, the exciting device 120 first transmits the vibration as the acoustic energy to the resonance member 121, and transmits the vibration as the traveling wave from the resonance member 121 in the peripheral portion of the light transmission portion 215 toward the center portion of the light transmission portion 215. In the present embodiment, the vibration absorbing member 214 acts so as to mainly direct the vibration from the peripheral portion to the central portion of the light transmission portion 215.

According to the constitutions as illustrated in FIGS. 20A and 20B, the vibration transmitted to the resonance member 121 advances from the outer peripheral edge of the light transmission portion 215 toward the center portion thereof, thereby enhancing the fluidity of the photocurable resin 201 (FIGS. 19A and 19B) and facilitating the movement of the photocurable resin 201 toward the center portion. As just described, by propagating the vibration as the traveling wave advancing from the periphery to the center of the light transmission portion 215, it is possible to supply at high speed and smoothly the photocurable resin 201 to the vicinity of the manufacturing region 211, thereby further improving the above operation and effect.

Tenth Embodiment

Figure 21:
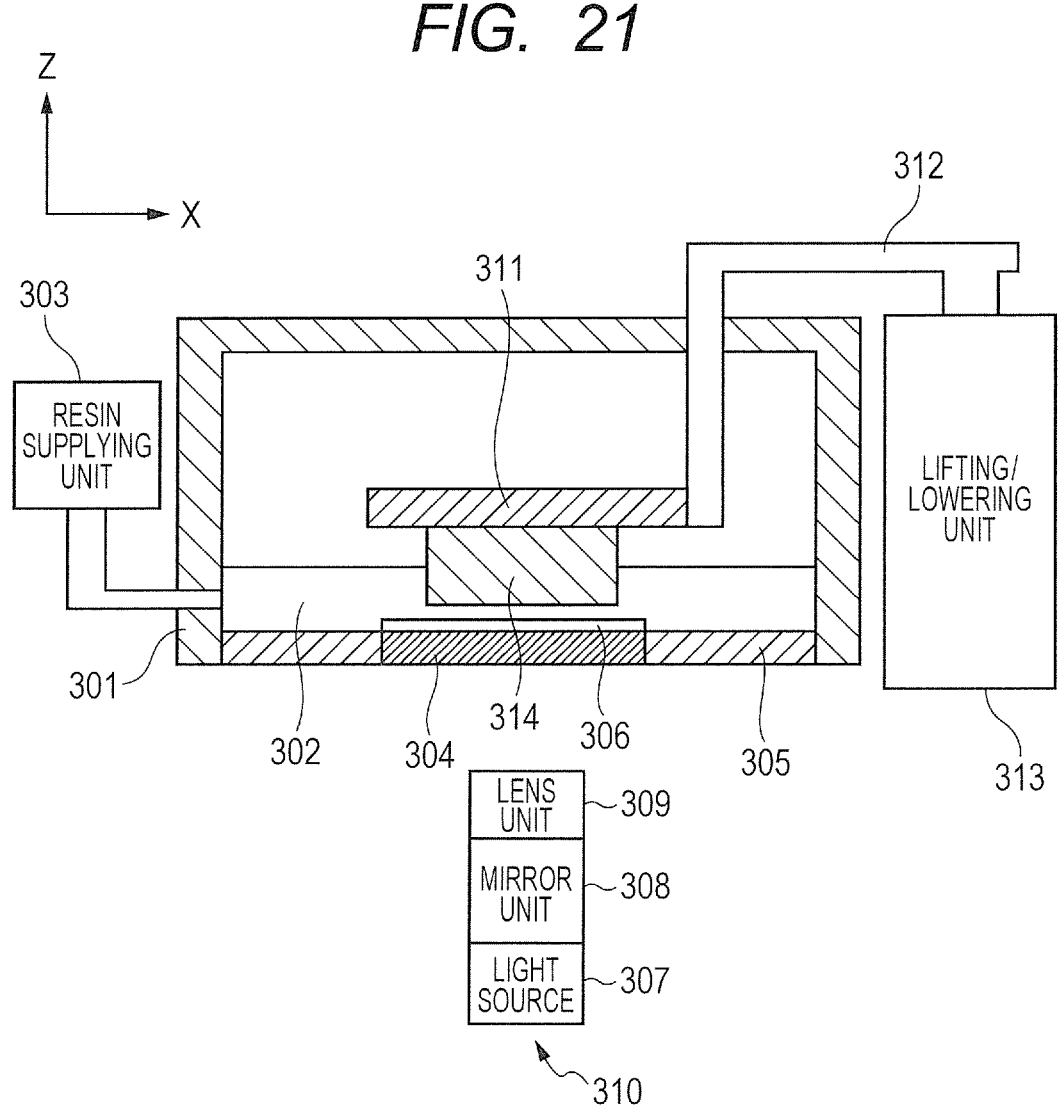
FIG. 21 is a schematic cross-section diagram of the three-dimensional manufacturing apparatus according to a tenth embodiment.

FIG. 21 is a schematic cross-section block diagram for describing a constitution of the three-dimensional manufacturing apparatus according to the tenth embodiment of the present invention.

(Constitution of Apparatus)

In FIG. 21, there are illustrated a container 301, a liquid photocurable resin 302, a resin supplying unit 303, a light transmission portion 304, a light shielding portion 305, a convex portion forming region 306, a light source 307, a mirror unit 308, a lens unit 309, a light source unit 310, a base 311, a lifting/lowering arm 312, a lifting/lowering unit 313, and a three-dimensional manufactured object 314.

The container 301, which is a container for holding the liquid photocurable resin 302, is formed of a material which blocks light of a wavelength region in which the liquid photocurable resin is cured or solidified.

The resin supplying unit 303 comprises a tank for storing the liquid photocurable resin and a pump, and supplies the liquid photocurable resin so that an appropriate amount of the liquid photocurable resin 302 is held in the container 301.

The liquid photocurable resin 302 is a liquid resin which is cured (solidified) when light of a specific wavelength region is irradiated. The liquid photocurable resin 302 is filled in the container 301 up to the lower surface of the light transmission portion 304 and the light shielding portion 305, and is held so as to prevent bubbles from entering. The light transmission portion 304 and the light shielding portion 305 together function as the bottom of the container 301.

The light transmission portion 304 is a portion through which light of the wavelength region in which the liquid photocurable resin 302 is solidified is transmitted, and through which a gas for inhibiting curing of the liquid photocurable resin is transmitted or permeated. For example, the light transmission portion is formed of a resin such as fluoropolymer, silicone polymer or the like (PFA, PTFE, PE or the like), or porous glass.

The liquid photocurable resin in the vicinity of the light transmission portion 304 decreases in a photocuring sensitivity by the action of the cure inhibitory gas which has passed through the light transmission portion 304. Since the gas which exerts the cure inhibiting action is, for example, oxygen, it is sufficient if the ordinary atmospheric air exists outside the light transmission portion 304. However, in order to make the action of the gas more effective, a mechanism for controlling a composition and a pressure of the outside air of the light transmission portion may be provided.

More specifically, to obtain a cured object by curing the photocurable resin, an energy beam is irradiated to the portion of the photocurable resin to be cured. Then, initially, a polymerization initiator contained in the photocurable resin is cleaved by the irradiation of the energy beam, and radicals are generated. Next, a polymerization inhibitor and dissolved oxygen contained in the photocurable resin react with the radicals and are consumed together with the radicals. When such a state continues, it becomes a state that the polymerization inhibitor and the dissolved oxygen contained in the photocurable resin hardly exist. Subsequently, when the energy beam irradiation is continued, the generated radical reacts with a polymerizable compound contained in the photocurable resin, and a radical polymerization reaction occurs. Thereafter, the radical polymerization reactions serially occur, so that the low-molecular polymerizable compound is polymerized. In case of considering the above chemical reaction as a physical phenomenon, it is found that, when the energy beam is irradiated to the photocurable resin being in the liquid state, the photocurable resin is cured and solidified.

On the other hand, when the energy beam is irradiated to the photocurable resin in a gas containing oxygen, for example, in the atmosphere, there occurs a phenomenon that the surface portion being in contact with the atmosphere is not cured even when the relevant portion is sufficiently irradiated by the energy beam. This is because the polymerization inhibitor or the dissolved oxygen contained in the photocurable resin reacts with the radical by the irradiation of the energy beam and is consumed, and, at the same time, the oxygen in the atmosphere continues to dissolve into the photocurable resin so that it does not reach the state that there is no dissolved oxygen. Thus, the radical does not react with the polymerizable compound.

By supplying a cure inhibitor of the photocurable resin at all time from the light transmission portion, it is possible to maintain a cure inhibitory region (uncured layer) between the light transmission portion and the manufactured object. By utilizing such a phenomenon, it is possible to easily form the continuous three-dimensional manufactured object. For example, a material having a high oxygen permeation coefficient [$m^3 \cdot m/m^2 \cdot s \cdot Pa$] is used as the material of the light transmission portion, and a gas containing oxygen, for example, the atmosphere, is filled on the side of the light transmission portion being not in contact with the photocurable resin. Thus, the oxygen is supplied at all time from the light transmission portion, and the cure inhibitory region is maintained between the light transmission portion and the manufactured object, so that the three-dimensional manufactured object can continuously be formed.

Here, the thickness of the uncured layer is defined as a position at which oxygen supply and oxygen consumption are balanced. Factors of controlling the oxygen supply are mainly an oxygen partial pressure, the oxygen permeation coefficient of the light transmission portion, and the oxygen permeation coefficient of the photocurable resin. Factors of controlling the oxygen consumption are mainly an energy beam intensity, a polymerization initiator concentration, and a cleavage energy of the polymerization initiator. With respect to such control factors, when a material having a sufficient oxygen permeation coefficient is used as the light transmission portion the atmospheric pressure of 1 atmosphere is used and a photocurable resin and a photocuring process generally used for optical manufacture are used, the uncured layer of about 30 μm is maintained. On the other hand, when pure oxygen of 1 atmosphere is used and the energy beam intensity is set to one quarter of a normal condition which is the minimum limit capable of performing the manufacture, the uncured layer of about 100 μm is maintained.

Next, the light shielding portion 305 is a portion composed of a member for blocking light having the wavelength region in which the liquid photocurable resin 302 is solidified. In the present embodiment, the light transmission portion 304 is provided at the portion which serves as the optical path between the light source unit 310 and the base 311 among the portions functioning as the bottom of the container, and the light shielding portion 305 is provided in the other areas.

On the upper surface of the light transmission portion 304, that is, on the surface being in contact with the liquid photocurable resin, the convex portion forming region 306 through which UV (ultraviolet) light serving as the energy beam and an oxygen gas serving as the cure inhibitor are transmitted or permeated is provided. The convex portion forming region 306 will be described in detail later.

The light source 307, the mirror unit 308 and the lens unit 309 together constitute the light source unit 310 for irradiating the liquid photocurable resin with light corresponding to the shape of the three-dimensional model to be manufactured. The light source 307 is a light source which irradiates light of the wavelength region in which the liquid photocurable resin is solidified. For example, when a material which is sensitive to ultraviolet light is used as the photocurable resin, an ultraviolet light source such as a He—Cd laser, an Ar laser or the like is used. The mirror unit 308 is a unit which modulates the light irradiated from the light source 307 in correspondence with the shape of the three-dimensional model to be manufactured, and a device in which micro mirror devices are arranged in an array is used for the mirror unit. The lens unit 309 is a lens for converging the modulated light at a predetermined position above the cure inhibitory region in the vicinity of the light transmission portion. The liquid photocurable resin 302 at the predetermined position is cured when it is irradiated with the converged ultraviolet light of a sufficient intensity.

In order to secure accuracy of the shape of the cured object, it is desirable to set the focal position of a condensing lens to the vicinity of the light transmission portion. However, if the focal position is too close to the light transmission portion, there is a possibility of overlap with the cure inhibitory region. Therefore, it is desirable to set the focal position of the lens unit 309 to a position 60 µm to 110 µm above the upper surface of the light transmission portion 304.

Incidentally, as long as the light source unit 310 has a function for modulating the light of the wavelength region in which the liquid photocurable resin is solidified, in correspondence with the shape of the three-dimensional manufactured object to be manufactured, and converging the modulated light in a predetermined position, the light source unit is not limited to that exemplified as above. For example, it may be possible to use a combination of an ultraviolet light source and a transmissive liquid crystal shutter, a combination of the ultraviolet light source and a reflective liquid crystal element, a semiconductor laser diode array, a scanning mirror, an imaging mirror, or the like.

The base 311, which is a base (table) for suspending and supporting the three-dimensional manufactured object 314 on its lower surface, is connected to the lifting/lowering unit 313 via the lifting/lowering arm 312. The lifting/lowering unit 313 is a mechanism which is used to adjust the height of the base 311 by moving the lifting/lowering arm 312 up and down, and is a moving unit for moving the base.

Figure 22:
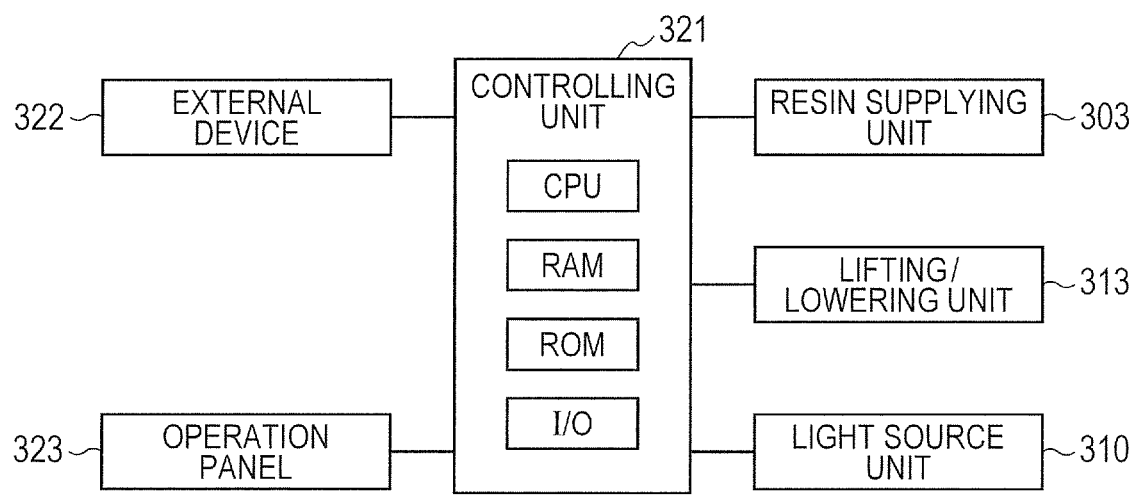
FIG. 22 is a control block diagram of the three-dimensional manufacturing apparatus according to the tenth embodiment.

FIG. 22 is a block diagram of the three-dimensional manufacturing apparatus which comprises a controlling unit 321, an external device 322, an operation panel 323, the resin supplying unit 303, the light source unit 310, and the lifting/lowering unit 313.

The controlling unit 321 comprises a CPU, a ROM which is a nonvolatile memory of storing a control program and a numerical table for control, a RAM which is a volatile memory to be used for calculations and the like, an I/O port which is used to communicate with respective units and the outside of the apparatus, and the like. Incidentally, a program for controlling the basic operation of the three-dimensional manufacturing apparatus is stored in the ROM.

From the external device 322, shape data of the three-dimensional manufactured object is input to the controlling unit 321 of the three-dimensional manufacturing apparatus via the I/O port.

The operation panel 323 comprises an inputting unit for causing an operator of the three-dimensional manufacturing apparatus to give instructions to the apparatus, and a displaying unit for displaying information to the operator. The inputting unit includes a keyboard and operation buttons. The displaying unit includes a display panel for displaying operation status and the like of the three-dimensional manufacturing apparatus.

The controlling unit 321 controls the resin supplying unit 303, the light source unit 310 and the lifting/lowering unit 313, thereby enabling to perform the three-dimensional manufacturing process.

(Convex Portion Forming Region)

Figure 23A:
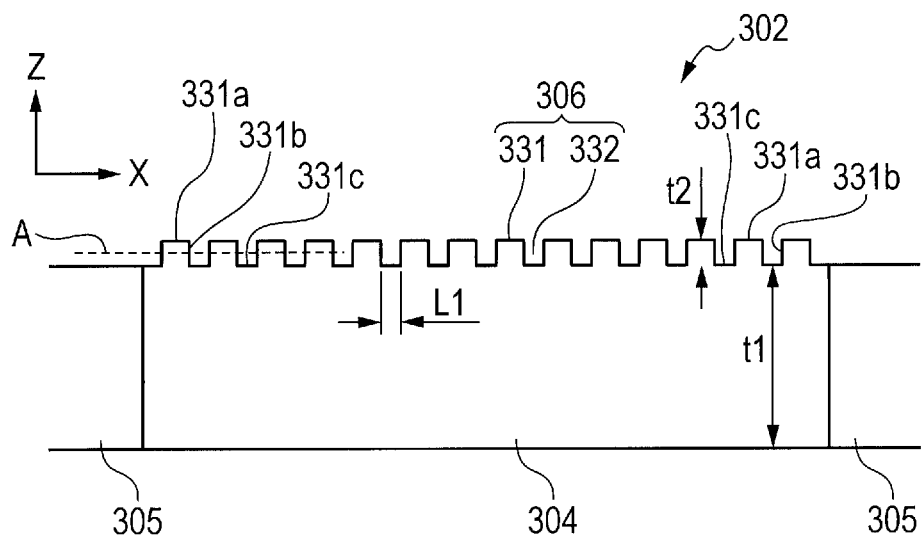
FIG. 23A is a vertical-direction schematic cross-section diagram of a light transmission portion of the tenth embodiment.

The upper surface of the light transmission portion 304, that is, the surface of the side which is in contact with the liquid photocurable resin, comprises the convex portion forming region 306. FIG. 23A is a cross-section diagram for schematically describing the vicinity of the light transmission portion 304 illustrated in FIG. 21.

The convex portion forming region 306 includes a plurality of convex portions 331 through which the curing light and the cure inhibitor are transmitted, and spaces 332 which are in communication with the outside of the light transmission portion in plan view and are filled with the liquid photocurable resin 302.

Figure 23B:
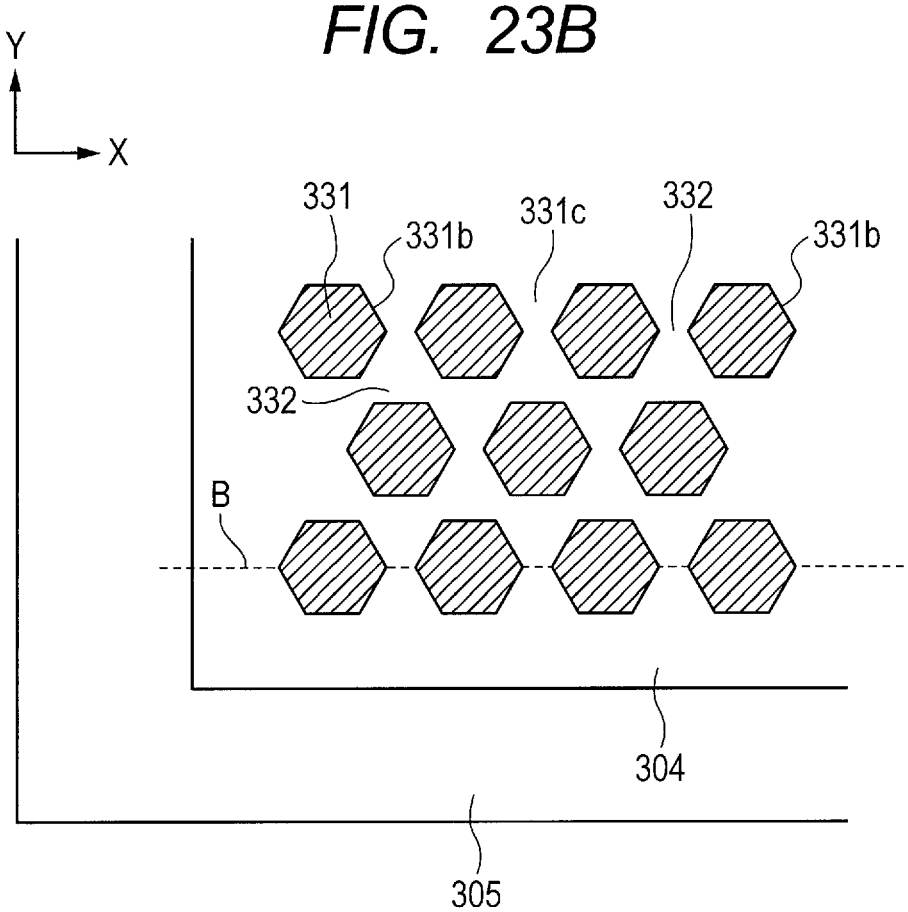
FIG. 23B is a horizontal-direction schematic cross-section diagram of the light transmission portion of the tenth embodiment.

FIG. 23B is a top view for schematically describing an enlarged part of the horizontal cross-section taken along a dotted line A in FIG. 23A. Incidentally, the dotted line A indicates the plane which is in parallel with the main surface of the light transmission portion. FIG. 23A is the side view for schematically describing the vertical cross-section taken along a dotted line B in FIG. 23B. It should be noted that, since these drawings are schematically illustrated for the convenience of explanation, the number, the shapes and the arrangement of the convex portions are not necessarily illustrated accurately.

In the tenth embodiment, the base of the light transmission portion 304 and the convex portions 331 are integrally formed by the same material. A thickness t1 of the base is normally set to 1 mm to 10 mm, and the hexagonal-prism convex portions 331 are arranged in a hexagonal close-packed arrangement with interspaces.

The convex portion forming region 306 has the following aspects.

(1) The space 332 separating the convex portions communicates with the outside of the light transmission portion in the horizontal direction, that is, in the plane parallel to the main surface of the light transmission portion.

(2) Preferably, a distance L1 between the adjacent convex portions is in the range from 60 µm to 200 µm.

(3) Preferably, a cross-section area (horizontal cross-section area) of the convex portion in the cross-section parallel to the main surface of the light transmission portion is equal to or higher than 45% and equal to or less than 80%, with respect to an area of the region irradiated with the curing light on the main surface of the light transmission portion.

When the convex portion forming region having the above aspects is provided, the sufficiently thick cure inhibitory region is maintained between the light transmission portion 304 and the three-dimensional manufactured object 314, and at the same time, the cure inhibitory region can be formed also in the space 332.

Here, since the space 332 communicates with the outside of the light transmission portion in plan view, when the three-dimensional manufactured object 314 is moved in the direction away from the light transmission portion, that is, in a Z direction, it is possible to use the space 332 as a flow path for supplying the liquid photocurable resin to the three-dimensional manufacturing region. In the tenth embodiment, as illustrated in FIG. 23B, since the space 332 communicates with the upper space of the light shielding portion 305 around the light transmission portion, the liquid photocurable which exists in the upper space of the light shielding portion 305 easily flows into the space 332 through a communication passage. By providing the convex portion forming region 306, it is possible to increase conductance at the time of supplying the liquid photocurable resin to the three-dimensional manufacturing region.

Here, it is preferable that the distance separating the convex portions is equal to or less than 200 µm and a percentage of the horizontal cross-section area of the convex portion 331 is equal to or higher than 45%.

In FIG. 23B, the percentage of the horizontal cross-section area of the convex portion 331 is the percentage of the hatched portions to the total area of the light transmission portion 304. In the tenth embodiment, the columnar convex portions 331 have the same horizontal cross-section area at any height in the Z direction. However, in a case where a convex portion having a form in which the size of the cross-section area varies depending on a height is used, the percentage of the horizontal cross-section area is calculated based on the smallest cross-section area.

By setting the percentage of the horizontal cross-section area to be equal to or higher than 45%, it is possible to maintain the sufficiently thick cure inhibitory region on the light transmission portion. Besides, oxygen serving as the cure inhibitor diffuses not only from the upper surface of the convex portion 331 but also from the side surface thereof, and is supplied to the liquid photocurable resin, so that it is possible to form and maintain the cure inhibitory region also in the space 332.

If the distance separating the convex portions is larger than 200 µm, oxygen supply to the liquid photocurable resin filling the space 332 becomes insufficient, and it becomes difficult to maintain the cure inhibitory region in the space 332, so that flatness of the cure inhibitory region above the convex portions 331 and the space 332 also decreases. For this reason, it is desirable to set the distance separating the convex portions to be equal to or less than 200 µm.

Besides, it is preferable, by setting the distance L1 separating the convex portions to be equal to or more than 60 µm, to sufficiently secure the conductance of the flow path. This is because, if the distance L1 separating the convex portions is less than 60 µm, the flow path becomes narrow and it is impossible to obtain a sufficient effect as the supply path.

Besides, it is preferable that the percentage of the horizontal cross-section area of the convex portions 331 is in the range of 45% to 80%. This is because, if the percentage of the horizontal cross-section area of the convex portions 331 is larger than 80%, the flow path becomes narrow and the space 332 cannot exert the sufficient effect as the supply path of the photocurable resin. More preferably, the relevant percentage is in the range of 45% to 70%.

Besides, it is preferable that a height t2 of the convex portion 331 in the vertical direction is in the range from 50 µm to 800 µm. If the height t2 of the convex portion 331 is less than 50 µm, the space 332 capable of being utilized as the flow path is small, and it is impossible to obtain the sufficient effect as the supply path. On the other hand, if the height t2 is larger than 800 µm, it becomes difficult to maintain the cure inhibitory region in the space 332.

As described above, according to the present embodiment in which the convex portion forming region is provided, when the three-dimensional manufactured object 314 is moved in the direction away from the light transmission portion, that is, in the Z direction, the speed at which the liquid photocurable resin is supplied to the three-dimensional manufacturing region is increased, so that it is possible to remarkably shorten the time required for the three-dimensional manufacture.

(Photocurable Resin)

The photocurable resin to be used in the present embodiment contains at least a polymerizable compound, and may further contain a resin material, and various kinds of additives such as a polymerization initiator, a polymerization inhibitor, an antioxidant, a heat-resistant stabilizer, a light-resistant stabilizer, a release agent and the like.

Examples of the polymerizable compound to be used in the present invention include, for example, an acrylic compound, a methacrylic compound, a vinyl compound and the like. However, the polymerizable compound is not limited to them.

Examples of the resin material include, for example, acrylic resin, methacrylic resin, polyolefin resin, polyester resin, polyamide resin, polycarbonate resin, polyimide resin and the like. It should be noted that each of the resins can be used alone, or the two or more resins can be used in combination.

The content of the resin contained in the photocurable resin of the present invention is preferably equal to or higher than 0.0 percent by weight and equal to or less than 99 percent by weight, more preferably equal to or higher than 0.0 percent by weight and equal to or less than 50 percent by weight.

Examples of the polymerization initiator include those generating radical species by light irradiation, those generating cationic species by light irradiation, those generating radical species by heat, and the like. However, the polymerization initiator is not limited to them. For example, 2-benzyl-2-dimethylamino-1-(4-morpholinophenyl)-1-butanone, 1-hydroxy-cyclohexyl phenyl ketone, and the like are used, but it is not limited to them.

Incidentally, an addition ratio of a photopolymerization initiator to the polymerizable resin component can be appropriately selected depending on a light irradiation amount, and further, an additional heating temperature. Also, the addition ratio can be adjusted depending on a target average molecular weight of the obtained polymer.

The addition amount of the photopolymerization initiator to be used for curing and forming the optical material in the present embodiment is preferably in the range from 0.01 percent by weight to 10.00 percent by weight with respect to the polymerizable component. It should be noted that, depending on reactivity of the resin and a light irradiation wavelength, the photopolymerization initiator can be used alone, or the two or more photopolymerization initiators can be used in combination.

In the present embodiment, it has been described that the light transmission portion 304 is the portion through which the light of the wavelength region in which the liquid photocurable resin 302 is solidified is transmitted, and through which the gas for inhibiting the curing of the liquid photocurable resin is transmitted or permeated. However, the present invention is not limited to this. Namely, even if the light of the wavelength region in which the liquid photocurable resin 302 is solidified is transmitted through the light transmission portion 304, it is unnecessary to allow the gas for inhibiting the curing of the liquid photocurable resin to transmit through the light transmission portion 304. In such a case, a light reflective film or a light absorptive film is provided on the surfaces other than the top of the convex portion 331 (that is, a side surface 331b and a bottom surface 331c other than an upper surface 331a in FIGS. 23A and 23B). By doing so, since the light from the light transmission portion 304 is blocked by the light reflective film or the light absorptive film of the side surface 331b and the bottom surface 331c, the curing of the photocurable resin in the space 332 is suppressed. Since the light transmission portion 304 need not be the portion through which the gas for inhibiting the curing of the liquid photocurable resin is transmitted, glass, transparent resin or transparent ceramics can be used as the material of the light transmission portion 304. Thus, it is possible to select a member having high rigidity and less deformation as compared with the above member through which the gas for inhibiting the curing of the liquid photocurable resin is transmitted. Besides, it is possible to widen the range of selection related to the shape of the convex portion as compared with the case where the above member through which the gas for inhibiting the curing of the liquid photocurable resin is transmitted is used. More specifically, if the distance between the adjacent convex portions is in the range from 10 µm to 200 µm, it is possible to have a desired effect. Besides, if the percentage of the horizontal cross-section area of the convex portion is in the range from 2% to 80%, it is possible to have a desired effect. Besides, a dielectric film, a dielectric multi-layer film, or a member containing Al, Ag, Cr, Pt or the like can be used as the light reflective film. Besides, a member containing Cr, Ni, Zn, Ti, C, $Al_2O_3$ or the like can be used as the light absorptive film.

(Three-Dimensional Manufacturing Process)

Next, the three-dimensional manufacturing process using the above three-dimensional manufacturing apparatus will be described.

First, the controlling unit 321 confirms whether or not a predetermined amount of the liquid photocurable resin is contained in the container 301, by using a not-illustrated sensor. When the liquid photocurable resin is insufficient, the resin supplying unit 303 is operated to fill the inside of the container 301 with the liquid photocurable resin 302 to a predetermined level in the container 301.

Next, the controlling unit 321 operates the lifting/lowering unit 313 to set the position of the base 311 so that the height of the upper surface of the base 311 is slightly higher than the focal position of the light source unit 310 in the Z direction. For example, if it is assumed that the thickness of a one layer at a time when the three-dimensional manufactured object is formed by laminate manufacture is 40 μm, the upper surface of the base 311 is adjusted to be positioned 10 μm to 30 μm above the focal position of the lens in the Z direction.

Based on three-dimensional manufacturing model shape data input from the external device 322, the controlling unit 321 generates shape data (slice data) of each layer to be used in a lamination manufacturing process.

Then, the controlling unit drives the light source unit 310 to irradiate light, and irradiates the liquid photocurable resin 302 with ultraviolet light modulated based on the first layer shape data of the three-dimensional manufactured object. Then, the liquid photocurable resin 302 at the irradiated site is cured, and the first layer portion of the three-dimensional manufactured object is formed on the lower surface of the base 311.

As long as an energy beam capable of curing the liquid photocurable resin is used, the ultraviolet light is not necessarily used. However, the ultraviolet light of 365 nm, 385 nm or 405 nm, or a wavelength mixed with multiple wavelength electromagnetic waves such as a high-pressure mercury lamp, a halogen lamp or the like is preferably used. Although intensity of the energy beam is not particularly limited, it is preferable to have the intensity of 0.1 mW/cm² to 1000 mW/cm², more preferably 1 mW/cm² to 100 mW/cm².

Next, as preparation for forming the second layer, the controlling unit 321 operates the lifting/lowering unit 313 to raise the base 311 having the first layer portion formed thereon in the direction away from the light transmission portion, that is, in the Z direction by 40 μm. Into the space between the raising base 311 and the light transmission portion 304, the liquid photocurable resin 302 flows from the periphery.

Incidentally, the moving operation of the base 311 can be performed by using speed control or load control alone or using them in combination. It is preferable to set the speed of the moving operation from 0.001 mm/sec to 10 mm/sec, more preferably 0.01 mm/sec to 1 mm/sec. It is preferable to set the load during the movement operation from 0.01N to 10000N, more preferably 0.1N to 1000N.

According to the present embodiment, since the convex portion forming region is provided on the upper surface of the light transmission portion 304, that is, on the surface being in contact with the liquid photocurable resin 302, the flow resistance of the liquid photocurable resin 302 decreases. Therefore, the inflow speed of the liquid photocurable resin 302 is high, so that it is possible to shorten the time required for a preparing step of forming the second layer.

At the timing when the inflow, i.e., the replenishment, of the liquid photocurable resin 302 to the three-dimensional manufacturing region is completed, the controlling unit 321 drives the light source unit 310 to irradiate ultraviolet light modulated based on the shape data of the second layer of the three-dimensional manufactured object. Then, the liquid photocurable resin 302 at the irradiated site is cured, and the portion of the second layer is laminated and formed on the first layer of the three-dimensional manufactured object.

Thereafter, by repeating the same process, it is possible to laminate a large number of the layers and to form the three-dimensional manufactured object with a desired shape. The obtained three-dimensional manufactured object may be washed for removing the adhesion of an unreacted photocurable resin. Besides, heating annealing, additional irradiation with ultraviolet rays, heating or ultraviolet irradiation in an oxygen-free atmosphere, or the like may be performed to cure the photocurable resin with insufficient curing and/or to relax a residual stress at the time of manufacture.

Incidentally, as described above, the movement of the base 311 and the irradiation of the energy beam may be performed alternately and repeatedly from the first layer. Alternatively, it may be possible to irradiate the energy beam simultaneously with the movement of the base 311, thereby continuously depositing the parts of the three-dimensional manufactured object. In that case, two-dimensional shape data for a preset position is projected in accordance with the position of the base 311. As a method of aligning the position of the base 311 with projection of a desired two-dimensional shape, for example, there are a method of previously matching the movement speed of the base 311 and the projection speed of the two-dimensional shape, and a method of measuring the position of the base 311 and projecting the two-dimensional shape with respect to the measured position.

In the present embodiment, on the inner surface of the light transmission portion, the plurality of convex portions through which the UV light and the cure inhibitor are transmitted are provided, and the space into which the liquid photocurable resin can be introduced from the surrounding through the communication path is provided among the plurality of convex portions. Thus, it is possible to increase the speed of the replenishment of the liquid photocurable resin to the three-dimensional manufacturing region. That is, the plurality of convex portions function as the flow facilitating unit which has the function of facilitating the flow of the photocurable resin 302 in contact with the light transmission portion 304 (the flow being attended by the movement of the base 311).

Eleventh Embodiment

Figure 24:
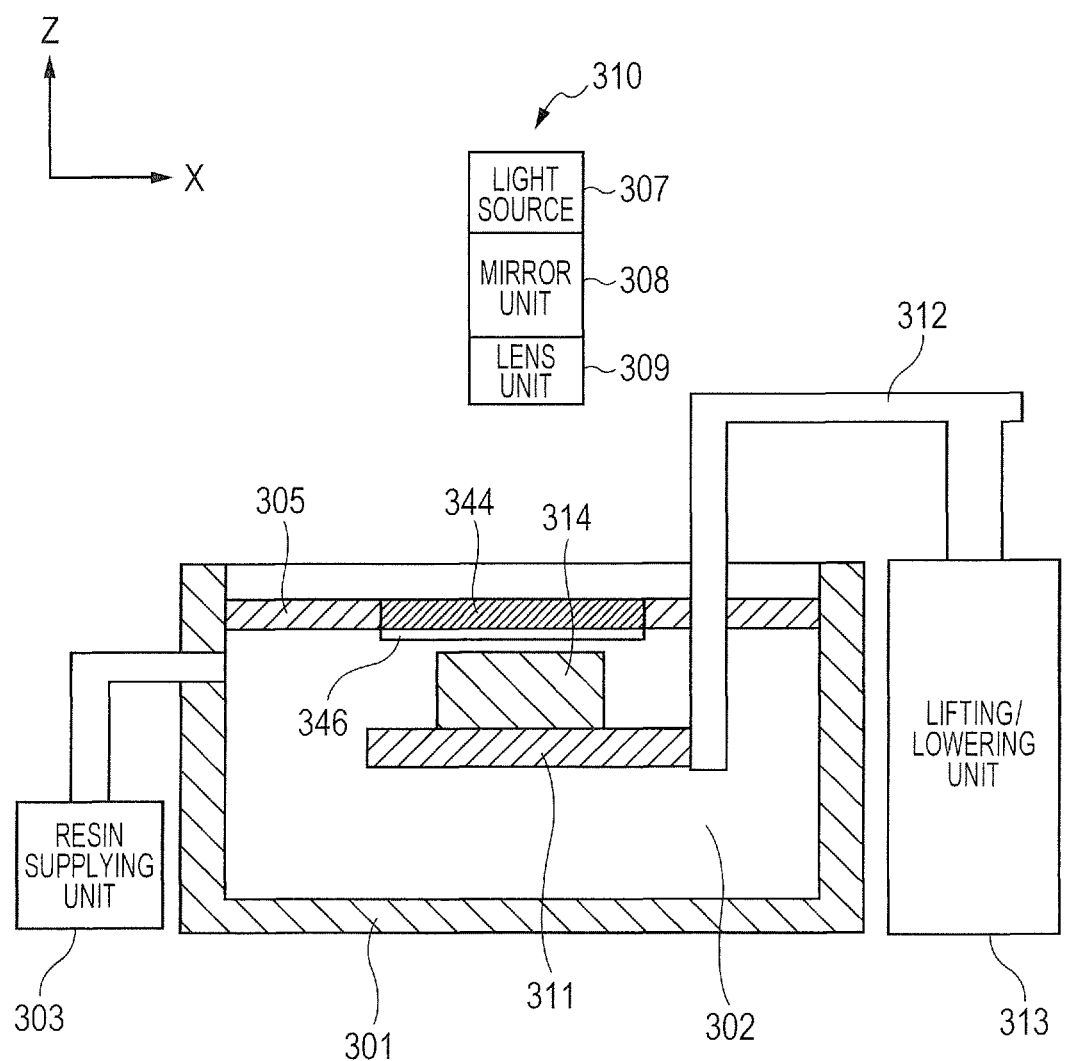
FIG. 24 is a schematic cross-section diagram of the three-dimensional manufacturing apparatus according to an eleventh embodiment.

FIG. 24 is a schematic cross-section block diagram for describing a constitution of the three-dimensional manufacturing apparatus according to the eleventh embodiment of the present invention.

(Constitution of Apparatus)

In the tenth embodiment, the light transmission portion functions as the bottom of the container. In the eleventh embodiment, the light transmission portion is provided at the upper portion of the container, and functions as a lid. In the eleventh embodiment, the light source unit 310 is disposed above a light transmission portion 344, and the base 311 supports the three-dimensional manufactured object 314 on the upper surface thereof.

As well as the tenth embodiment, in the eleventh embodiment, a material having a gas transmissive property of transmitting a gas such as oxygen or the like being the cure inhibitor is used for the light transmission portion, and the gas is supplied to the liquid photocurable resin in the vicinity of the light transmission portion through the light transmission portion. As the liquid photocurable resin, for example, a radical polymerization resin material which decreases a photocuring sensitivity when the gas such as the oxygen is contained is used to form a region in which the curing is inhibited in the vicinity of the light transmission portion.

In FIG. 24, there are illustrated the container 301, the liquid photocurable resin 302, the resin supplying unit 303, the light transmission portion 344, the light shielding portion 305, a convex portion forming region 346, the light source 307, the mirror unit 308, the lens unit 309, the light source unit 310, the base 311, the lifting/lowering arm 312, the lifting/lowering unit 313, and the three-dimensional manufactured object 314. Here, the parts and portions having the same functions as those of the apparatus in the tenth embodiment are denoted by the same reference numerals and symbols, and the detailed descriptions thereof are omitted.

Also, since the control block of the three-dimensional manufacturing apparatus according to the eleventh embodiment is the same as that of FIG. 22 described in the tenth embodiment, the description thereof is omitted.

(Convex Portion Forming Region)

Figure 25A:
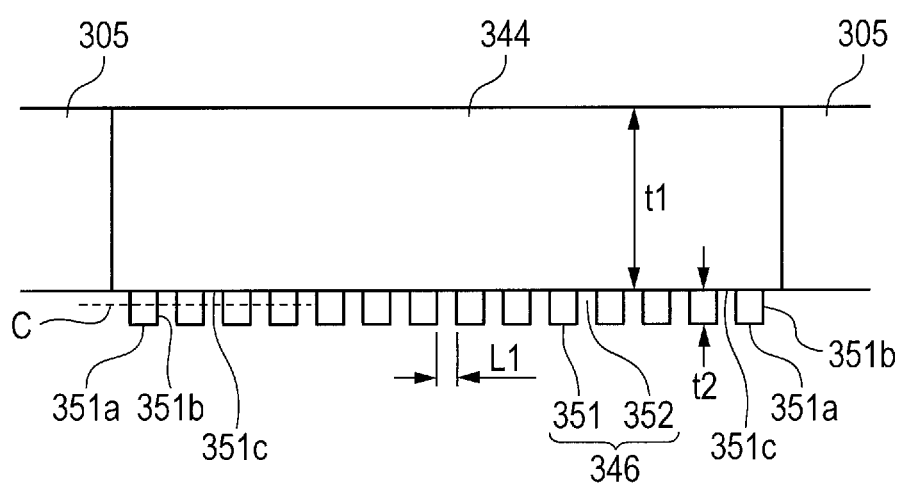
FIG. 25A is a vertical-direction schematic cross-section diagram of the light transmission portion of the eleventh embodiment.

The lower surface of the light transmission portion 344, that is, the surface of the side which is in contact with the liquid photocurable resin, comprises the convex portion forming region 346. FIG. 25A is an enlarged cross-section diagram for schematically describing the vicinity of the light transmission portion 344 illustrated in FIG. 24.

The convex portion forming region 346 includes a plurality of convex portions 351 through which the curing light and the cure inhibitor are transmitted, and spaces 352 which are in communication with the outside of the light transmission portion in plan view and are filled with the liquid photocurable resin 302.

Figure 25B:
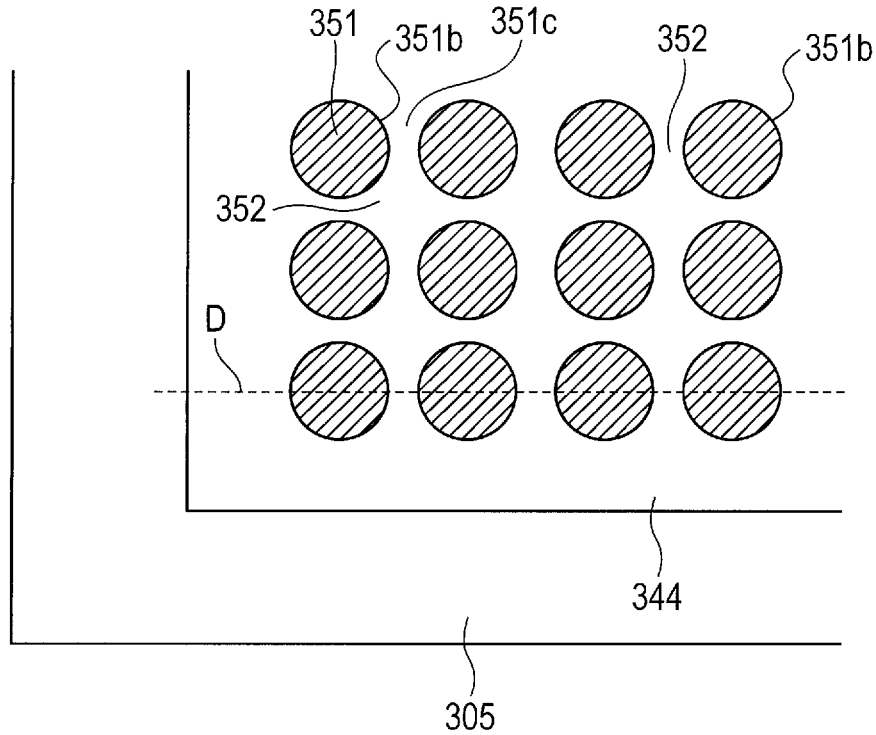
FIG. 25B is a horizontal-direction schematic cross-section diagram of the light transmission portion of the eleventh embodiment.

FIG. 25B is a top view for schematically describing an enlarged part of the horizontal cross-section taken along a dotted line C in FIG. 25A. Incidentally, the dotted line C indicates the plane which is in parallel with the main surface of the light transmission portion. FIG. 25A is the side view for schematically describing the vertical cross-section taken along a dotted line D in FIG. 25B. It should be noted that, since these drawings are schematically illustrated for the convenience of explanation, the number, the shapes and the arrangement of the convex portions are not necessarily illustrated accurately.

In the tenth embodiment, the base of the light transmission portion and the convex portions 351 are integrally formed by the same material. On the other hand, in the eleventh embodiment, the base of the light transmission portion 344 and the convex portion 351 are respectively made of different kinds of materials.

In the tenth embodiment, the hexagonal-prism convex portions are arranged in the hexagonal close-packed arrangement. On the other hand, in the eleventh embodiment, the cylindrical convex portions are arranged in a lattice pattern.

Also in the eleventh embodiment, the convex portion forming region 346 has the following aspects.

(1) The space 352 separating the convex portions communicates with the outside of the light transmission portion in the horizontal direction, that is, in the plane parallel to the main surface of the light transmission portion.

(2) Preferably, the distance L1 between the adjacent convex portions is in the range from 60 µm to 200 µm.

(3) Preferably, the cross-section area (horizontal cross-section area) of the convex portion in the cross-section parallel to the main surface of the light transmission portion is equal to or higher than 45% and equal to or less than 80%, with respect to an area of the region irradiated with the curing light on the main surface of the light transmission portion.

When the convex portion forming region 346 having the above aspects is provided, the sufficiently thick cure inhibitory region is maintained between the light transmission portion 344 and the three-dimensional manufactured object 314, and at the same time, the cure inhibitory region can be formed also in the space 352.

Here, since the space 352 communicates with the outside of the light transmission portion in plan view, when the three-dimensional manufactured object 314 is moved in the direction away from the light transmission portion, that is, in the Z direction, it is possible to use the space 352 as a flow path for supplying the liquid photocurable resin to the three-dimensional manufacturing region. Also, in the present embodiment, as illustrated in FIG. 25B, since the space 352 communicates with the lower space of the light shielding portion 305 around the light transmission portion, the liquid photocurable which exists in the lower space of the light shielding portion 305 easily flows into the space 352 through a communication passage. By providing the convex portion forming region 346, it is possible to increase conductance at the time of supplying the liquid photocurable resin to the three-dimensional manufacturing region.

Here, it is preferable that the distance separating the convex portions is equal to or less than 200 µm and a percentage of the horizontal cross-section area of the convex portion 351 is equal to or higher than 45%.

In FIG. 25B, the percentage of the horizontal cross-section area of the convex portion 351 is the percentage of the hatched portions to the total area of the light transmission portion 344. In the tenth embodiment, the convex portions 351 have the same horizontal cross-section area at any height in the Z direction. However, in a case where a convex portion having a form in which the size of the cross-section area varies depending on a height is used, the percentage of the horizontal cross-section area is calculated based on the smallest cross-section area.

By setting the percentage of the horizontal cross-section area to be equal to or higher than 45%, it is possible to maintain the sufficiently thick cure inhibitory region below the light transmission portion. Besides, oxygen serving as the cure inhibitor diffuses not only from the lower surface of the convex portion 351 but also from the side surface thereof, and is supplied to the liquid photocurable resin, so that it is possible to form and maintain the cure inhibitory region also in the space 352.

If the distance separating the convex portions is larger than 200 µm, oxygen supply to the liquid photocurable resin filling the space 352 becomes insufficient, and it becomes difficult to maintain the cure inhibitory region in the space 352, so that flatness of the cure inhibitory region below the convex portions 351 and the space 352 also decreases. For this reason, it is desirable to set the distance separating the convex portions to be equal to or less than 200 µm.

Besides, it is preferable, by setting the distance L1 separating the convex portions to be equal to or more than 60 µm, to sufficiently secure the conductance of the flow path. This is because, if the distance L1 separating the convex portions is less than 60 µm, the flow path becomes narrow and it is impossible to obtain the sufficient effect as the supply path.

Besides, it is preferable that the percentage of the horizontal cross-section area of the convex portions 351 is in the range of 45% to 80%. This is because, if the percentage of the horizontal cross-section area of the convex portions 351 is larger than 80%, the flow path becomes narrow and the space 352 cannot exert the sufficient effect as the supply path of the photocurable resin. More preferably, the relevant percentage is in the range of 45% to 70%.

Besides, it is preferable that the height t2 of the convex portion 351 in the vertical direction is in the range from 50 µm to 800 µm. If the height t2 of the convex portion 351 is less than 50 µm, the space 352 capable of being utilized as the flow path is small, and it is impossible to obtain the sufficient effect as the supply path. On the other hand, if the height t2 is larger than 800 µm, it becomes difficult to maintain the cure inhibitory region in the space 352.

In the eleventh embodiment, the base of the light transmission portion 344 and the convex portion 351 are respectively made of different materials. In the tenth embodiment, the convex portion 331 is formed of the same material as that of the base. Thus, since the liquid photocurable resin exists in the space 332, when the difference of the refractive indexes therebetween is large, there is a possibility that the optical path of the curing light is disturbed and thus the accuracy of the manufactured shape deteriorates.

In the eleventh embodiment, a material through which the cure inhibitor is transmitted and which has a refractive index closer to that of the photocurable resin than that of the base of the light transmission portion 344 is used for the convex portion 351. Preferably, a plate-like resin member is prepared as the base of the light transmission portion, and the convex portion 351 is formed on the surface thereof by using another kind of resin having the refractive index close to that of the liquid photocurable resin.

As the liquid photocurable resin, the same material as that in the tenth embodiment can be used, and various kinds of materials with the refractive index Nd in the range of 1.3 to 1.5 exist. Further, for example, a fluoropolymer (Nd=1.3 to 1.4), a silicone polymer (Nd=1.35 to 1.45), or porous glass (Nd=1.3 to 1.4) is used as the material through which oxygen and ultraviolet light are transmitted. Therefore, when there is the difference of the refractive indexes between the base of the light transmission portion and the liquid photocurable resin used as the raw material, it only has to select a material having a higher refractive index than that of the base as the liquid curable resin and thus form the convex portion.

In the present embodiment, it has been described that the light transmission portion 344 is the portion through which the light of the wavelength region in which the liquid photocurable resin 302 is solidified is transmitted, and through which the gas for inhibiting the curing of the liquid photocurable resin is transmitted or permeated. However, the present invention is not limited to this. Namely, even if the light of the wavelength region in which the liquid photocurable resin 302 is solidified is transmitted through the light transmission portion 344, it is unnecessary to allow the gas for inhibiting the curing of the liquid photocurable resin to transmit through the light transmission portion 344. In such a case, a light reflective film or a light absorptive film is provided on the surfaces other than the top of the convex portion 351 (that is, a side surface 351b and a bottom surface 351c other than an upper surface 351a in FIGS. 25A and 25B). By doing so, since the light from the light transmission portion 344 is blocked by the light reflective film or the light absorptive film of the side surface 351b and the bottom surface 351c, the curing of the photocurable resin in the space 352 is suppressed. Since the light transmission portion 344 need not be the portion through which the gas for inhibiting the curing of the liquid photocurable resin is transmitted, glass, transparent resin or transparent ceramics can be used as the material of the light transmission portion 344. Thus, it is possible to select a member having high rigidity and less deformation as compared with the above member through which the gas for inhibiting the curing of the liquid photocurable resin is transmitted. Besides, it is possible to widen the range of selection related to the shape of the convex portion as compared with the case where the above member through which the gas for inhibiting the curing of the liquid photocurable resin is transmitted is used. More specifically, if the distance between the adjacent convex portions is in the range from 10 µm to 200 µm, it is possible to have a desired effect. Besides, if the percentage of the horizontal cross-section area of the convex portion is in the range from 2% to 80%, it is possible to have a desired effect. Besides, a dielectric film, a dielectric multi-layer film, or a member containing Al, Ag, Cr, Pt or the like can be used as the light reflective film. Besides, a member containing Cr, Ni, Zn, Ti, C, $Al_2O_3$ or the like can be used as the light absorptive film.

(Three-Dimensional Manufacturing Process)

The eleventh embodiment is different from the tenth embodiment in the point that the base is moved in the direction opposite to the Z direction in the course of the three-dimensional manufacture, but other operations are the same in both the embodiments. Therefore, the detailed description in the present embodiment is omitted.

As described above, according to the present embodiment in which the convex portion forming region is provided, when the three-dimensional manufactured object 314 is moved in the direction away from the light transmission portion, that is, in the direction opposite to the Z direction, the speed of supplying the liquid photocurable resin to the three-dimensional manufacturing region while maintaining the cure inhibitory region is increased. For this reason, it is possible to remarkably shorten the time required for the three-dimensional manufacture. Besides, even in the case where the refractive index difference between the base material of the light transmission portion and the photocurable resin is large, the convex portion is formed with the material having the refractive index close to that of the photocurable resin. Thus, it is possible to satisfactorily maintain the shape accuracy of the three-dimensional manufactured object with less deterioration of the irradiation characteristics of the curing light.

Twelfth Embodiment

In the twelfth embodiment, as well as the tenth embodiment, the three-dimensional manufacturing apparatus illustrated in FIGS. 21 and 22 is used for explanation. In this context, since the parts illustrated in FIGS. 21 and 22 are the same as those described above, the descriptions thereof are omitted.

In the twelfth embodiment, the form of the light transmission portion is different from that in the tenth embodiment. Therefore, the light transmission portion will be described with reference to FIGS. 26A and 26B.

(Convex Portion Forming Region)

Figure 26A:
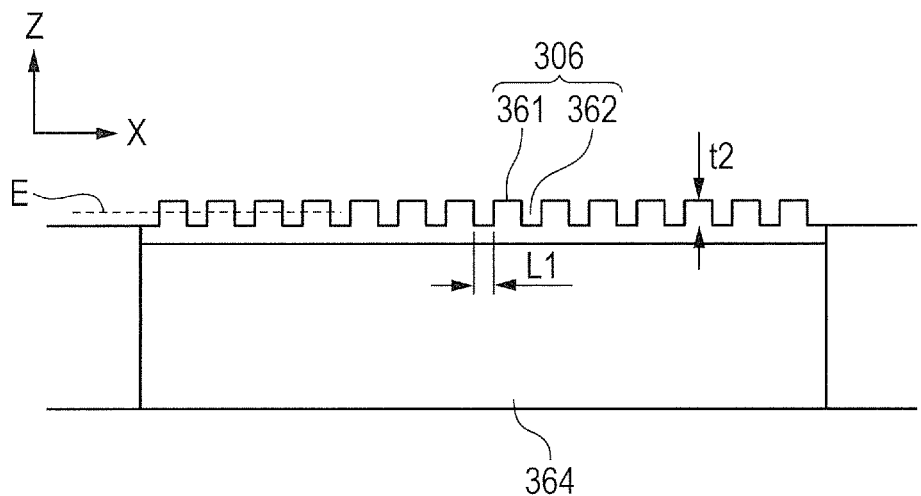
FIG. 26A is a vertical-direction schematic cross-section diagram of the light transmission portion of a twelfth embodiment.

The upper surface of the light transmission portion 304, that is, the surface of the side which is in contact with the liquid photocurable resin, comprises the convex portion forming region 306. FIG. 26A is the enlarged cross-section diagram for schematically describing the vicinity of the light transmission portion 304 illustrated in FIG. 21.

The convex portion forming region 306 includes a plurality of convex portions 361 through which the curing light and the cure inhibitor are transmitted, and spaces 362 which are in communication with the outside of the light transmission portion in plan view and are filled with the liquid photocurable resin 302.

Figure 26B:
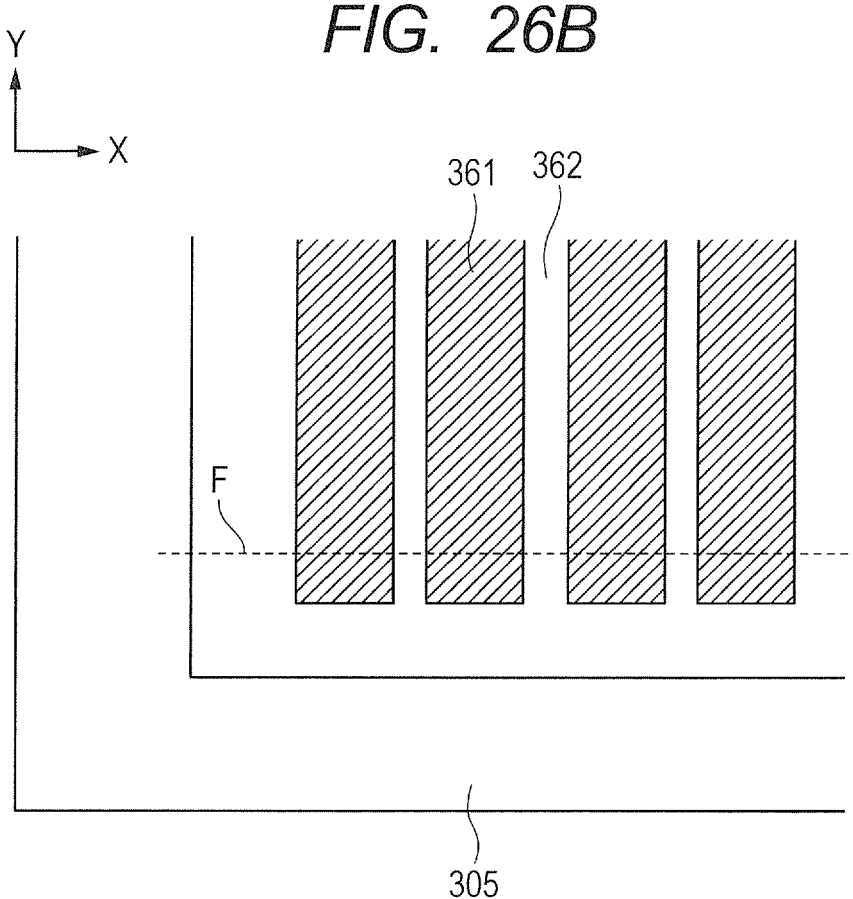
FIG. 26B is a horizontal-direction schematic cross-section diagram of the light transmission portion of the twelfth embodiment.

FIG. 26B is the top view for schematically describing an enlarged part of the horizontal cross-section taken along a dotted line E in FIG. 26A. Incidentally, the dotted line E indicates the plane which is in parallel with the main surface of the light transmission portion. FIG. 26A is the side view for schematically describing the vertical cross-section taken along a dotted line F in FIG. 26B. It should be noted that, since these drawings are schematically illustrated for the convenience of explanation, the number, the shapes and the arrangement of the convex portions are not necessarily illustrated accurately.

In the tenth embodiment, the base of the light transmission portion and the convex portions 331 are integrally formed by the same material. On the other hand, in the twelfth embodiment, the convex portion 361 is formed of a material having a refractive index closer to that of the liquid photocurable resin than the base 362. Further, the bottom surface of the space 362 is also formed of the same material as that the convex portion 361.

In the tenth embodiment, the convex portion 331 is formed of the same material as that of the base, and the liquid photocurable resin exists in the space 332. Therefore, when the difference of the refractive indexes therebetween is large, there is a possibility that the optical path of the curing light is disturbed and thus the accuracy of the manufactured shape deteriorates.

In the twelfth embodiment, a material through which the cure inhibitor is transmitted and which has the refractive index closer to that of the photocurable resin than that of the base 364 of the light transmission portion 304 is used for the bottom surface of the convex portion 361 and the space 362. Preferably, a plate-like resin member is prepared as the base 364 of the light transmission portion, another kind of resin having the refractive index closer to that of the liquid photocurable resin is formed with a certain thickness on the surface of the base, and the convex portion 361 is formed and used at a part of the formed resin.

Besides, the hexagonal-prism convex portions are arranged in the hexagonal close-packed arrangement in the tenth embodiment, whereas rectangular parallelepiped convex portions are arranged in parallel in the twelfth embodiment.

Also, in the twelfth embodiment, the convex portion forming region 306 has the following aspects.

(1) The space 362 separating the convex portions communicates with the outside of the light transmission portion in the horizontal direction, that is, in the plane parallel to the main surface of the light transmission portion.

(2) Preferably, the distance L1 between the adjacent convex portions is in the range from 60 μm to 200 μm.

(3) Preferably, a cross-section area (horizontal cross-section area) of the convex portion in the cross-section parallel to the main surface of the light transmission portion is equal to or higher than 45% and equal to or less than 80%, with respect to an area of the region irradiated with the curing light on the main surface of the light transmission portion.

When the convex portion forming region 306 having the above aspects is provided, the sufficiently thick cure inhibitory region is maintained between the light transmission portion 304 and the three-dimensional manufactured object 314, and at the same time, the cure inhibitory region can be formed also in the space 362.

Here, since the space 362 communicates with the outside of the light transmission portion in plan view, when the three-dimensional manufactured object 314 is moved in the direction away from the light transmission portion, that is, in the Z direction, it is possible to use the space 362 as a flow path for supplying the liquid photocurable resin to the three-dimensional manufacturing region. In the present embodiment, the space 362 extends along the Y direction, and communicates, at both ends of the space, with the upper space of the light shielding portion 305. Thus, the liquid photocurable resin which exists in the upper space of the light shielding portion 305 easily flows into the space 362 easily through the communication passage. By providing the convex portion forming region 306, it is possible to increase conductance at the time of supplying the liquid photocurable resin to the three-dimensional manufacturing region.

Here, it is preferable that the distance separating the convex portions is equal to or less than 200 μm and the percentage of the horizontal cross-section area of the convex portion 361 is equal to or higher than 45%.

In FIG. 26B, the percentage of the horizontal cross-section area of the convex portion 361 is the percentage of the hatched portions to the total area of the light transmission portion. In the twelfth embodiment, the convex portions 361 have the same horizontal cross-section area at any height in the Z direction. However, in a case where a convex portion having a form in which the size of the cross-section area varies depending on a height is used, the percentage of the horizontal cross-section area is calculated based on the smallest cross-section area.

By setting the percentage of the horizontal cross-section area to be equal to or higher than 45%, it is possible to maintain the sufficiently thick cure inhibitory region above the light transmission portion. Besides, oxygen serving as the cure inhibitor diffuses not only from the upper surface of the convex portion 361 but also from the side surface thereof, and is supplied to the liquid photocurable resin, so that it is possible to form and maintain the cure inhibitory region also in the space 362.

If the distance separating the convex portions is larger than 200 μm, oxygen supply to the liquid photocurable resin filling the space 362 becomes insufficient, and it becomes difficult to maintain the cure inhibitory region in the space 362, so that flatness of the cure inhibitory region above the convex portions 361 and the space 362 also decreases. For this reason, it is desirable to set the distance separating the convex portions to be equal to or less than 200 μm.

Besides, it is preferable, by setting the distance L1 separating the convex portions to be equal to or more than 60 μm, to sufficiently secure the conductance of the flow path. This is because, if the distance L1 separating the convex portions is less than 60 μm, the flow path becomes narrow and it is impossible to obtain the sufficient effect as the supply path.

Besides, it is preferable that the percentage of the horizontal cross-section area of the convex portions 361 is in the range of 45% to 80%. This is because, if the percentage of the horizontal cross-section area of the convex portions 361 is larger than 80%, the flow path becomes narrow and the space 362 cannot exert the sufficient effect as the supply path of the photocurable resin. More preferably, the relevant percentage is in the range of 45% to 70%.

Besides, it is preferable that the height t2 of the convex portion 361 in the vertical direction is in the range from 50 μm to 800 μm. If the height t2 of the convex portion 361 is less than 50 μm, the space 362 capable of being utilized as the flow path is small, and it is impossible to obtain the sufficient effect as the supply path. On the other hand, if the height t2 is larger than 800 μm, it becomes difficult to maintain the cure inhibitory region in the space 362.

(Three-Dimensional Manufacturing Process)

Also in the present embodiment, it is possible to use the same material as that of the liquid photocurable resin in the tenth embodiment. The three-dimensional manufacturing process of the twelfth embodiment is common to that of the tenth embodiment, so the detailed description thereof is omitted.

As described above, according to the present embodiment in which the convex portion forming region is provided, when the three-dimensional manufactured object 314 is moved in the direction away from the light transmission portion, that is, in the Z direction, the speed of supplying the liquid photocurable resin to the three-dimensional manufacturing region while maintaining the cure inhibitory region is increased, so that it is possible to remarkably shorten the time required for the three-dimensional manufacture. The shape of the convex portion need not be the hexagonal prism as in the tenth embodiment. For example, another polygonal prism such as a quadrangular prism or the like may be used. Besides, the cross-section shape as in the eleventh embodiment need not be the true-circle cylinder, and the cross-section shape may be oval. In short, the shape and the arrangement of the convex portions may be constituted so that the space separating the plurality of convex portions communicates with the light transmission portion.

The material of the light transmission portion and the material of the convex portion may be the same material as in the tenth embodiment or different materials as in the eleventh and twelfth embodiments. The material and the cross-section shape are not limited to the example of the combinations of the above embodiments, and can be appropriately changed.

Besides, the three-dimensional manufacturing apparatus is not limited to the examples of the tenth and eleventh embodiments, and can be changed as appropriate. For example, the light transmission portion may be provided not on the bottom surface or the upper surface of the container of the liquid photocurable resin, but on the side surface thereof.

Besides, the combination of the arrangement position of the light transmission portion of the three-dimensional manufacturing device and the light transmission portion thereof is not limited to the examples of the above embodiments, and can be appropriately changed.

Hereinafter, examples of the present invention will be described.

As the example of the present invention, the three-dimensional manufacture is performed by using various light transmission portions of the three-dimensional manufacturing apparatus having the layout illustrated in FIG. 21, and the three-dimensional manufacturing speed and the shape accuracy of the obtained three-dimensional manufactured object have been evaluated.

As the photocurable resin, the ultraviolet curing resin clear MR-CL12 manufactured by MUTOH ENGINEERING INC. for the photo-manufacturing 3D printer was used.

As the light source of the energy beam irradiating device, the LED (light emitting diode) of the wavelength 405 nm was used. As the image forming element, the Full-HD digital mirror device manufactured by Texas Instruments, Inc. was used. As the projection lens, the lens designed as the optical system for enlarging and projecting the size of one pixel to 60 μm×60 μm was used. The maximum size of the irradiated energy beams is about 115 mm×65 mm.

First, the light transmissive resin of 100 ml was charged in the liquid tank. Next, the base was moved close to the light transmission portion until the distance between the base and the light transmission portion was 50 μm. Subsequently, the energy beam was irradiated to the photocurable resin through the light transmission portion so that the projected image had the diameter of 30 mm. At this time, the intensity of the energy beam was 50 mW/cm$^2$. Three seconds after the irradiation of the energy beam was started, the base was separated from the light transmission portion under the load control of 150N while continuing to irradiate the energy beam. When the base was separated from the light transmission portion by 30 mm, the irradiation of the energy beam was stopped. Thereafter, the base was sufficiently separated from the light transmission portion, and the three-dimensional manufactured object was peeled from the base, thereby obtaining the three-dimensional manufactured object having the diameter of about 30 mm and the height of about 30 mm.

Example 1

As the light transmission portion of the three-dimensional manufacturing apparatus, the flat plate Teflon AF2400 manufactured by E. I. du Pont de Nemours and Company and having the thickness of 80 mm×80 mm×1 mm was used. On the upper surface of the light transmitting portion, the hexagonal prisms serving as the convex portions are arranged in the hexagonal close-packed arrangement, the interval between the hexagonal prisms is 120 μm, the height of the convex portions is 400 μm, the percentage of the horizontal cross-section area in the vicinity of the upper surface of the convex portions is 45%, and the percentage of the horizontal cross-section area of the bottom is 52%. The three-dimensional manufacture was performed by the above apparatus, and the three-dimensional manufactured object was obtained. At this time, the separation speed from the light transmission portion of the base was averaged 0.82 mm/sec under the load control of 150N.

Example 2

As the light transmission portion, the light transmission portion having the following constitution on the upper surface thereof was used. That is, the cylinders serving as the convex portions are arranged in the lattice pattern, the interval between the convex portions is 120 μm, the height of the convex portions is 400 μm, the percentage of the horizontal cross-section area in the vicinity of the upper surface of the convex portions is 48%, and percentage of the horizontal cross-section area of the bottom is 60%. The three-dimensional manufacture was performed by the same apparatus as that in Example 1 except for the light transmission portion, thereby obtaining the three-dimensional manufactured object. At this time, the separation speed from the light transmission portion of the base was 0.53 mm/sec under the load control of 150N.

Example 3

As the light transmission portion, the light transmission portion having the following constitution on the upper surface thereof was used. That is, the repeating constitution of the groove and the wall serving as the convex portion was used. In the constitution, the interval between the convex portions is 120 µm, the height of the convex portions is 400 µm, the percentage of the horizontal cross-section area in the vicinity of the upper surface of the convex portions is 45%, and the percentage of the horizontal cross-section area of the bottom is 52%. The three-dimensional manufacture was performed by the same apparatus as that in Example 1 except for the light transmission portion, thereby obtaining the three-dimensional manufactured object. At this time, the separation speed from the light transmission portion of the base was 0.44 mm/sec under the load control of 150N.

Example 4

As the light transmission portion, the light transmission portion having the following constitution on the upper surface thereof was used. That is, the hexagonal prisms serving as the convex portions are arranged in the hexagonal close-packed arrangement. In the constitution, the interval between the convex portions is 60 µm, the height of the convex portions is 400 µm, the percentage of the horizontal cross-section area in the vicinity of the upper surface of the convex portions is 45%, and the percentage of the horizontal cross-section area of the bottom is 52%. The three-dimensional manufacture was performed by the same apparatus as that in Example 1 except for the light transmission portion, thereby obtaining the three-dimensional manufactured object. At this time, the separation speed from the light transmission portion of the base was 0.33 mm/sec under the load control of 150N.

Example 5

As the light transmission portion, the light transmission portion having the following constitution on the upper surface thereof was used. That is, the hexagonal prisms serving as the convex portions are arranged in the hexagonal close-packed arrangement. In the constitution, the distance between the convex portions is 200 µm, the height of the convex portions is 400 µm, the percentage of the horizontal cross-section area in the vicinity of the upper surface of the convex portions is 45%, and the percentage of the horizontal cross-section area of the bottom is 52%. The three-dimensional manufacture was performed by the same apparatus as that in Example 1 except for the light transmission portion, thereby obtaining the three-dimensional manufactured object. At this time, the separation speed from the light transmission portion of the base was 0.86 mm/sec under the load control of 150N.

Example 6

As the light transmission portion, the light transmission portion having the following constitution on the upper surface thereof was used. That is, the hexagonal prisms serving as the convex portions are arranged in the hexagonal close-packed arrangement. In the constitution, the interval between the convex portions is 120 µm, the height of the convex portions is 400 µm, the percentage of the horizontal cross-section area in the vicinity of the upper surface of the convex portions is 62%, and the percentage of the horizontal cross-section area of the bottom is 70%. The three-dimensional manufacture was performed by the same apparatus as that in Example 1 except for the light transmission portion, thereby obtaining the three-dimensional manufactured object. At this time, the separation speed from the light transmission portion of the base was 0.38 mm/sec under the load control of 150N.

Example 7

As the light transmission portion, the light transmission portion having the following constitution on the upper surface thereof was used. That is, the hexagonal prisms serving as the convex portions are arranged in the hexagonal close-packed arrangement. In the constitution, the interval between the convex portions is 120 µm, the height of the convex portions is 50 µm, the percentage of the horizontal cross-section area in the vicinity of the upper surface of the convex portions is 45%, and the percentage of the horizontal cross-section area of the bottom is 52%. The three-dimensional manufacture was performed by the same apparatus as that in Example 1 except for the light transmission portion, thereby obtaining the three-dimensional manufactured object. At this time, the separation speed from the light transmission portion of the base was 0.31 mm/sec under the load control of 150N.

Example 8

As the light transmission portion, the light transmission portion having the following constitution on the upper surface thereof was used. That is, the hexagonal prisms serving as the convex portions are arranged in the hexagonal close-packed arrangement. In the constitution, the interval between the convex portions is 120 µm, the height of the convex portions is 800 µm, the percentage of the horizontal cross-section area in the vicinity of the upper surface of the convex portions is 45%, and the percentage of the horizontal cross-section area of the bottom is 52%. The three-dimensional manufacture was performed by the same apparatus as that in Example 1 except for the light transmission portion, thereby obtaining the three-dimensional manufactured object. At this time, the separation speed from the light transmission portion of the base was 1.40 mm/sec under the load control of 150N.

Example 9

As the light transmission portion, the light transmission portion having the following constitution on the upper surface thereof was used. That is, the hexagonal prisms serving as the convex portions are arranged in the hexagonal close-packed arrangement. In the constitution, the interval between the convex portions is 120 µm, the height of the convex portions is 400 µm, the percentage of the horizontal cross-section area in the vicinity of the upper surface of the convex portions is 60%, and the percentage of the horizontal cross-section area of the bottom is 80%. The three-dimensional manufacture was performed by the same apparatus as that in Example 1 except for the light transmission portion, thereby obtaining the three-dimensional manufactured object. At this time, the separation speed from the light transmission portion of the base was 0.22 mm/sec under the load control of 150N.

Example 10

As the light transmission portion, the light transmission portion having the following constitution on the upper surface thereof was used. That is, the hexagonal prisms serving as the convex portions are arranged in the hexagonal close-packed arrangement. In the constitution, the interval between the convex portions is 300 µm, the height of the convex portions is 400 µm, the percentage of the horizontal cross-section area in the vicinity of the upper surface of the convex portions is 45%, and the percentage of the horizontal cross-section area of the bottom is 52%. The three-dimensional manufacture was performed by the same apparatus as that in Example 1 except for the light transmission portion, thereby obtaining the three-dimensional manufactured object. At this time, the separation speed from the light transmission portion of the base was 0.86 mm/sec under the load control of 150N.

Example 11

As the light transmission portion, the light transmission portion having the following constitution on the upper surface thereof was used. That is, the hexagonal prisms serving as the convex portions are arranged in the hexagonal close-packed arrangement. In the constitution, the interval between the convex portions is 120 µm, the height of the convex portions is 400 µm, the percentage of the horizontal cross-section area in the vicinity of the upper surface of the convex portions is 35%, and the percentage of the horizontal cross-section area of the bottom is 52%. The three-dimensional manufacture was performed by the same apparatus as that in Example 1 except for the light transmission portion, thereby obtaining the three-dimensional manufactured object. At this time, the separation speed from the light transmission portion of the base was 0.83 mm/sec under the load control of 150N.

Comparative Example 1

As the light transmission portion, the flat light transmission portion having no convex portion forming region on the upper surface thereof was used. The three-dimensional manufacture was performed by the same apparatus as that in Example 1 except for the light transmission portion, thereby obtaining the three-dimensional manufactured object. At this time, the separation speed from the light transmission portion of the base was 0.16 mm/sec under the load control of 150N.

Comparative Example 2

As the light transmission portion, the light transmission portion having the following constitution on the upper surface thereof was used. That is, the cylindrical concave portions are arranged in the hexagonal close-packed arrangement. In the constitution, the repetition pitch of the constitution is 120 µm, and the depth of the concave portions is 400 µm. The concave portions are filled with the liquid photocurable resin, but each of the concave portions is arranged in isolation. That is, the concave portion does not communicate with the surroundings of the light transmission portion in horizontal-direction view. The three-dimensional manufacture was performed by the same apparatus as that in Example 1 except for the light transmission portion, thereby obtaining the three-dimensional manufactured object. At this time, the separation speed from the light transmission portion of the base was 0.16 mm/sec under the load control of 150N.

<Results>

The results obtained for respective Examples and Comparative Examples are illustrated in Table 1.

In Table 1, the separation speed from the light transmission portion of the base, that is, the speed of supplying the liquid photocurable resin to the manufacturing region, is indicated as the manufacturing speed. More specifically, the magnification based on the speed in Comparative Examples is indicated as the manufacturing speed.

Besides, the shape accuracy is the result obtained by measuring the shape accuracy of the outer surface which is not in close contact with the base with respect to the obtained three-dimensional manufactured object. More specifically, the shape accuracy of which the maximum surface roughness Rz is equal to or less than 10 µm is indicated by A, and the shape accuracy of which the maximum surface roughness Rz is larger than 10 µm is indicated by B.

TABLE 1

|  | Manufacturing Speed | Shape Accuracy |
|---|---|---|
| Example 1 | 5.2 times | A |
| Example 2 | 3.4 times | A |
| Example 3 | 2.8 times | A |
| Example 4 | 2.1 times | A |
| Example 5 | 5.5 times | A |
| Example 6 | 2.4 times | A |
| Example 7 | 2.0 times | A |
| Example 8 | 8.9 times | A |
| Example 9 | 1.4 times | A |
| Example 10 | 5.5 times | B |
| Example 11 | 5.3 times | B |
| Comparative Example 1 | 1.0 time | A |
| Comparative Example 2 | 1.0 time | A |

As is apparent from the results of Table 1, in the three-dimensional manufacturing apparatus of the present invention and the three-dimensional manufacturing method using the three-dimensional manufacturing apparatus of the present invention, it is possible to perform the three-dimensional manufacture at high speed, and the shape accuracy of the obtained three-dimensional manufactured object is satisfactory. Particularly, in Examples 1 to 9, the extremely satisfactory results were obtained in terms of both the manufacturing speed and the shape accuracy.

Thirteenth Embodiment

Figure 27:
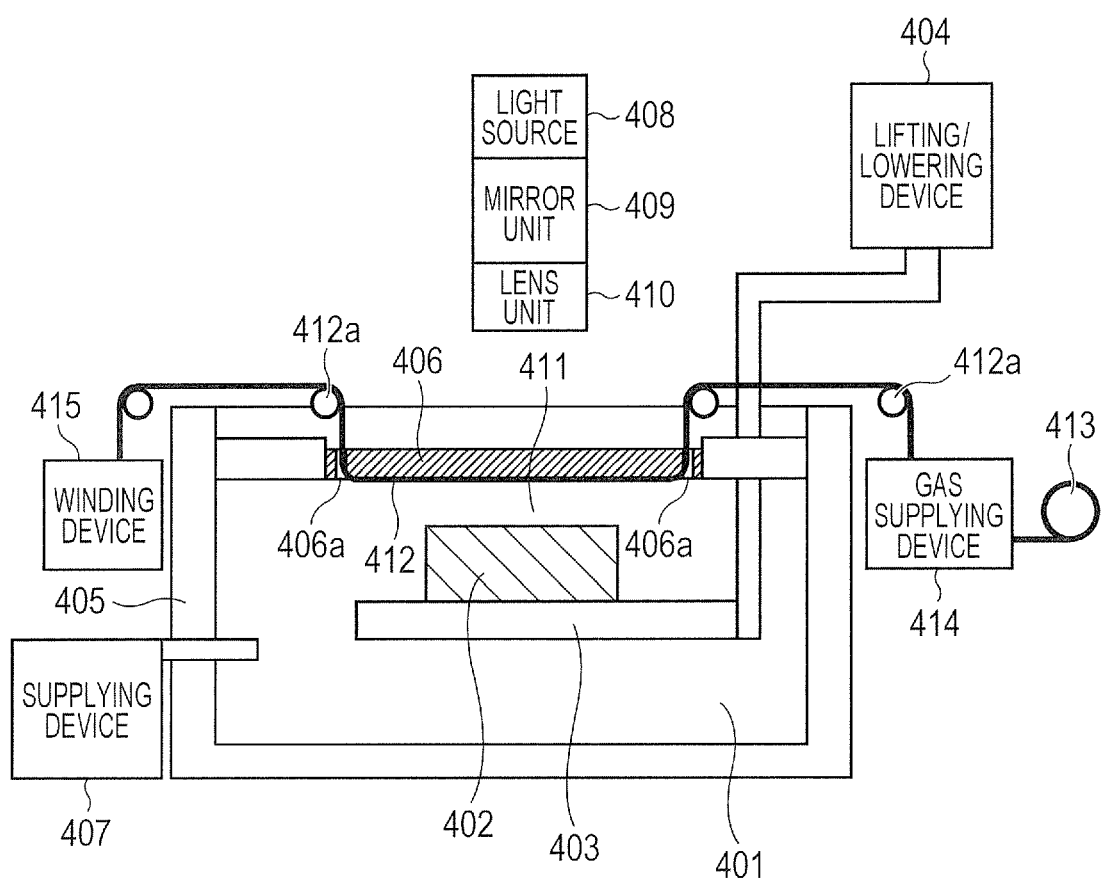
FIG. 27 is an explanatory diagram for describing a constitution of the three-dimensional manufacturing apparatus according to a thirteenth embodiment of the present invention.

FIG. 27 is a cross-section block diagram for describing the constitution of the three-dimensional manufacturing apparatus for producing the three-dimensional manufactured in the present embodiment. In FIG. 27, a photocurable resin 401 in a molten (uncured) state is held in a container 405.

With respect to the photocurable resin 401, for example, an acrylate-system material is used as the radical polymerization resin material. Especially in that case, the material of the photocurable resin 401 is selected from a urethane acrylate system, an epoxy acrylate system, a polyester acrylate system, an acrylic acrylate system and the like, as an oligomer.

In the present embodiment, the light irradiation for curing the photocurable resin 401 is performed from above the container 405, through supplying members such as a light transmission portion 406 and a later-described oxygen adsorption film 412 which supply a gas having a cure inhibitory property to the photocurable resin 401. The oxygen adsorption film 412 serving as the gas supplying member having the cure inhibitory property can be made of a material having flexibility capable of being wound in a form of a film, such as a later-described film roll 413. A more detailed constitution example of the oxygen adsorption film 412 will be described below.

A manufacturing stage 403 functions as a base for supporting the manufactured site of a manufactured object 402. The manufacturing stage 403 is moved downward by a lifting/lowering device 404 with the progresses of the solidification and the manufacture of the manufactured object 402. With the movement of the manufacturing stage 403, the photocurable resin 401 for a next layer is supplied above the manufactured site of the manufactured object 402. Thereafter, the next layer is irradiated with light for the manufacture.

The curing light is irradiated from a light irradiating unit (device) which is constituted by, for example, a light source 408, a mirror unit 409 and a lens unit 410. The light source 408 is, for example, a laser light source or the like. For example, in a case where the photocurable resin 401 is the ultraviolet curing type, the wavelength of the irradiation light of the light source 408 is selected in the range of about 200 nm to 400 nm suitable for the condition such as the material of the photocurable resin 401 or the like. A typical light wavelength of the curing light is 254 nm or 365 nm. However, the wavelength of the irradiation light of the light source 408 is not necessarily limited to the ultraviolet light region, and irradiation light of another wavelength region may be used depending on the material of the photocurable resin 401. The mirror unit 409 is constituted by a galvano mirror unit or the like, and scans the irradiation spot of the light source 408 in the X and Y directions via the lens unit 410. Thus, it is possible to cure the site of, for example, a one-layer shape corresponding to a specific height of the manufactured object 402 of the photocurable resin 401.

The light irradiating method is not limited to one using planar scanning of a laser spot. Namely, the light irradiating unit comprising the light source 408, the mirror unit 409 and the lens unit 410 may be constituted as a projector which irradiates a moving image on a surface, depending on the characteristics such as the material and the viscosity of the photocurable resin 401.

In the constitution of FIG. 27, since light irradiation for curing the photocurable resin 401 is performed from the upper direction of the container 405, a light transmission member made of a light transmissive material, that is, a light transmissive lid is disposed on the top of the container 405. In FIG. 27, the light transmission portion 406 corresponds to the relevant light transmissive lid. Also, the side wall of the container 405 can be made of a light transmissive material for the purpose of visually recognizing the progress of the manufacture or photographing the progress of the manufacture by a not-illustrated camera or the like.

The light transmission portion 406 is made of a light transmissive material such as PTFE, PFA, PE, PP, PC, PMMA, quartz, glass or the like.

In the present embodiment, the uncured and liquid photocurable resin 401 can be supplied by a supplying device 407 so as to be at the liquid level of the lower surface of the light transmission portion 406 or the level just in the vicinity thereof. For example, in the supplying device 407, a constitution for automatically supplying the photocurable resin 401 into the container 405 in accordance with an output of a not-illustrated liquid level detecting unit (means) of detecting the liquid level of the photocurable resin 401 may be provided.

In the present embodiment, the oxygen adsorption film 412 is conveyed on the lower surface of the light transmission portion 406 so that the light curable resin 401 is not directly touched by substantially the entire lower surface of the light transmission portion 406. For this reason, the oxygen adsorption film 412 has the width substantially corresponding to the lower surface of the light transmission portion 406. Here, the "width" direction of the oxygen adsorption film 412 represents the dimension corresponding to the depth direction of the paper illustrating FIG. 27.

The oxygen adsorption film 412 has a gas adsorbing property, and corresponds to a supplying member for supplying a gas having a cure inhibitory property to the photocurable resin 401. As the gas having the cure inhibitory property, oxygen existing as a simple substance, that is, a gas containing an allotrope such as oxygen, ozone or the like, for example, pure oxygen or air is considerable. However, for example, in a case where a material different from the above material of the acrylic acrylate system is used for the photocurable resin 401, an object containing a substance other than the oxygen existing as the simple substance can be used as the gas having the cure inhibitory property. In that case, as the oxygen adsorption film 412 of the present embodiment, a film having adsorptivity in regard to the gas having the cure inhibitory property containing the substance other than the oxygen existing as the simple substance is used.

Figure 30:
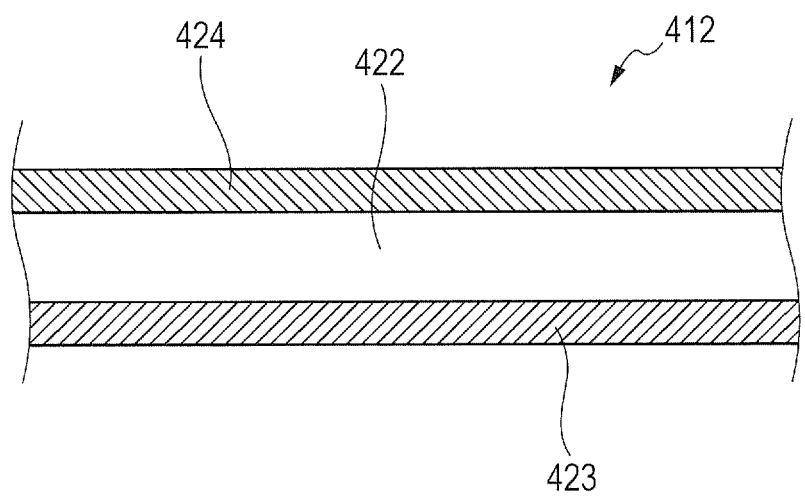
FIG. 30 is an explanatory diagram for describing a cross-section constitution of a supplying member which supplies a gas having a cure inhibitory property.

FIG. 30 is a diagram for describing an example of the cross-section constitution of the oxygen adsorption film 412. In the example of FIG. 30, the oxygen adsorption film is composed of three layers, that is, a gas transmission (permeation) layer 423 disposed on the side of a manufacturing region 411, an oxygen adsorption layer 422, and a hard layer 424 disposed on the side of the light transmission portion 406.

As the oxygen adsorption layer 422 of the oxygen adsorption film 412, for example, a perfluoro compound, iron powder, activated carbon, or a thermoplastic resin filled with these materials is used. Besides, as the gas transmission layer 423, polyvinylidene chloride-coated biaxially oriented polypropylene, polyvinylidene chloride-coated polyester, or the like is used. The total thickness of the oxygen adsorption film 412 is about 0.02 mm to 0.2 mm. However, the total thickness of the oxygen adsorption film 412 may be appropriately selected in consideration of the size of the manufacturing region, the kind of resin of the manufacturing region, the viscosity of the resin of the manufacturing region, wettability, a strength, an oxygen inhibitory property, and the like.

In the constitution of FIG. 27, the hard layer 424 is in contact with the light transmission portion 406, and the gas transmission layer 423 is in contact with the photocurable resin 401 in the container 405. In a case where a radical polymerization-system material or an acrylate-system material is used for the photocurable resin 401, curing of the uncured photocurable resin 401 being in contact with the oxygen adsorption film 412 though the gas transmission layer 423 is inhibited by the oxygen and the ozone held by the oxygen adsorption layer 422 of the oxygen adsorption film 412. That is, even if the curing light is irradiated, curing of the photocurable resin 401 in the vicinity of the manufacturing region 411 is inhibited.

The thickness of each layer of the oxygen adsorption film 412 can be variously changed depending on the kind and the viscosity of the resin to be used, and the supply amounts of the oxygen and the ozone to the film. For example, it is considered that the thickness of the gas transmission layer 423 is in the range of 0.005 mm to 0.1 mm, the thickness of the oxygen adsorption layer 422 is in the range of 0.01 mm to 0.3 mm, and the thickness of the hard layer 24 is in the range of 0.005 mm to 0.3 mm.

Besides, it is possible for the hard layer 424 to use a gas transmissive material such as polyvinylidene chloride-coated biaxially oriented polypropylene, polyvinylidene chloride-coated polyester or the like having higher hardness as compared with the gas transmission layer 423. Thus, it is possible to suppress curing of the resin which has entered between the hard layer 424 and the light transmission portion 406.

The oxygen adsorption film 412 is unwound from the state of being wound in the form of the film roll 413 by winding force of a winding device 415, and is then conveyed between the light transmission portion 406 and the uncured resin. More specifically, the film is conveyed so as to pass along the lower surface of the light transmission portion 406. In the winding device 415, a winding roller, an electric motor for generating winding driving force, a speed reducer for creating appropriate winding speed, and the like (all not illustrated) are disposed.

A conveying device for the oxygen adsorption film 412 comprises the winding device 415 for generating the driving force to unwind the roll shaped oxygen adsorption film 412, and a plurality of guide rollers 412a, 412a, . . . for guiding (leading) the unwound oxygen adsorption film 412 between the light transmission portion 406 and the photocurable resin 401.

That is, a conveying path for the oxygen adsorption film 412 is defined by the guide rollers 412a, 412a, . . . . Then, the oxygen adsorption film 412 passes through a slit 406a penetrating the vicinity of the right end portion of the light transmission portion 406 in the drawing, and enters the lower surface of the light transmission portion 406. The oxygen adsorption film 412 which has passed through the lower surface of the light transmission portion 406 passes through the slit 406a penetrating the vicinity of the left end portion of the light transmission portion 406 in the drawing, again passes above the light transmission portion 406, and is wound up by the winding device 415 through the guide rollers 412a, 412a, . . . .

The oxygen adsorption film 412 passes through the inside of a gas supplying device 414 which is disposed on the downstream side of the film roll 413 and on the upstream side of the slit 406a at the conveying side toward the lower surface of the light transmission portion 406. The gas supplying device 414 supplies a gas which performs polymerization and cross-link for the photocurable resin 401 and hence inhibits curing thereof, and adsorbs the gas onto the oxygen adsorption film 412. As the gas to be supplied by the gas supplying device 414, for example, there are a gas containing oxygen existing as a simple substance, and a gas including air, pure oxygen and ozone. The gas supplying device 414 can be constituted by, for example, an ozone generator of corona discharge type or a streamer discharge type, or an oxygen supplying device of supplying pure oxygen from a container such as an oxygen cylinder. Incidentally, the oxygen and the ozone to be supplied from the gas supplying device 414 to the oxygen adsorption film 412 may be generated not only by electrical driving but also by a chemical generation method.

Figure 28:
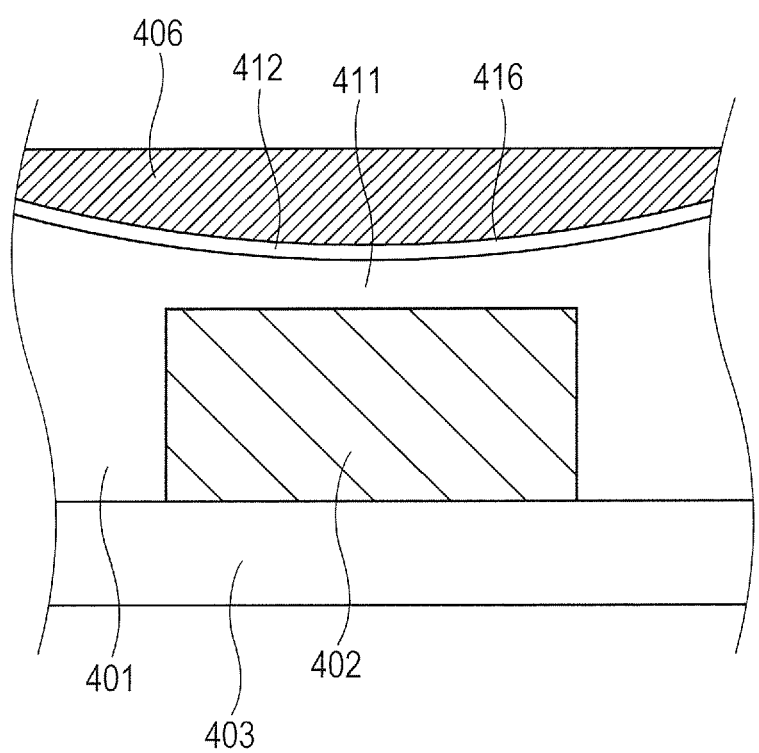
FIG. 28 is an enlarged explanatory diagram for describing the vicinity of a manufacturing region illustrated in FIG. 27.

The oxygen and the ozone supplied by the gas supplying device 414 pass through the gas transmission layer 423 illustrated in FIG. 28 and reach the oxygen adsorption layer 422, and they are adsorbed/held to/in a perfluoro compound, iron powder and activated carbon in the oxygen adsorption layer 422. Incidentally, the control conditions such as the amount of the oxygen supplied from the gas supplying device 414 to the oxygen adsorption film 412, the conveying speed of the oxygen adsorption film 412 by the winding device 415 can be determined depend on the type, the density and the viscosity of the photocurable resin 401. For example, the conveying speed of the oxygen adsorption film 412 on the lower surface of the light transmission portion 406 can be selected from a value in the range of about several mm to several tens of mm/s.

FIG. 28 is the enlarged view for describing the constitution in the vicinity of the manufacturing region 411 in the constitution of FIG. 27. In the constitution of FIG. 28, an exit surface 416 of the light transmission portion 406 for the curing light is formed as a gently curved surface by a convex surface which is convex toward the photocurable resin 401, for example, by a cylindrical surface. Due to the curved surface constitution of the exit surface 416, the light transmission portion 406 can optically be functioned as a convex lens.

The oxygen adsorption film 412 is conveyed from the right to the left in the drawing along the exit surface 416 of the light transmission portion 406 having the curved surface constitution by the driving force of the winding device 415. With the curved surface constitution like this of the exit surface 416, the oxygen adsorption film 412 can be conveyed in the state being in close contact with the light transmission portion 406.

Further, for example, by appropriately designing a curved surface shape of the exit surface 416, it is possible to prevent distortion of the curing light which is scanned by the mirror unit 409 and is directed toward the peripheral portion of the manufacturing region 411. Besides, for example, by appropriately selecting the curved surface shape of the exit surface 416, it is possible to prevent distortion of the peripheral portion when the curing light spreads and to cause the curing light to vertically penetrate over a target cured layer entirely. By properly selecting the curved surface shape of the exit surface 416 in this way, it is possible to vertically irradiate the curing light on the entire cured layer without distortion, so that it is possible to obtain substantially uniform photocurable shape accuracy at the center and the outer periphery of the cured layer on the upper surface of the manufactured object 402.

By irradiating the curing light from the light source 408, the photocurable resin 401 is cured at the site of the manufacturing region 411 below the light transmission portion 406 and the oxygen adsorption film 412. In the case of the continuous manufacture, for example, it is possible to continuously lower the manufacturing stage 403 by the lifting/lowering device 404 at the same time while irradiating the curing light from the light source 408 in a moving image form. Further, in the case of the intermittent manufacture of one-by-one layer, planar scanning of the curing light is performed at the site of the manufacturing region 411 by the mirror unit 409 to form one layer, and then the manufacturing stage 403 is moved by the lifting/lowering device 404 downward by an appropriate distance, for example, 0.02 mm to 0.2 mm.

In the present embodiment, when the manufacturing stage 403 is moved, the film winding device 415 is operated at the same time of the stage movement or after the end of stage movement, and the oxygen adsorption film 412 is conveyed on the lower surface of the light transmission portion 406. That is, the oxygen adsorption film 412 on which a gas having the cure inhibitory property such as oxygen or ozone has been newly adsorbed is sequentially conveyed onto the lower surface of the light transmission portion 406 by the gas supplying device 414. Thus, it is possible to supply the gas having the cure inhibitory property, for example, the oxygen or the ozone, to the vicinity of the manufacturing region 411.

Figure 32:
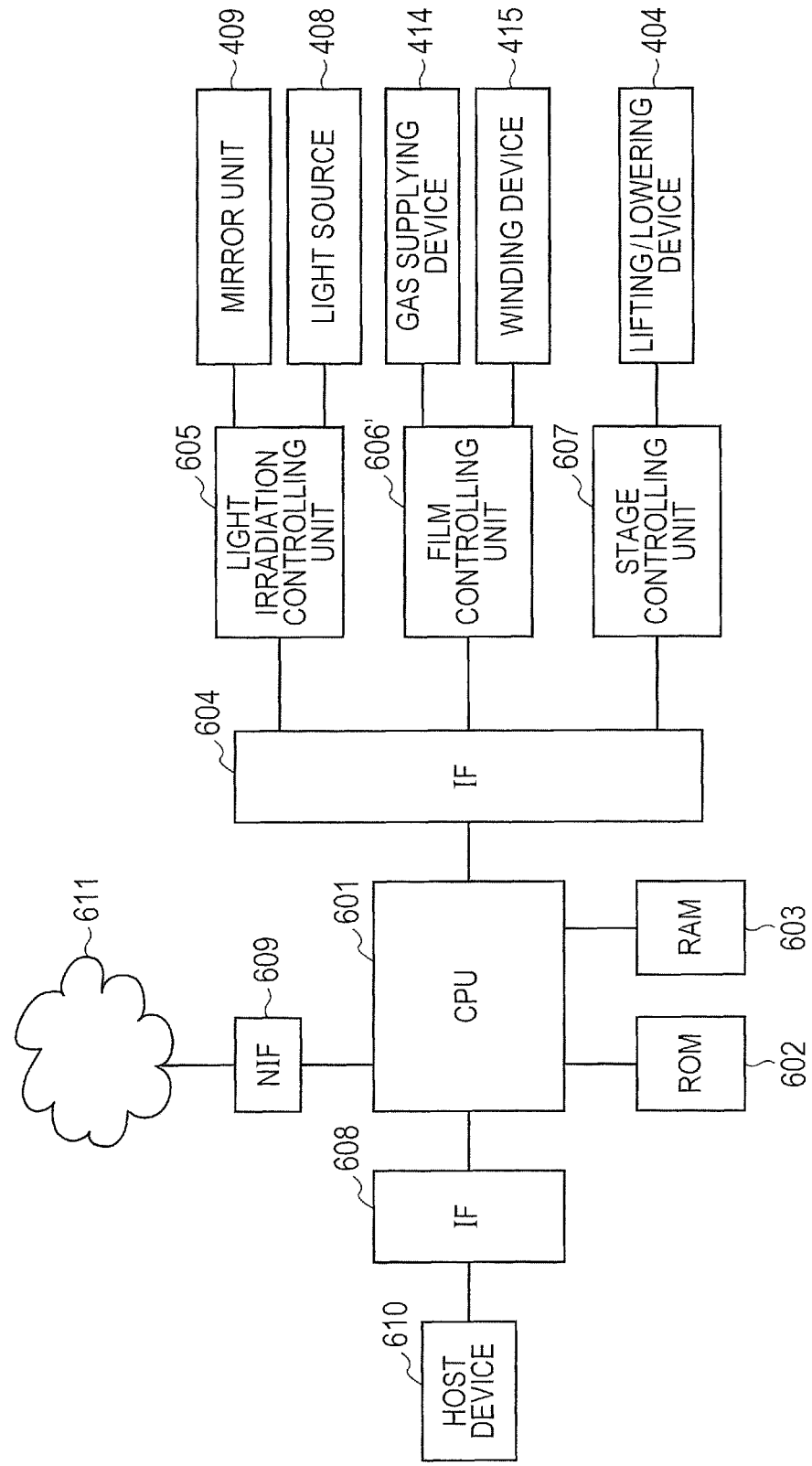
FIG. 32 is a block diagram for describing a constitution example of a controlling system of the three-dimensional manufacturing apparatus according to the present invention.

FIG. 32 is a block diagram for describing a constitution of the controlling system of the manufacturing apparatus of FIG. 27 (the same as also in a constitution of the fourteenth embodiment described with reference to later-described FIG. 29).

In the constitution of FIG. 32, the ROM 602, the RAM 603, interfaces (IFs) 604 and 608, the network interface (NIF) 609 and the like are disposed with the CPU 601 serving as the main function of the controlling device (system) as the center.

The ROM 602, the RAM 603, and the various interfaces 604, 608 and 609 are connected to the CPU 601. A basic program such as the BIOS is stored in the ROM 602. The storage area of the ROM 602 may include a rewritable device such as the EPROM or the EEPROM. The RAM 603 is used as the working area for temporarily storing calculation processing results of the CPU 601. By executing the program recorded (stored) in the ROM 602, the CPU 601 performs a later-described manufacturing control procedure.

In the case of recording (storing) the program for performing the later-described manufacturing control procedure in the ROM 602, such a recording medium constitutes the computer-readable recording medium which stores therein the control procedure for performing the present invention. Incidentally, the program for performing the later-described manufacturing control procedure may be stored in a detachable computer-readable recording medium such as various flash memories, optical (magnetic) disks or the like, in addition to the fixed recording medium such as the ROM 602. Such a storage form can be used when installing or updating the program for performing the control procedure for achieving the present invention. In addition, when installing or updating the control program like this, it is possible to use the method of downloading the program from the network 611 via the network interface 609 in addition to using the detachable recording medium as described above.

The CPU 601 can communicate with other resources on a network (not illustrated) which performs communication using the protocol such as the TCP/IP connected via the network interface 609. It is possible to constitute the network interface 609 by various network communication methods such as the wired connection (IEEE 802.3, etc.), the wireless connection (IEEE 802.xx, etc.), or the like. It is also possible to download a later-described manufacturing control program from the server arranged in the network 611 and install it in the ROM 602 or a hard disk drive, or update an already-installed program to a new version.

Three-dimensional (3D) data for the laminated three-dimensional (3D) manufacture of the manufactured object 402 is transmitted in the data format such as the 3D CAD from the higher-level host device 610 via the interface 608. The interface 608 can be constituted based on, for example, various kinds of serial or parallel interface standards. Further, the host device 610 can also be connected to the network 611 as the network terminal. Also, in this case, the host device 610 can supply the manufacturing data to the manufacturing apparatus in the same manner as described above.

The CPU 601 controls the light source 408 and the mirror unit 409 via the interface 604 and the light irradiation controlling unit 605. Besides, the CPU 601 controls the lifting and lowering operation of the lifting/lowering device 404 via the interface 604 and the stage controlling unit 607. Besides, the CPU 601 controls the gas supplying device 414 and the film winding device 415 via the interface 604 and a film controlling unit 606'. The CPU 601 controls these units in accordance with a predetermined manufacturing sequence, thereby progressing the entire manufacturing process.

The interface 604 can be constituted based on, for example, various serial or parallel interface standards. In FIG. 32, the interface 604 is illustrated by one block for the sake of simplicity. However, the interface 604 may be constituted by the interface circuits respectively having different communication methods depending on the communication specifications and the like of the respective portions illustrated on its right side.

Figure 33:
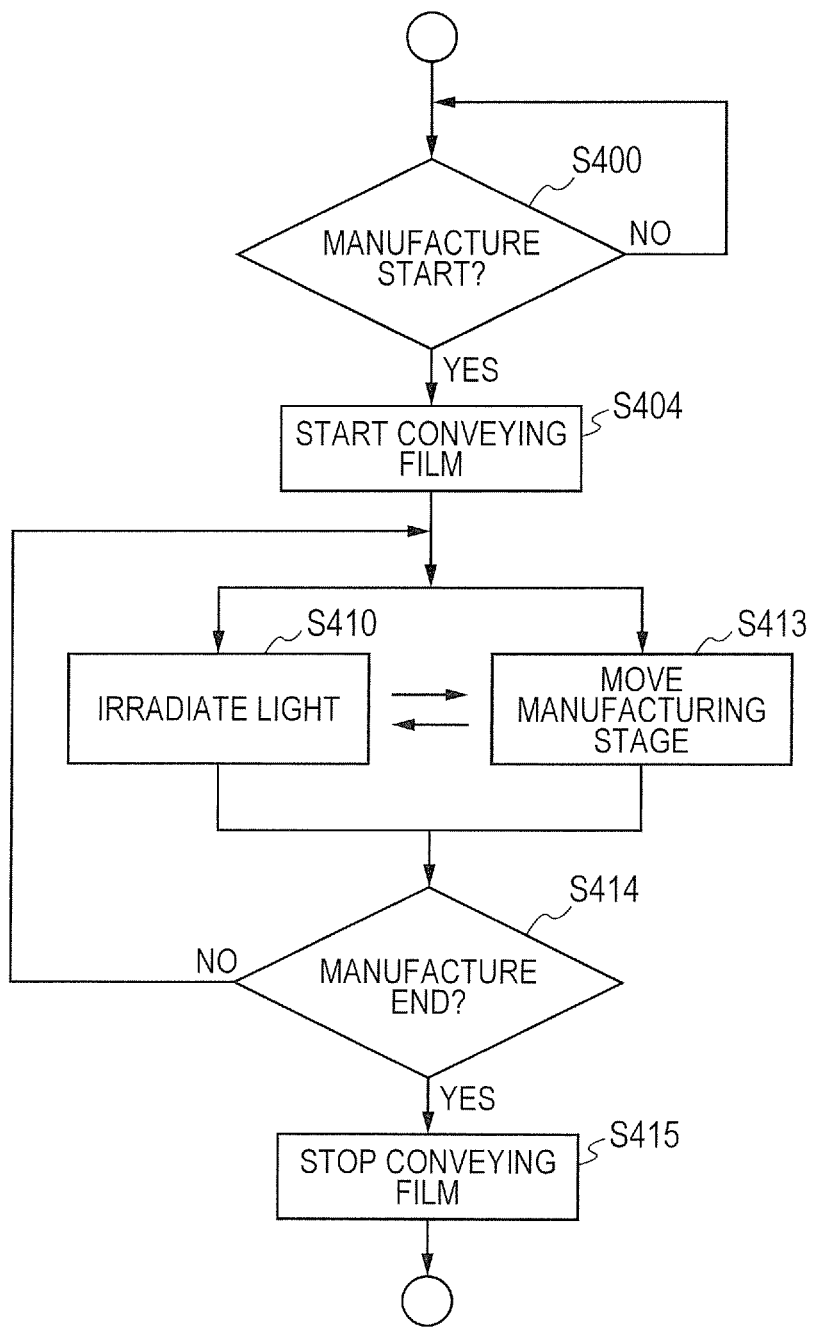
FIG. 33 is a flow chart for describing a three-dimensional manufacturing control procedure according to the present invention.

Next, the operation in the above constitution will be described with reference to FIGS. 27, 28 and 30. FIG. 33 is a flow chart for describing the manufacturing control procedure in the apparatus of FIG. 27. The procedure illustrated in FIG. 33 is described as a control program which can be read and executed by, for example, the CPU 601 (controlling device: computer), and can be stored in, for example, the ROM 602 (or a not-illustrated external storage device).

Prior to the manufacture, the photocurable resin 401 in a molten (uncured) state is supplied into the container 405 by the supplying device 407. Alternatively, this procedure may be performed manually by a worker (operator). In the constitution of supplying the photocurable resin 401 by the supplying device 407, it may be possible to perform automatic control so that the amount of the photocurable resin 401 in the container 405 is automatically controlled to an appropriate amount depending on an appropriate output of a liquid level detecting unit (means) for detecting the liquid level of the photocurable resin 401. Besides, in the case of disposing the supplying device 407, it may be possible to add a resin collecting device for sucking and discharging the photocurable resin 401 from the container 405, so that the photocurable resin 401 is circulated from the resin collecting device to the resin supplying device, and again to the container 405.

The 3D manufacturing data of the manufactured object 402 is previously transmitted from the host device 610 or the like. By converting the 3D manufacturing data into, for example, (cross-section) shape data of a plurality of manufactured layers, the manufacturing data for a plurality of layers constituting the manufactured object 402 is generated. When the photocurable resin 401 is supplied into the container 405 and the manufacturing data of the manufactured object 402 to be manufactured is obtained, the CPU 601 decides in S400 of FIG. 33 whether or not the manufacture is to be started. The decision of the manufacture start is performed by deciding whether or not an instruction of the manufacture start has been received from the host device 610 or the like or by deciding whether or not a predetermined manufacture starting operation has been performed on the not-illustrated operation panel.

The steps illustrated in S410 and S413 in FIG. 33 correspond to the control procedure at the time when manufacturing one layer of the manufactured object 402. That is, these steps are equivalent to light irradiation (S410) and manufacturing stage movement (S413). By repeatedly performing the procedure of S410 to S415, it is possible to manufacture the manufactured object 402 in a laminated manner.

In S410 of FIG. 33, the CPU 601 turns on the light source 408 via the light irradiation controlling unit 605, and causes the mirror unit 409 to scan the irradiation light of the light source 408 depending on the shape of the manufactured layer. Thus, the curing light from the light source 408 passes through the mirror unit 409, the lens unit 410, the light transmission portion 406 and the oxygen adsorption film 412, and is irradiated on the photocurable resin 401 in the vicinity of the manufacturing region 411, thereby curing such a site. In S413, the CPU 601 moves the manufacturing stage 403 via the stage controlling unit 607. For example, the CPU lowers the stage in the constitution of FIG. 27.

As previously described, there are the continuous manufacturing method and the intermittent manufacturing method as the manufacturing methods. For example, in the continuous manufacturing method, the light irradiation (S410) and the movement of the manufacturing stage (S413) are performed synchronously and in parallel. In the case of the continuous manufacture, a moving image projecting unit or the like is used instead of the mirror unit 409, and the CPU 601 continuously irradiates the curing light as a moving image. The speed of continuously moving the manufacturing stage 403 via the stage controlling unit 607 may be determined depending on a frame rate of the curing light for such a moving image constitution and the like.

On the other hand, in the intermittent manufacturing method, the CPU 601 alternately performs the light irradiation (S410) and the movement of the manufacturing stage (S413). In the light irradiation (S410), the CPU 601 controls the mirror unit 409 to perform the planar scanning of the curing light to the periphery of the manufacturing region 411 so as to cover a shape corresponding to one layer of the manufactured object 402. At this time, the manufacturing stage 403 is stopped. Then, when the light irradiation (S410) for one layer is completed, the manufacturing stage 403 is moved via the stage controlling unit 607 by the amount substantially corresponding to the thickness of one layer. For example, the manufacturing stage is moved downward in the constitution of FIG. 27.

In the control example of FIG. 33, in both the continuous manufacturing method and the intermittent manufacturing method, prior to the light irradiation (S410) and the movement of the manufacturing stage (S413), the gas supplying device 414 and the winding device 415 are activated to start conveying the oxygen adsorption film 412 (S404). Thus, a new site of the oxygen adsorption film 412, which holds a gas having a polymerization (solidification) inhibitory property, for example, oxygen or ozone, is always fed little by little between the light transmission portion 406 and the manufacturing region 411.

In S414, it is decided whether or not the manufacture of the manufactured object 402 has been completed (ended). For example, it is decided whether or not the light irradiation (S410) and the movement of the manufacturing stage (S413) have been performed using all the manufacturing data for forming the manufactured object 402. The light irradiation (S410) and the movement of the manufacturing stage (S413) are repeatedly performed until all the manufacturing data forming the manufactured object 402 are processed.

When the manufacture of the manufactured object 402 is completed, the process advances to S415 to stop the gas supplying device 414 and the winding device 415, and complete the conveyance of the oxygen adsorption film 412.

As described above, according to the present embodiment, it is possible to control to inhibit the solidification reaction of the photocurable resin 401 in the manufacturing region 411, particularly the side facing the oxygen adsorption film 412, and not to cure the resin. Therefore, in particular, it is possible to certainly suppress that the fixation of the manufactured object 402 occurs in the vicinity of the interface between the manufacturing region 411 and the light transmission portion 406 or the oxygen adsorption film 412, and it is also possible to certainly suppress that the unnecessary viscosity increase of the photocurable resin 401 occurs at such a portion.

Therefore, according to the present embodiment, in the case of the intermittent manufacture, it becomes unnecessary to peel the manufactured object 402 from the film for each photocuring of one layer, and it is thus possible to move the manufacturing stage 403 at high speed. Further, in the case of the continuous manufacture, the lifting/lowering device 404 can continuously move the manufacturing stage 403 without unnecessary resistance.

Besides, by continuing to convey the oxygen adsorption film 412 being in contact with the photocurable resin 401 at certain speed, a flow occurs in the vicinity of the manufacturing region 411, particularly in the vicinity of the low pressure portion caused by the movement of the manufacturing stage 403, thereby enabling to agitate such a portion. Thus, it is possible to facilitate inflow of the photocurable resin 401, which is the material for the manufactured layer to be solidified next, to the vicinity of the manufacturing region 411. That is, the oxygen adsorption film 412 functions as the flow facilitating unit which has the function of facilitating the flow of the photocurable resin 401 in contact with the light transmission portion 405 (the flow being attended by the movement of the manufacturing stage 403 functioning as the base). Thus, it is possible to improve the inflow speed of the photocurable resin 401, which is the material for the manufactured layer to be solidified, to the vicinity of the manufacturing region 411, it is possible to quickly irradiate the curing light for the next layer, and it is thus possible to increase the speed of the three-dimensional manufacture.

Fourteenth Embodiment

Figure 29:
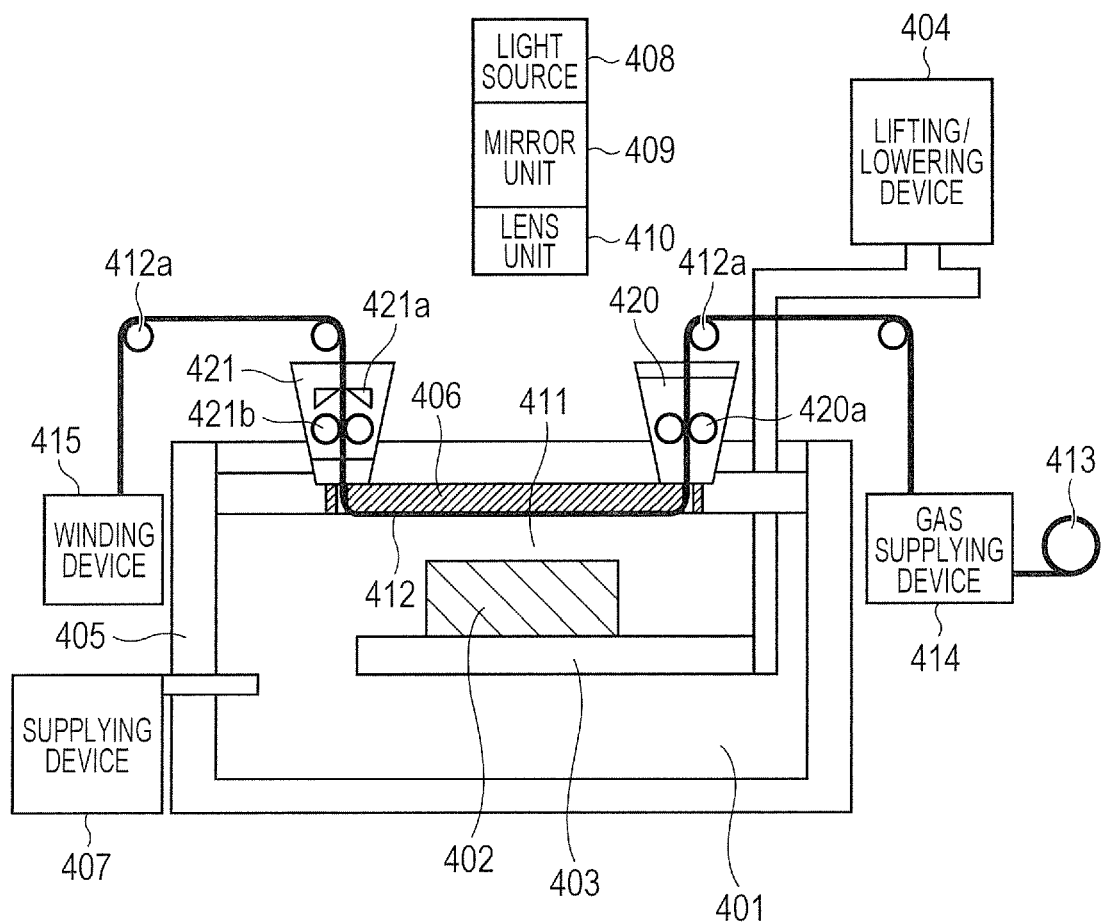
FIG. 29 is an explanatory diagram for describing a constitution of the three-dimensional manufacturing apparatus according to a fourteenth embodiment of the present invention.

FIG. 29 is a diagram for describing a constitution of the three-dimensional manufacturing apparatus according to the fourteenth embodiment, in the format conforming to that of FIG. 27. Also in the three-dimensional manufacturing apparatus illustrated in FIG. 29, it is possible to use the constitution of the controlling system and the manufacturing control procedure which are substantially the same as those illustrated in FIGS. 32 and 33 of the thirteenth embodiment. It should be noted that, in the present embodiment, the same reference numerals are given respectively to the same or equivalent members as those of the thirteenth embodiment, and the duplicate descriptions for these members are omitted.

Also in the present embodiment, the oxygen adsorption film 412 corresponds to the supplying member for supplying a gas having the cure inhibitory property to the photocurable resin. In the present embodiment, the oxygen adsorption film 412 is unwound from the form of the film roll 413 by the driving force of the winding device 415, and is then conveyed in the state being in contact with the light transmission portion 406 by the guide rollers 412a, 412a, . . . on the way.

The constitution of FIG. 29 is different from that of FIG. 27 in the point that a resin adhering device 420 and a cleaning device 421 are arranged in FIG. 29. The resin adhering device 420 is disposed at a position upstream of the position where the oxygen adsorption film 412 is conveyed toward the lower surface of the light transmission portion 406. The cleaning device 421 is disposed at a position downstream of the position after the oxygen adsorption film 412 is conveyed from the lower surface of the light transmission portion 406. For example, each of the resin adhering device 420 and the cleaning device 421 can be constituted as a gutter-like container of which the length in the depth direction (in the drawing) is long. As illustrated, the oxygen adsorption film 412 is guided by the guide rollers 412*a*, 412*a*, . . . to be conveyed from the resin adhering device 420 to the lower surface of the light transmission portion 406, and then conveyed outward via the cleaning device 421.

The resin adhering device 420 holds the same liquid resin as the photocurable resin 401 therein, and adheres the resin material to both the surfaces of the passing oxygen adsorption film 412 by a pair of resin supplying rollers 420*a* arranged opposite thereto.

On another front, in the cleaning device 421, a pair of guide rollers 421*b* and a pair of cleaning blades 421*a* each of which faces each other are provided. The photocurable resin attached to both the surfaces of the oxygen adsorption film 412 conveyed from the lower surface of the light transmission portion 406 is scraped off by the cleaning blades 421*a* and collected in the cleaning device 421.

The constitution, the manufacturing operation and the manufacturing control of the three-dimensional manufacturing apparatus other than the above are the same as those described in the above thirteenth embodiment. Namely, since the fundamental portions of the manufacturing operation, the manufacturing control and the functions and effects thereof are equivalent to those described in the above thirteenth embodiment, the duplicated descriptions are omitted here. Particularly, according to the fourteenth embodiment, the resin adhering device 420 is disposed at the position immediately before the oxygen adsorption film 412 is conveyed to the lower surface of the light transmission portion 406, and the cleaning device 421 is disposed at the position immediately after the oxygen adsorption film is conveyed from the lower surface of the light transmission portion 406. As just described, in the present embodiment, before the oxygen adsorption film 412 is conveyed onto the lower surface of the light transmission portion 406 or before the oxygen adsorption film 412 is conveyed into the photocurable resin 401, the photocurable resin 401 is adhered to both the surfaces of the oxygen adsorption film 412. Thus, the oxygen adsorption film 412 passing along the lower surface of the light transmission portion 406 and the photocurable resin 401 in the container 405 are well conformed or fit to each other, so that it is possible to smoothly move the oxygen adsorption film 412 at the desired conveying speed. Besides, the oxygen adsorption film 412 can be conveyed toward the lower surface of the light transmission portion 406 after supplying a solidification inhibitory gas such as oxygen or ozone to the photocurable resin previously adhered to the surfaces of the oxygen adsorption film 412. Therefore, it is possible to certainly send the solidification inhibitory gas to the vicinity of the manufacturing region 411 for which it is desired to certainly inhibit a fixation or a viscosity increase, particularly to the vicinity of the light transmission portion 406. Furthermore, since the photocurable resin 401 adhered to the oxygen adsorption film 412 can be removed by the cleaning device 421 at the position immediately after the film is conveyed from the lower surface of the light transmission portion 406, it is possible to prevent the photocurable resin 401 from scattering to an unnecessary position in the three-dimensional manufacturing apparatus.

Fifteenth Embodiment

Each of the constitution of the thirteenth embodiment illustrated in FIG. 27 and the constitution of the fourteenth embodiment illustrated in FIG. 29 has the basic constitution in which the curing light is irradiated from above the container 405 and the manufacturing stage 403 is lowered with the progress of the manufacture. However, as illustrated in FIG. 31 related to the present embodiment, it is possible to set the irradiation direction of the curing light and the movement direction of the manufacturing stage 403 respectively in different directions from those of the thirteenth embodiment and the fourteenth embodiment.

Figure 31:
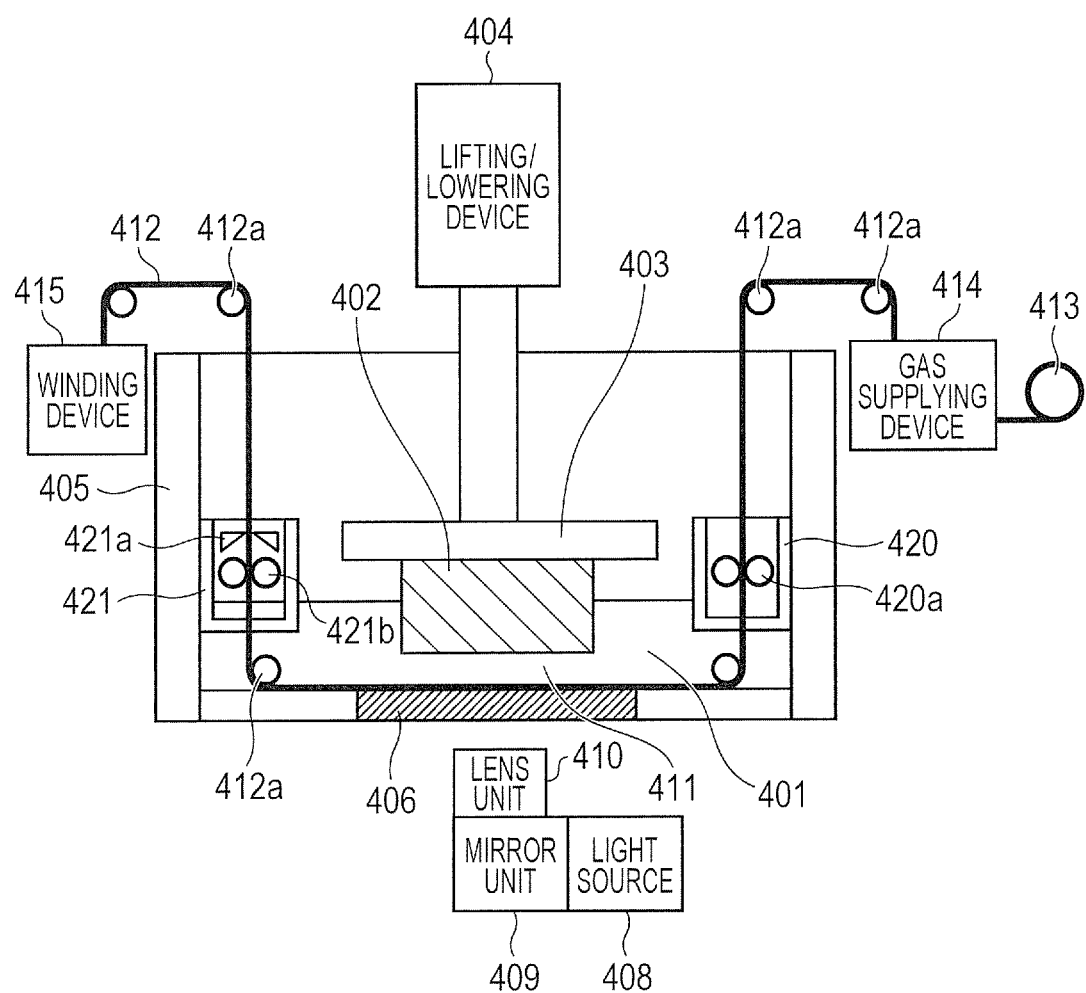
FIG. 31 is an explanatory diagram for describing a constitution of the three-dimensional manufacturing apparatus according to a fifteenth embodiment of the present invention.

FIG. 31 is the diagram for describing the constitution of the three-dimensional manufacturing apparatus of the fifteenth embodiment in the format equivalent to those of FIGS. 27 and 29 and the like. In the constitution of FIG. 31, for example, the container 405 holding therein the photocurable resin 401 has a shape opened upward, and the light transmission portion 406 through which the curing light is transmitted is disposed at the bottom surface of the container 405. In the present embodiment, the light source 408, the mirror unit 409 and the lens unit 410 are disposed below the light transmission portion 406, so that the curing light is irradiated to the manufacturing region 411 from below through the light transmission portion 406.

The manufactured object 402 is formed on the lower surface of the manufacturing stage 403 in the manufacturing region 411. Therefore, in the present embodiment, the manufacturing stage 403 is moved upward by the lifting/lowering device 4 depending on the progress of the manufacture. The substantial difference between the constitutions of FIGS. 27 and 29 and the constitution of FIG. 31 of the present embodiment is the direction in which the manufacture of the manufactured object 402 progresses, that is, only the irradiation direction of the curing light and the movement direction of the manufacturing stage 403 attended by the irradiation.

Also in the present embodiment, the oxygen adsorption film 412 corresponds to the supplying member for supplying a gas having the cure inhibitory property to the photocurable resin. In the present embodiment, the oxygen adsorption film 412 is unwound from the form of the film roll 413 by the driving force of the winding device 415, and is then conveyed in the state being in contact with the light transmission portion 406 by the guide rollers 412*a*, 412*a*, . . . on the way.

In FIG. 31, the cross-section surface of the light transmission portion 406 is illustrated as a simple rectangle. However, as well as the example illustrated in FIG. 28, it is also possible to form the surface being in contact with the oxygen adsorption film 412 as a convex curved surface shape toward the direction of the oxygen adsorption film or the manufacturing region 411. Thus, it is possible to expect the same action and effect as those described with reference to FIG. 28.

Further, in the constitution of FIG. 31, the resin adhering device 420 and the cleaning device 421 are arranged as well as the example illustrated in FIG. 29. The functions and the effects of the resin adhesion device 420 and the cleaning device 421 are the same as those described with reference to FIG. 29. As is clear from the comparison between FIG. 27 and FIG. 29, in the constitution of FIG. 31, the resin adhering device 420 and the cleaning device 421 are not necessarily indispensable, and a constitution in which these devices are omitted is also conceivable. Further, in FIG. 31, although the supplying device 407 for supplying the photocurable resin 401 into the container 405 is not illustrated, the supplying device 407 similar to that described in the case of FIG. 27 or 29 may be arranged.

Also in the constitution illustrated in FIG. 31, as described above, it is possible to control to inhibit the solidification reaction of the photocurable resin 401 in the manufacturing region 411, particularly the side facing the oxygen adsorption film 412, and not to cure the resin. Therefore, in particular, it is possible to certainly suppress that the fixation of the manufactured object 402 occurs in the vicinity of the interface between the manufacturing region 411 and the light transmission portion 406 or the oxygen adsorption film 412, and it is also possible to certainly suppress that the unnecessary viscosity increase of the photocurable resin 401 occurs at such a portion.

Therefore, according to the present embodiment, in the case of the intermittent manufacture, it becomes unnecessary to peel the manufactured object 402 from the film for each photocuring of one layer, and it is thus possible to move the manufacturing stage 403 at high speed. Further, in the case of the continuous manufacture, the lifting/lowering device 404 can continuously move the manufacturing stage 403 without unnecessary resistance.

Besides, by continuing to convey the oxygen adsorption film 412 being in contact with the photocurable resin 401 at certain speed, it is possible to agitate the vicinity of the manufacturing region 411, particularly the vicinity of the low pressure portion caused by the movement of the manufacturing stage 403. Thus, it is possible to facilitate inflow of the photocurable resin 401, which is the material for the manufactured layer to be solidified next, to the vicinity of the manufacturing region 411. Thus, it is possible to improve the inflow speed of the photocurable resin 401, which is the material for the manufactured layer to be solidified, to the vicinity of the manufacturing region 411, it is possible to quickly irradiate the curing light for the next layer, and it is thus possible to increase the speed of the three-dimensional manufacture.

According to the present invention, when the three-dimensional manufactured object is formed by laminating the plurality of layers, it is possible to promptly replenish the liquid resin material for the layer formation to the manufacturing region without deterioration. Therefore, it is possible to remarkably shorten the time required for forming the three-dimensional manufactured object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-174895, filed Sep. 7, 2016, Japanese Patent Application No. 2016-192347, filed Sep. 29, 2016, Japanese Patent Application No. 2016-250074, filed Dec. 22, 2016, and Japanese Patent Application No. 2016-181368, filed Sep. 16, 2016, which are hereby incorporated by reference herein in their entirety.

What is claimed is:

1. A three-dimensional manufacturing apparatus comprising:
    a container configured to hold a liquid photocurable resin;
    a base configured to support a solid manufactured object obtained by curing the liquid photocurable resin;
    a moving unit configured to move the base; and
    a light source unit configured to irradiate light for curing the liquid photocurable resin,
    wherein the container comprises a light transmission portion which is provided between the light source unit and the base, and is in contact with the liquid photocurable resin,
    wherein the light transmission portion comprises a plurality of convex portions, and a gas having a cure inhibitory property is supplied from an upper surface and a side surface of the plurality of convex portions to the liquid photocurable resin,
    wherein the plurality of convex portions are arranged such that a distance between adjacent convex portions is 60 µm to 200 µm,
    wherein a cross-section area of the plurality of convex portions in a cross-section surface being parallel with a principal surface of the light transmission portion is 45% to 80% of an area of a region irradiated by cure light on the principal surface of the light transmission portion, and
    wherein a space between the convex portions among the plurality of convex portions is as an inflow path of the liquid photocurable resin.

2. The three-dimensional manufacturing apparatus according to claim 1, wherein the light transmission portion includes a heat generating unit which can generate heat.

3. The three-dimensional manufacturing apparatus according to claim 1, further comprising an infrared light source which can irradiate infrared light to the light transmission portion.

4. The three-dimensional manufacturing apparatus according to claim 1, further comprising an exciting device which vibrates the light transmission portion.

5. The three-dimensional manufacturing apparatus according to claim 2, wherein the light transmission portion is provided with a heater, on a substrate, through which the light of a wavelength region for curing the liquid photocurable resin passes.

6. The three-dimensional manufacturing apparatus according to claim 2, wherein the light transmission portion transmits the light of a wavelength region for curing the liquid photocurable resin, and absorbs infrared light.

7. The three-dimensional manufacturing apparatus according to claim 2, wherein the container comprises a cooling unit which cools down the liquid photocurable resin.

8. The three-dimensional manufacturing apparatus according to claim 4, wherein, in case of moving the base by the moving unit or in case of irradiating the light by the light source unit, the exciting device vibrates the light transmission portion.

9. The three-dimensional manufacturing apparatus according to claim 4, wherein an excitation frequency of the exciting device is 10 Hz to 100 kHz and an excitation output of the exciting device is 10 W to 1 kW.

10. The three-dimensional manufacturing apparatus according to claim 1, wherein each of the plurality of convex portions has a hexagonal prism shape.

\* \* \* \* \*